US010635985B2

United States Patent
Gauthier et al.

(10) Patent No.: US 10,635,985 B2
(45) Date of Patent: *Apr. 28, 2020

(54) METHODS, SYSTEMS AND COMPUTER PROGRAM PRODUCTS FOR DETERMINING SYSTEMS RE-TASKING

(71) Applicant: National Technology and Engineering Solutions of Sandia, LLC, Albuquerque, NM (US)

(72) Inventors: John H. Gauthier, Albuquerque, NM (US); Nadine E. Miner, Albuquerque, NM (US); Michael L. Wilson, Albuquerque, NM (US); Dennis E. Longsine, Leander, TX (US)

(73) Assignees: National Technology & Engineering Solutions of Sandia, LLC, Albuquerque, NM (US); INTERA Incorporated, Austin, TX (US)

( * ) Notice: Subject to any disclaimer, the term of this patent is extended or adjusted under 35 U.S.C. 154(b) by 814 days.

This patent is subject to a terminal disclaimer.

(21) Appl. No.: 14/521,285

(22) Filed: Oct. 22, 2014

(65) Prior Publication Data

US 2015/0112906 A1 Apr. 23, 2015

Related U.S. Application Data

(60) Provisional application No. 61/894,208, filed on Oct. 22, 2013, provisional application No. 61/894,251, filed on Oct. 22, 2013.

(51) Int. Cl.
*G06N 7/00* (2006.01)
*G06Q 10/06* (2012.01)
*G06N 20/00* (2019.01)

(52) U.S. Cl.
CPC ............... *G06N 7/00* (2013.01); *G06N 20/00* (2019.01); *G06Q 10/067* (2013.01); *G06Q 10/0637* (2013.01)

(58) Field of Classification Search
CPC ...... G06N 3/126; G06N 3/086; G06N 99/005; G06N 7/005; G05B 13/0265
USPC .......................................................... 706/13
See application file for complete search history.

(56) References Cited

U.S. PATENT DOCUMENTS

2005/0066239 A1* 3/2005 Keeton ................. G06F 11/008
714/47.1

OTHER PUBLICATIONS

Campbell—System of Systems Modeling and Analysis—http://prod.sandia.gov/techlib/access-control.cgi/2005/050020.pdf.*

* cited by examiner

*Primary Examiner* — Eric Nilsson
*Assistant Examiner* — Viker A Lamardo
(74) *Attorney, Agent, or Firm* — Daniel J. Jenkins

(57) ABSTRACT

Methods, systems and computer program products to measure system re-taskability are disclosed. The methods, systems and computer program products may be used in the design of a new or redesign of an existing System of Systems (SoS). Systems re-tasking (aka substitutability or stand-in redundancy) is the process of using different systems to substitute for non-operational systems to meet required functionality, or using multi-function systems to fulfill higher-priority tasks. This ability can increase the overall operational availability of the SoS; it can also increase the adaptability and resilience of the SoS to unknown or changing conditions. The disclosed methods, systems and computer products include simulating an SoS over time, replacing systems that become non-operational (or damaged) with systems that can fulfill the same capability in order to maximize the SoS availability.

6 Claims, 12 Drawing Sheets

METHODS, SYSTEMS AND COMPUTER PROGRAM PRODUCTS FOR DETERMINING SYSTEMS RE-TASKING

CROSS-REFERENCE TO RELATED APPLICATIONS

This application claims benefit of U.S. Provisional Patent Application No. 61/894,208, "QUANTIFYING RELATIVE SYSTEM ADAPTABILITY," filed Oct. 22, 2013, and U.S. Provisional Patent Application No. 61/894,251, "STRATEGY-BASED SIMULATION," filed Oct. 22, 2013, both of which are incorporated by reference herein in their entireties.

This application is related to U.S. Non-Provisional patent application Ser. No. 14/521,091, titled "METHODS, SYSTEMS AND COMPUTER PROGRAM PRODUCTS FOR QUANTIFYING RELATIVE SYSTEM ADAPTABILITY," filed Oct. 22, 2014, and U.S. Non-Provisional patent application Ser. No. 14/521,194 "METHODS, SYSTEMS AND COMPUTER PROGRAM PRODUCTS FOR EVALUATING SYSTEM PERFORMANCE," filed Oct. 22, 2014, both of which are incorporated by reference herein in their entireties.

GOVERNMENT RIGHTS

This invention was made with Government support under Contract No. DE-AC04-94AL85000 awarded by the U.S. Department of Energy. The Government has certain rights in the invention.

FIELD

The present disclosure is generally directed to fields of systems engineering and systems analysis, and is more particularly directed to methods and systems to determine effective systems re-tasking for design and operation of systems of systems (SoS).

BACKGROUND

Society is increasingly reliant on systems and interoperating collections of systems, known as systems of systems (SoS). Example of SoS include power grids, space systems, distribution systems, industrial production, organizational operation and structure, such as, but not limited to military deployment. In addition, our national security is built on SoS, such as military units, airport security, and nuclear weapons security. These SoS are often subject to changing environmental factors such as, but not limited to budgets, changing missions (e.g., nation-building, arms-control treaties), changing threats (e.g., asymmetric warfare, terrorism, WMDs), and changing natural environments (e.g., climate, weather, natural disasters). It is important that SoS adapt to these changing environmental factors effectively and efficiently. Past disclosures on adaptability have focused on qualitative behaviors.

What is needed is a quantitative method and system for determining effective systems re-tasking for the design and operation of SoS.

BRIEF DESCRIPTION OF THE DRAWINGS

Wherever possible, the same reference numbers will be used throughout the drawings to represent the same parts.

SUMMARY

Figure 1:
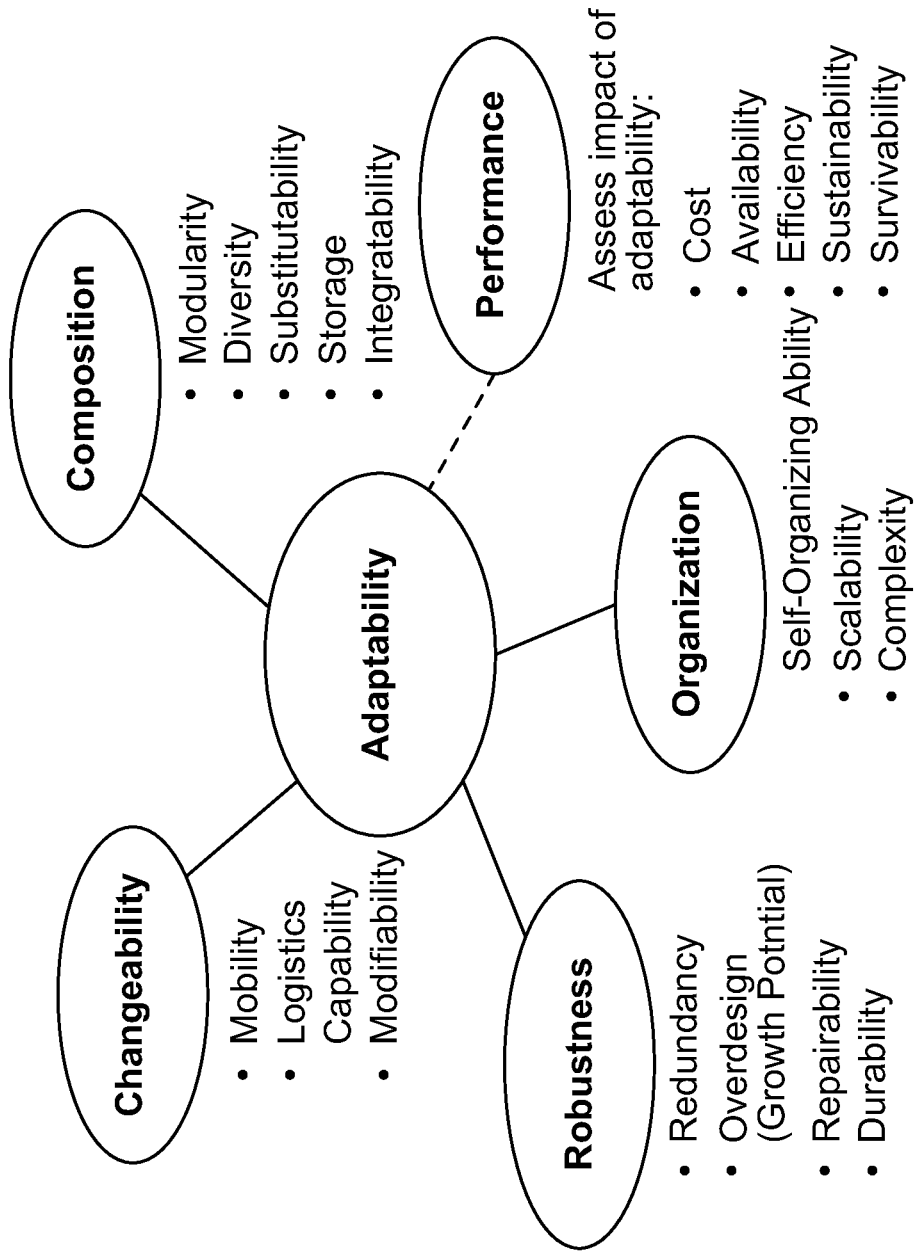
FIG. 1 is an illustration of SoS adaptability metrics with performance measures according to an exemplary embodiment of the disclosure.

Methods, systems, and a computer program product to determine effective systems re-tasking for design and operation of complex systems, including systems of systems, are disclosed.

Methods, systems, and a computer program product for developing a SoS from a selection of components and/or capabilities that has an effective degree of re-tasking. The re-tasking of systems may be used in the design of a new or redesign of an existing System of Systems (SoS). Systems re-tasking (aka substitutability or stand-in redundancy) is the process of using different systems to substitute for non-operational systems to meet required functionality, or using multi-function systems to fulfill higher-priority tasks. This ability can increase the overall operational availability of the SoS; it can also increase the adaptability and resilience of the SoS to unknown or changing conditions. The disclosed methods, systems and computer products include simulating an SoS over time, replacing systems that become non-operational (or damaged) with systems that can fulfill the same capability in order to maximize the SoS availability. The end result is a design for the SoS that uses effective systems re-tasking to achieve mission success.

According to an embodiment of the disclosure, a method for determining effective system re-taskability is disclosed that includes:
a) define a problem having a design, functions, and a scenario;
b) define possible re-tasking for each function;
c) evaluate performance of system of system under re-tasking using system of system availability;
d) redefine design;
e) repeat steps a through d to create one or more designs;
f) compare designs; and
g) provide a final design from the one or more designs based on evaluation of effective system availability.

According to another embodiment of the disclosure, a system including a non-transitory computer readable storage medium encoded with programming for interactively analyzing system re-taskability is disclosed, the non-transitory computer readable medium with programming configured to:
a) define a problem having a design, functions, and a scenario;
b) define possible re-tasking for each function;
c) evaluate performance of system of system under re-tasking using system of system availability;
d) redefine design;
e) repeat steps a through d to create one or more designs;
f) compare designs; and
g) provide a final design from the one or more designs based on evaluation of effective system availability.

According to another embodiment of the disclosure, a computer program product stored on a non-transitory computer readable medium is disclosed, wherein executed by a process, the computer program product configured to:
a) define a problem having a design, functions, and a scenario;
b) define possible re-tasking for each function;
c) evaluate performance of system of system under re-tasking using system of system availability;
d) redefine design;
e) repeat steps a through d to create one or more designs;
f) compare designs; and
g) provide a final design from the one or more designs based on evaluation of effective system availability.

One advantage of the present disclosure is to provide a method and system for determining effective systems re-tasking within an SoS.

Another advantage of the present disclosure is to provide a method and system for quantifying SoS availability.

Another advantage of the present disclosure is to provide a method and system for quantifying the effect of systems re-tasking on SoS availability.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

According to an embodiment of the invention, methods, systems and computer program products that include a set of metrics that can be applied relatively and used to determine an adaptability index for systems of systems (SoS) are disclosed. The term systems of systems (SoS) is used to describe a system that is a member of a group of systems and that contains one or more components. Throughout this application, the term system may be used interchangeably with SoS as describing a system with the SoS. The metrics and adaptability index can measure performance under variable objectives, such as mission space, and for uncertain system environmental factors, such as threat environment. The metrics and adaptability index create an analytic capability to assist in the design and operation of adaptable systems and SoS and prepare those systems to be better able to respond to changing operational environments: natural environments, threats, missions, competition, organizational composition, resource availability (resource reliability, maintenance, etc.) and budgets. The methods, systems and computer program products of any of the embodiments described herein can be collectively or individually be referred to as a "tool."

The term "adaptability" is used in this disclosure to mean adjustment or modification of the system in response to changing operational factors. The disclosed methods, systems and computer program products provide a quantitative basis for comparing adaptability of system designs and identifying which aspects of adaptability have the greatest impact on performance.

Table 1 shows four examples of SoS, an exemplary threat, exemplary hardware or entities or procedures, and exemplary adaptability metrics. As can be seen in Table, 1, the application of metrics and adaptability can be made to a wide range of SoS.

TABLE 1

Exemplary SoS designs and Adaptability Metrics

| Systems of Systems | Typical Threat | Hardware or Entities or Procedures | Adaptability Metrics* |
|---|---|---|---|
| Military Deployment | Enemy | vehicles, aircraft, UAVs, storage tanks, power generators, construction equipment, facilities, comm equipment, operations, soldiers, etc. | mobility, logistics capability, modularity, substitutability, storage, self-organizing ability, complexity, overbuild |
| Electrical Grid | Natural disaster | power generators (coal, natural gas, renewables, etc.), power lines, transformers, facilities, etc. | modifiability, modularity, diversity, storage, integratability, scalability, complexity, redundancy, reparability, durability |
| Package Delivery Company | Competition | vehicles, aircraft, communications, staff, warehouses, etc. | modularity, diversity, substitutability, storage, self-organizing ability, scalability, complexity, reparability, durability |

TABLE 1-continued

Exemplary SoS designs and Adaptability Metrics

| Systems of Systems | Typical Threat | Hardware or Entities or Procedures | Adaptability Metrics* |
|---|---|---|---|
| Supply Chain Health | Enemy, counterfeiter | suppliers, sub-contractors, transportation links, warehouses, operations/procedures, monitoring stations, etc. | logistics capability, modifiability, diversity, substitutability, storage, self-organizing ability, complexity, overbuild |

*Note that, in some instances, all adaptability metrics can be applied to each SoS.

According to an example that uses goal-question-metrics (GQM), three example SoS were compared: a military deployment (e.g., an Army brigade), the US Post Office, and a regional power grid. Table 2 summarizes these SoS. It is immediately evident that, even in this restricted set of SoS, there are different missions, compositions, and adaptability issues. Further, the response to the adaptability issues could be different for each SoS. For instance, the military might replace vehicles to better counter an adversary (e.g., Mine-Resistant Ambush Protected (MRAP) vehicles to counter IEDs); the US Post Office might reduce services to meet costs and counter a more cost-effective competitor; and a regional power grid might require energy storage units at substations to handle the fluctuations in electricity from third-party photovoltaic or wind power.

TABLE 2

Example SoS with Possible Adaptability Issues

| SoS | Primary Mission | Composition | Adaptability Issues |
|---|---|---|---|
| Military Deployment | Secure territory and build nation states | Combat and support vehicles, base infrastructure, communications, etc. | Changing mission (strategic and tactical), adaptive enemy |
| US Post Office | Deliver mail to every customer in the country | Hubs, airplanes, trucks, post offices, delivery vehicles, etc. | Packages generate more revenue, email, competition (a type of adaptable enemy), manpower requirements |
| Regional Power Grid | Generate and distribute electricity to customers | Power plants, distribution lines, maintenance equipment, etc. | Environmental impact, renewables penetration |

Such differences in the basic character of SoS and differences in their adaptability issues leads to the following observations:

1) Adaptability of an SoS cannot be described with a single metric. The different characteristics of SoS and the many adaptability issues require many metrics.

2) The different natures of SoS precludes absolute adaptability metrics. Consider that complexity (one of the metric candidates) in a military deployment is not the same as, nor does it have the same effect as, complexity in a regional power grid. For a military deployment, increased complexity might be an advantage because it could potentially respond to a greater variety of situations than a deployment with less complexity. For a regional power grid, increased complexity might be a detriment for many reasons, such as greater maintenance and training requirements than for a simpler system. Therefore, the measures of the individual adaptability responses must be relative. That is, the amount of complexity in different designs of the same SoS can be measured to determine how adaptable one design might be relative to another.

3) Not all facets of adaptability apply to every SoS, thus the applicability of adaptability metrics depends on the SoS under study. For example, a self-organizing metric might not apply to the Post Office, and a diversity metric might not apply to a regional power grid.

Based on the initial list of adaptability concepts and the lessons learned from the GQM, a list of 15 metrics was developed. Each metric is intended to address a different facet of SoS adaptability. Depending on the SoS under study, the metrics could be organized and named differently. FIG. 1 shows a baseline organization of the 15 adaptability metrics organized into four categories: Changeability, Composition, Organization, and Robustness. A fifth category, Performance, provides various measures to assess the impact of adaptability. Performance is discussed in more detail later in this disclosure.

The Changeability category is most similar to biologic evolution. This category may be referred to as reconfigurability, where the metrics indicate the ease with which systems can change over time. Not all of the metrics in each category will apply to every SoS under study, and they might have different interpretations depending on the particular SoS. For example, in a military deployment, the Changeability metric of mobility might refer to an aggregate measure of vehicle mobility, while in a power grid, mobility might refer to a measure of energy movement through the SoS.

The Composition category, also called Structure, includes metrics that often enable survival. The Organization category is derived largely from CAS theory, e.g., neurons in a brain or a flock of birds. The Robustness category includes metrics that measure how well an SoS can meet changing circumstances without changing the SoS architecture. In contrast, the categories of Changeability, Composition, and Organization, contain measures of how well an SoS adjusts in response to changing circumstances (or functional modification). Only a subset of the metrics—mobility, modularity, modifiability, integratability, redundancy, repairability, and durability—are expected to apply to individual systems, while the entire set of metrics could apply to an SoS.

Metric calculations are expected to depend on the study and the available tools. Some calculations can be straightforward. For example, the complexity metric can be a count of the nodes (systems) and edges (interconnections between systems) in an SoS. The repairability metric can be calculated as the average mean time to repair for the systems in an SoS. The logistics-capability metric can be calculated as the quantity of materials that can be transported to the point of need (e.g., the shipping capacity). Some of the metrics, however, might require more involved calculations. For example, some problems might require a different aspect of logistics capacity, such as logistics utilization. A logistics utilization measure could be calculated as the time-averaged ratio of the number of operating logistics systems to the total number of logistics systems. In addition, each metric can be measured in multiple ways. Using a military deployment example, the storage adaptability metric can be measured by the available fuel storage capacity, and how well the storage is utilized. Likewise, the logistics capability metric can be measured by the convoy frequency and the number of failed fuel orders. Furthermore, the metrics can be interdependent. For instance, a logistics capability metric might be dependent on a storage metric—logistics might require stored parts, or stored parts might be sufficient to reduce the need for logistics. Correlations might need to be considered when calculating these metrics. Thus, which metrics apply and how they are calculated is very application specific.

In addition to the 15 adaptability metrics, performance (or health) metrics are included that measure the end result of adaptability, and allow comparison of adaptability. The premise is that a more adaptable system will perform better in a changing or dynamic environment. The performance metrics are SoS-related, and depend on the "goodness" of the SoS' adaptability. For example, survivability of an SoS is not an adaptability metric per se, but it should reflect some aspect of an SoS' adaptability. A more adaptable SoS should be more survivable than a less adaptable SoS under changing conditions, and conditions of stress where adaptability matters. The applicability of the performance metrics will vary depending on the system or SoS under study.

A typical use for the adaptability metrics might be to determine which of a set of designs for an SoS would be best for changing missions, threats and environments. Such a study would involve the following steps: (1) Choose applicable metrics from the list. (2) Select appropriate measures for those metrics. (3) Evaluate the measures for each system design and scenario of interest. Then (4) Compare the designs and (5) Inform the selection of a design that meets needs best.

Figure 2:
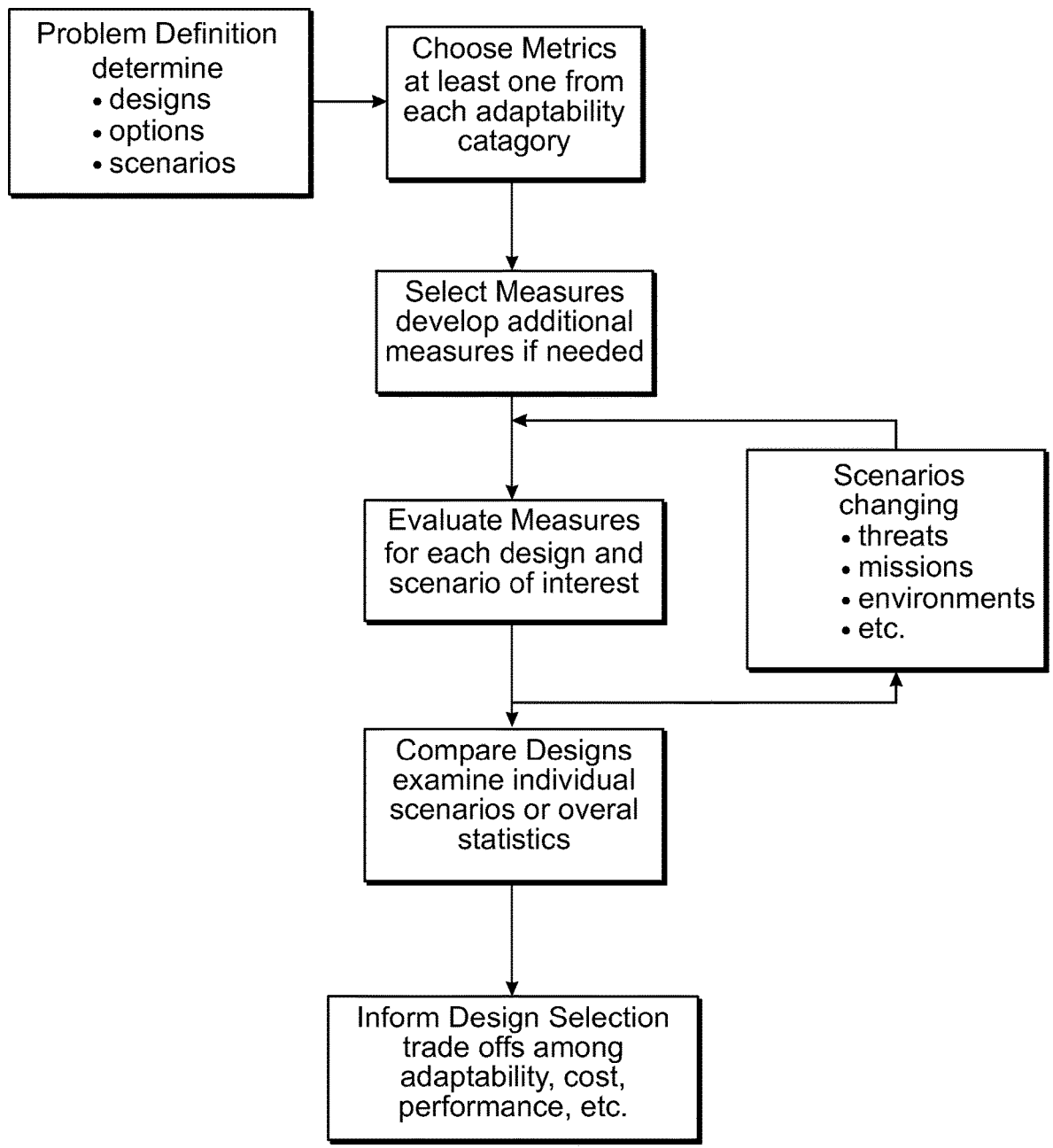
FIG. 2 is a flow diagram for adaptability assessment according to an exemplary embodiment of the disclosure.

FIG. 2 shows a diagram of a method to determine which of a set of designs for an SoS would be best for a given mission according to an exemplary embodiment of the present disclosure. The steps may vary based on application-specific requirements. Details could vary from implementation to implementation, for example by iterating among a subset of the steps to broaden the range of designs or scenarios considered based on preliminary results. In the following, each step is discussed in greater detail.

Referring to FIG. 2, the method includes the following steps:

Problem Definition.

Before starting, it is necessary to have a clear definition of the problem to be solved; the basic designs that are to be evaluated, including any options that each design may have; and the kinds of scenarios for which improved adaptability and performance are desired.

Choose Applicable Metrics.

The metric list has been made as general as possible so that it can be applied to a wide range of different problems (from a single device to a large SoS like a supply chain, for example). However, because of the generality, not all metrics will apply to a given situation. Thus, the first step is to consider each metric in the list and determine whether it is applicable to the systems being evaluated. The metrics were introduced above and are discussed in greater detail in the following discussion. As previously discussed, there are five categories of metrics: Changeability, Composition, Organization, Robustness, and Performance. The first three categories encompass the ideas most usually associated with adaptability. The fourth category, Robustness, is complementary, and includes attributes like overdesign and durability, which can enable a system to meet some changing circumstances without modification. The fifth category, Performance, contains metrics that can be used to judge how successful a system has been at adapting, such as availability, and metrics that potentially need to be traded off against adaptability, such as cost and sustainability. At least one metric should be chosen from each category, since the categories represent different aspects of adaptability.

Select Appropriate Measures.

The detailed discussion in the next section includes possible measures for the metrics, but they are intended only as examples. The best measure to use for a given metric depends strongly on the particular situation, so the measures listed should be considered a starting point. Additional measures might need to be developed for the particular metrics depending on the situation.

Evaluate Measures.

Apply the quantitative measures selected or developed in the previous step to the system designs of interest for a variety of change scenarios of interest. As an example and as discussed later in this disclosure, software contained in a computer system and computer program product can be used to generate scenarios and evaluate metrics for a simplified military deployment problem.

Scenarios.

The scenarios used for the evaluation step can include many types of changes appropriate to comparison of the systems, including changing threats, missions, budgets, environments (e.g., changing weather conditions, natural disasters), etc. The comparison could be done for a set of fixed scenarios, but stochastic simulations with random variation of important variables can be more appropriate. Random variations (for example, of the timing and magnitude of changes in threat or mission) introduce unpredictability and allow evaluation of how well a given design is able to cope with this unpredictability. A major issue with adaptability is how to handle unforeseen (and even unforeseeable) situations. An approach to addressing such possibilities could be to include some random loss or degradation of system functions in the scenarios in addition to the "expected" losses and degradations caused by known threats, changes in environments, etc.

Compare Designs.

The designs of interest can be compared for particular scenarios, or for the entire set of scenarios by using suitable statistical measures. For each design, measures of both adaptability and performance should be compared in order to determine, for the particular set of designs and scenarios, which adaptability metrics are the best predictors of performance. It is also possible to define a single overall adaptability value by using a weighted combination of all the adaptability measures being used (see the discussion of SoS Adaptability Index (SoSAI, below). Knowledge gained from the design comparison could potentially be applied to similar situations (i.e., similar designs/scenarios) without having to rerun the entire method.

Inform the Design Selection.

The final step is to use the quantitative comparison results to help select the "best" design(s), where "best" refers to the design that best meets the given criteria and requirements. The selection is informed by the insight gained from the measures of adaptability and performance, but other sources of information can be used as well. It is important to note that tradeoffs will likely be necessary. As an example, the most adaptable design might not be the lowest-cost design, so additional weightings might be needed, to define the relative importance of adaptability, cost, performance, etc. If two or more designs are ranked very closely, the tie can be broken by going back and evaluating additional scenarios or additional variations within the original scenarios.

The metrics for use in measuring adaptability are generally discussed above. Table 3 provides an example of categories, metrics and measures according to an embodiment of the invention. As can be seen, Table 3 contains a more detailed summary of the metrics, and further discussion is presented in following subsections.

TABLE 3

Summary of Adaptability Concepts, Metrics, and Measures

| Metric | Example Measures |
|---|---|
| Category 1: Changeability (Reconfigurability) | |
| Mobility | mobile fraction of systems, average time to relocate systems (could be calculated over all systems or over a functional collection [FC] of systems) $$\text{fraction\_mobile} = \frac{N_{mobile\_sys}}{N_{sys}} \quad t_{relocate\_ave} = \frac{\sum_{j=1}^{N_{sys}} t_{relocate_j}}{N_{sys}}$$ |
| Logistics Capability | average on-time delivery (fraction of orders successful or that fail), average order fill time, average recovery time (average downtime or idle time per order), logistics utilization, logistics capacity $$\text{fraction\_ontime\_orders} = \frac{N_{ontime\_orders}}{N_{orders}} \quad t_{order\_ave} = \frac{\sum_{n=1}^{N_{orders}} t_{order_n}}{N_{orders}}$$ $$t_{recovery} = \frac{\sum_{n=1}^{N_{orders}} t_{down_n}}{N_{orders}}$$ $$\text{logistics\_utilization} = \frac{1}{t_{tot}} \sum_{i=1}^{N_{times}} \Delta t_i \frac{N_{logistic\_sys\_operating_i}}{N_{logistic\_sys_i}}$$ $$\text{shipping\_capacity} = \frac{1}{t_{tot}} \sum_{i=1}^{N_{times}} \Delta t_i \sum_{j=1}^{N_{transports}} Q_{transport_{j,i}}$$ |
| Modifiability | # system changes, # changes in system type, # possible system changes, average time to change $$t_{modify} = \frac{\sum_{j=1}^{N_{sys\_replaced}} t_{replace_j}}{N_{sys\_replaced}}$$ |
| Category 2: Composition (Structure) | |
| Modularity | average # system types per FC (can be restricted to specific system types or FCs) $$\text{modularity} = \frac{\sum_{m=1}^{N_{FC}} N_{sys\_types_m}}{N_{FC}}$$ |

TABLE 3-continued

Summary of Adaptability Concepts, Metrics, and Measures

| Metric | Example Measures |
| --- | --- |
| Diversity | diversity measure (note that in the equation below, the fractions are assumed to be sorted from smallest to largest) |

$$\text{diversity\_measure} = \frac{1}{N_{FC}} \sum_{m=1}^{N_{FC}} \frac{N_{sys\_types_m}}{1 + \sum_{k=2}^{N_{sys\_types_m}} (\text{frac}_{k,m} - \text{frac}_{k-1,m})}$$

| | |
| --- | --- |
| Substitutability | # replacement consumables or systems (could be calculated over all systems or over an FC)-see Redundancy for systems substitutability |
| Storage | fraction of spares, average consumable inventory level, average consumable usage over storage capacity, storage utilization (could be restricted to specific consumables) |

$$\text{fraction\_spares\_stored} = \frac{1}{t_{tot}} \sum_{i=1}^{N_{times}} \Delta t_i \frac{N_{consumables\_stored_i}}{N_{consumables_i}}$$

$$\text{storage\_utilization} = \frac{1}{t_{tot}} \sum_{i=1}^{N_{times}} \Delta t_i \frac{N_{consumables\_stored_i}}{N_{storage\_capacity_i}}$$

| | |
| --- | --- |
| Integratability | degree of standardization (e.g., compatibility and common interfaces), change in resource load, change in existing system (e.g., number of connections) |

Category 3: Organization

| | |
| --- | --- |
| Self-Organizing Ability | decentralization/hierarchy (# levels of system types), strategy-anticipation, hedging, on-demand (# extra systems not used or # systems idle, # systems deficient or # systems on order, # systems used or # systems operating-input degree of anticipation, hedging), responsiveness to an adaptive enemy (average strength ratio) |

$$\text{strength\_ratio} = \frac{1}{t_{tot}} \sum_{i=1}^{N_{times}} \Delta t_i \frac{SoS_{strength_i}}{AE_{strength_i} + SoS_{strength_i}}$$

| | |
| --- | --- |
| Scalability | overhead change (e.g., supporting infrastructure) or efficiency change per unit, economies of scale, tipping points, centralization/decentralization |
| Complexity (Connectedness) | degree (average # connections per system), # dependents, path length, # nodes, # edges |

$$\text{average\_degree} = \frac{1}{t_{tot}} \sum_{i=1}^{N_{times}} \Delta t_i \frac{\sum_{j=1}^{N_{sys_i}} N_{connections_{j,i}}}{N_{sys_i}}$$

Category 4: Robustness

| | |
| --- | --- |
| Redundancy | fraction of redundant systems (could be calculated over all systems or over an FC), fraction of stand-in redundant or substitute systems, time-averaged fraction of redundant or substitute coverage |

$$\text{fraction\_redundant\_sys} = \sum_{j=1}^{N_{sys}} \frac{N_{sys\_w\_backup_j}}{N_{sys_j}}$$

$$\text{average\_backup\_coverage} = \frac{1}{t_{tot}} \sum_{i=1}^{N_{times}} \Delta t_i \frac{\sum_{j=1}^{N_{sys_i}} \min\left(1, N_{subs\_sys_{j,i}} + N_{backup\_sys_{j,i}}\right)}{N_{sys_i}}$$

TABLE 3-continued

Summary of Adaptability Concepts, Metrics, and Measures

| Metric | Example Measures |
|---|---|
| Overdesign (Growth Potential) | excess capacity (e.g., average number of idle systems or average fraction of unused fuel storage), average time unchanged |

$$\text{average\_idle\_sys} = \frac{1}{t_{tot}} \sum_{i=1}^{N_{times}} \Delta t_i \cdot N_{idle\_sys_i}$$

$$\text{fraction\_unused\_fuel\_storage} = \frac{1}{t_{tot}} \sum_{i=1}^{N_{times}} \Delta t_i \frac{V_{unused\_fuel\_storage_i}}{V_{tot\_fuel\_storage_i}}$$

$$\text{average\_time\_unchanged} = \frac{\sum_{j=1}^{N_{sys}} t_{unchanged_j} / t_{tot}}{N_{sys}}$$

| | |
|---|---|
| Reparability | average mean time to repair (MTTR) (could be calculated over all systems or over an FC) |

$$\text{average\_MTTR} = \frac{\sum_{j=1}^{N_{sys}} MTTR_j}{N_{sys}}$$

| | |
|---|---|
| Durability | system lifetime (time, # operations, # miles), mean time between failures (MTBF) |

Category 5: Performance

| | |
|---|---|
| Cost | implementation cost, O&S cost, total consumable use (e.g., fuel) |

$$\$_{implementation} = \sum_{j=1}^{N_{sys}} \$_{implementation_j} \quad \text{tot\_fuel\_usage} = \sum_{i=1}^{N_{times}} \Delta t_i \sum_{j=1}^{N_{sys}} Q_{j,i}$$

| | |
|---|---|
| Availability | operational availability ($A_O$), sustainment availability ($A_S$), SoS availability ($A_{SoS}$), downtime, time with needed inputs not available |

$$A_{SoS} = \frac{1}{t_{tot}} \sum_{i=1}^{N_{times}} \Delta t_i \max_{\substack{j=possible \\ \text{"success-path"} \\ combinations}} \left[ \min_{\substack{k=SP \\ requirements}} \left( \frac{N_{operating|operable_{k,j,i}}}{N_{required_{k,j,i}}} \right) \right]$$

| | |
|---|---|
| Efficiency/ Sustainability | fuel usage, consumable usage, spares usage, idle-time fraction, ratio of power available to power needed (excess power ratio), power utilization |

$$\text{excess\_power\_ratio} = \frac{\sum_{i=1}^{N_{times}} \Delta t_i \sum_{j=1}^{N_{gen}} Q_{j,i}}{\sum_{i=1}^{N_{times}} \Delta t_i \sum_{j=1}^{N_{gen}} Q_{j,i}^{tot}}$$

| | |
|---|---|
| Survivability (Hardness) | ability to withstand threats (e.g., downtime due to combat damage), # systems not killed, # fatalities, average number of systems in vulnerable locations |

$$\text{combat\_damage\_downtime\_frac} = \frac{\sum_{j=1}^{N_{sys}} t_j^{damaged}}{\sum_{j=1}^{N_{sys}} t_j^{tot}}$$

Figure 3:
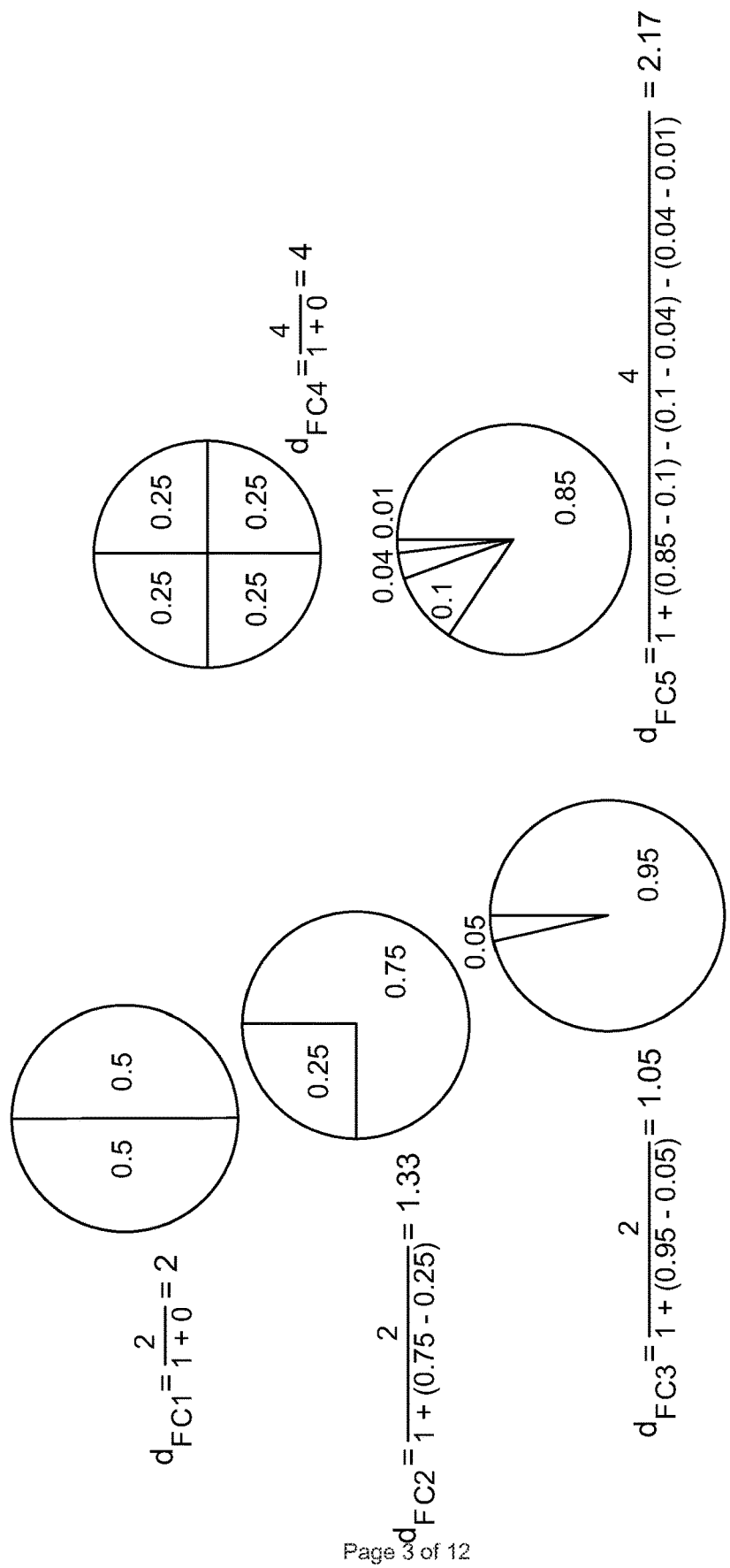
FIG. 3 shows examples for the SoS diversity measure according to an exemplary embodiment of the disclosure.

As reflected in FIGS. 1 and 3, there are several major approaches to adaptability. The first to be discussed here is changeability. An ability to change in response to changing conditions is clearly one way of being adaptable. Reconfigurability may be considered as one of the "evolvability design principles," and reconfigurability aids evolvability through enabling the system to change easily over time by removing, substituting, and adding new elements and functions, or simply relocating existing elements and functions. Three types of changeability are included in this exemplary list of metrics: mobility, logistics capability, and modifiability.

One way to change in response to changing conditions is to move to another place where conditions are more favorable. For example, mobility may be discussed in the context of adapting to environmental changes. Thus, mobility is included as an adaptability metric.

Possible measures of mobility in an SoS are the fraction of systems that are mobile and the average time to relocate systems. Depending on the situation, it might be desirable to calculate the fraction or the average over all systems in an SoS or over a subset, such as a functional collections of systems (e.g., power-generation systems).

Changing or reconfiguring an SoS in response to changing conditions might require ordering parts, fuel, or even new systems. Thus, logistics capability (the ability to place orders and send and receive shipments efficiently and in sufficient volume) can be an important aspect of adaptability. There are many possible measures of logistics capability, which can be more or less applicable to any given situation:
    average on-time delivery (fraction of orders successful and fraction of orders that fail);
    order turnaround time, or the amount of time it takes to resupply systems from the time an order placed until it is fulfilled;
    order failure rate or number of order failures (for example, when resupply is too late);
    average recovery time (average downtime or idle time per order of critical supplies);
    logistics utilization (for example, the fraction of systems involved in logistics—e.g., delivery trucks—that are operating at any given time);
    shipping capacity.

Modifiability refers to how easy it is to change individual systems or to change to different systems in an SoS. It is difficult to quantify the ease of change, so exemplary measures for this aspect of adaptability have to do with how many times changes are made, or how often, or how long it takes to make a change:
    number of changes to systems in an SoS;
    number of changes in system types;
    average time it takes to replace a system;
    number of possible system changes.

Various aspects of the composition or structure of a system or SoS can affect its adaptability. Aspects included in our list of metrics are modularity, diversity, substitutability, storage, and integratability.

Modifiability refers to how easy it is to change individual systems or to change to different systems in an SoS. It is difficult to quantify the ease of change, so exemplary measures for this aspect of adaptability have to do with how many times changes are made, or how often, or how long it takes to make a change:
    number of changes to systems in an SoS;
    number of changes in system types;
    average time it takes to replace a system;
    number of possible system changes.

Various aspects of the composition or structure of a system or SoS can affect its adaptability. Aspects included in our list of metrics are modularity, diversity, substitutability, storage, and integratability.

Modularity makes it easier to change configurations or make substitutions if needed, so it is expected that a modular SoS would be more adaptable. Modularity can be considered an "evolvability design principles." A possible way to measure modularity is to consider how many different types of systems compose an SoS. A modular SoS would have fewer different types because of the standardization implied by modularity. Thus, one measure of modularity is simply the number of different system types in an SoS. An elaboration of this simple measure would be to break the SoS into different functional collections and determine the average number of system types per functional collection (FC). A functional collection is a set of systems that all have the same basic function. An example would be power-generation systems, which could include diesel generators, solar panels, etc. If all of the power-generation systems were the same (perhaps a particular type of diesel generator), that would be indicative of a modular SoS. If there were many different types, that would be a non-modular SoS.

Diversity is almost the opposite of modularity. Under some conditions, having a variety of different system types is preferable to having only a single type. This is the basis of biological evolution: Organisms have a range of characteristics. If conditions change, different characteristics might be preferred than were preferred under the old conditions, so different organisms might become successful. The same concept can apply to SoS under changing, uncertain conditions.

According to an embodiment, the following formula can be used to measure diversity:

$$\text{diversity\_measure} = \frac{1}{N_{FC}} \sum_{m=1}^{N_{FC}} \frac{N_{sys\_types_m}}{1 + \sum_{k=2}^{N_{sys\_types_m}} (frac_{k,m} - frac_{k-1,m})}.$$

In this formula, the basic measure of diversity for a functional collection of systems is $$\frac{N_{sys\_types}}{1 + \sum_{k=2}^{N_{sys\_types}} (frac_k - frac_{k-1})},$$

so the overall diversity measure is simply the average diversity over all FCs.

Here, $N_{FC}$ is the number of functional collections of interest in the SoS, $N_{sys\_types}$ is the total number of system types in the functional collection, and $frac_k$ is the fraction of the overall functional-collection function that is performed by system type k. The basic measure gives a greater values, and thus rewards, (1) SoS with greater numbers of different systems in a functional collection, and (2) SoS which more equally divide the performance of their functions among different systems.

The rationale of the basic measure for an FC is that maximum diversity is obtained when there are equal contributions of the system types and there is minimum diversity when one type is dominant. To apply the formula, it is necessary that the fractional contributions of different system types be sorted from smallest to largest so that the terms ($frac_k - frac_{k-1}$) are all nonnegative.

FIG. 3 shows an example of SoS diversity measure. As can be seen in FIG. 3, if the systems are equally divided, the diversity measure just reduces to the number of system types (2 and 4 for the top two examples). If one system type is dominant, the diversity measure is smaller than the number of system types, being ever smaller the more the FC is dominated by one system type (1.33 for the middle example on the left vs. 1.05 for the bottom example on the left). To complete the example, we can suppose that the overall SoS is composed of the four FCs in FIG. 3, then the overall diversity measure is the average of the FC diversities: $d_{SoS}$=average (2, 1.33, 1.05, 4, 2.17)=2.11. Note, by the way, that the fractions should not be determined by the number of systems in each group, but by the contribution to the functionality. Thus, 200 kW of power generation composed of four 10-kW diesel generators, two 30-kW wind turbines, and one 100-kW solar array would have fractions of 0.2, 0.3, and 0.5, which would lead to a diversity measure of 2.31.

Substitutability is an aspect of adaptability that is closely related to modularity and diversity. The whole point of modularity is that the modules are easily substituted if need be. And diversity is useful to the extent that the diverse system types can be substituted for each other. Thus, it is probably not appropriate to use all three of these metrics for a given problem; one or the other of them might be the best choice depending on the situation. If all of them were used, they would be expected to be highly correlated. Substitutability is included because it is important to adaptability and resilience. Substitutability is a feature that enhances the adaptive capacity that contributes to system resilience.

A possible measure related to substitutability is quantity of replacement parts, consumables, or systems kept on hand. Substitutability is related to redundancy, which is discussed below under Robustness.

Storage is related to the concepts of modularity and substitutability, in that storage of extra parts, consumables, or systems enhances the ability to substitute them when needed. Possible measures of storage include the fraction of spare parts or consumables stored (that is, the ratio of the quantity stored to the quantity in service), the average inventory of spare parts or consumables, the ratio of the usage rate of spare parts or consumables to the storage capacity for them, and the storage utilization (ratio of the quantity of spare parts or consumables stored to the storage capacity for them). The tool, dSoS, that includes dSoS software may include calculation of one measure related to storage, that being the average amount of fuel present at the command outpost (COP).

Integratability (integrability) is also related to the concepts of modularity and substitutability. It refers to the ability to integrate the parts of a system or SoS into the whole. Integrability may be referred to as one of the evolvability design principles that may be characterized by compatibility and common interfaces. This goes hand-in-hand with modularity; modules are only as good as the interfaces through which they interact. Possible measures of integratability include the degree of standardization (e.g., compatibility and common interfaces), and the amount of change needed to a system (e.g., to the number of system connections) and to resources to switch from one type of system to another or to add or subtract systems.

The organization of an SoS obviously affects its ability to adapt to changing conditions (for example, a hierarchical organization might be expected to be more rigid and inadaptable than a decentralized organization). Aspects of organization included in our list of metrics are self-organizing ability, scalability, and complexity (connectedness).

Adaptive capacity may be considered as one of the intrinsic characteristics that contribute to system resilience, and it is possible to equate adaptive capacity to the degree to which the system is capable of self-organization for recovery of system performance levels. Self-organizing ability may be considered as a set of properties that reflect actions that result from ingenuity or extra effort over time, often in response to a crisis situation. Some possible measures related to self-organizing ability are as follows.

A measure of the degree of hierarchy or decentralization is the number of levels in the hierarchy of systems in the SoS. Only one or two levels would indicate a rather decentralized organization, whereas many levels would indicate a hierarchical organization.

The strategies that an SoS uses to respond to needs are a reflection of the ability to self-organize. For example, strategies for ordering spare parts or consumables include anticipation (extrapolating current rates and ordering early so they are available when needed), on-demand (only ordering when needed), and hedging (somewhere in-between—"hedging your bets" to try to avoid having too much or too little inventory). Measurable quantities that can provide an indication of the degree to which these strategies are being used include the number of extra or idle systems, the number of systems deficient or on order, and the number of systems in use or operating. If known, the degree of anticipation or hedging in ordering can be used directly.

In a military simulation, a possible measure of the success in anticipating and responding to enemy attacks is the average strength ratio (the ratio of the SoS strength to enemy strength or to the combined SoS plus enemy strength, averaged over time or over attacks).

Scalability refers to how things scale as an SoS gets larger. Does the efficiency per unit increase or decrease? Are there economies of scale? Are there tipping points, where efficiency, cost, etc. increase or decrease drastically? Scalability is another of the "evolvability design principles." Note that scalability is related to centralization/decentralization, and decentralization is another of the "evolvability design principles." Possible measures of scalability include overhead change (e.g., supporting infrastructure needed) or efficiency change per unit as the number of units increases.

Complexity is an aspect of adaptability, though it can be an advantage or a disadvantage under different circumstances. In network terms, complexity refers to how interconnected the systems (network nodes) are. A highly interconnected system could be very adaptable if the connections represent something like communication paths (e.g., if a communication link is cut off, the communications are easily routed by other paths) but very inadaptable if the connections represent something like requirements (if every system depends on every other system, then failure of one system would cause all of the others to fail as well). Some basic measures from network theory are number of nodes, number of edges (connections), degree (number of connections per node), number of dependents (in-degree or out-degree for directed connections), and path length (shortest path between two nodes). The tool, dSoS, that includes the dSoS software may include calculation of one measure related to complexity: the average number of edges (connections) in the fuel-delivery network.

Robustness represents a different approach to adaptation. Rather than flexibility to change if needed, a robust SoS can meet many challenges without needing to change. Vugrin et al. (2010) discuss system robustness as being a feature that enhances the absorptive capacity that contributes to system resilience. Aspects of robustness included in our list of metrics are redundancy, overdesign (growth potential), repairability, and durability.

System redundancy may be considered as being a feature that enhances the absorptive capacity that contributes to system resilience, but we consider redundancy to be simply one form of robustness. If a system or SoS has a lot of redundancy, then it is able to continue functioning if some of the redundant systems are incapacitated under adverse conditions. Possible measures of redundancy include the fraction of systems that are redundant or that have backups or possible substitutes. Variants would be to calculate based on initial conditions, instantaneous conditions, or average over time.

Overdesign, or overbuild, refers to designing in extra capacity to allow for future growth. This is obviously related to redundancy, as the additional capacity is redundant, at least initially. Possible measures of overdesign include the amount of excess capacity (e.g., the average number of idle systems or the average fraction of unused fuel storage), and the average time that the overall SoS or a subsystem or FC goes without changes. The tool that includes the dSoS software may include calculation of one measure related to overdesign: the average number of idle systems at the COP.

One of the intrinsic characteristics that contribute to system resilience is restorative capacity, which is defined as "the ability of a system to be repaired easily," which may be referred to as repairability. A possible measure of repairability is the mean time to repair (MTTR), which is the amount of time it takes to repair a system when repairs are needed. As an adaptability measure, the MTTR could be averaged over all systems in an SoS, or possibly only over a particular FC.

Durability is clearly an aspect of robustness. If a system is durable, it will need fewer repairs, have less downtime, and be more likely to be available when needed. Possible measures of durability include system lifetime (in terms of time, distance, number of operations, etc.), mean time between failures (MTBF), and mean downtime.

For a system with n contributing components, MTBF can be calculated as follows:

$$MTBF = \frac{1}{\sum_{i=1}^{n} FR_i},$$

where $FR_i$ is the failure rate of component i.

The mean downtime of the system is given by $$\text{Mean Downtime} = \frac{\sum_{i=1}^{n}(FR_i * DT_i)}{\sum_{i=1}^{n} FR_i},$$

where $DT_i$ is the downtime of component i.

The mean downtime is therefore the sum of the individual component downtimes weighted by their failure rates and multiplied by the MTBF.

Figure 4:
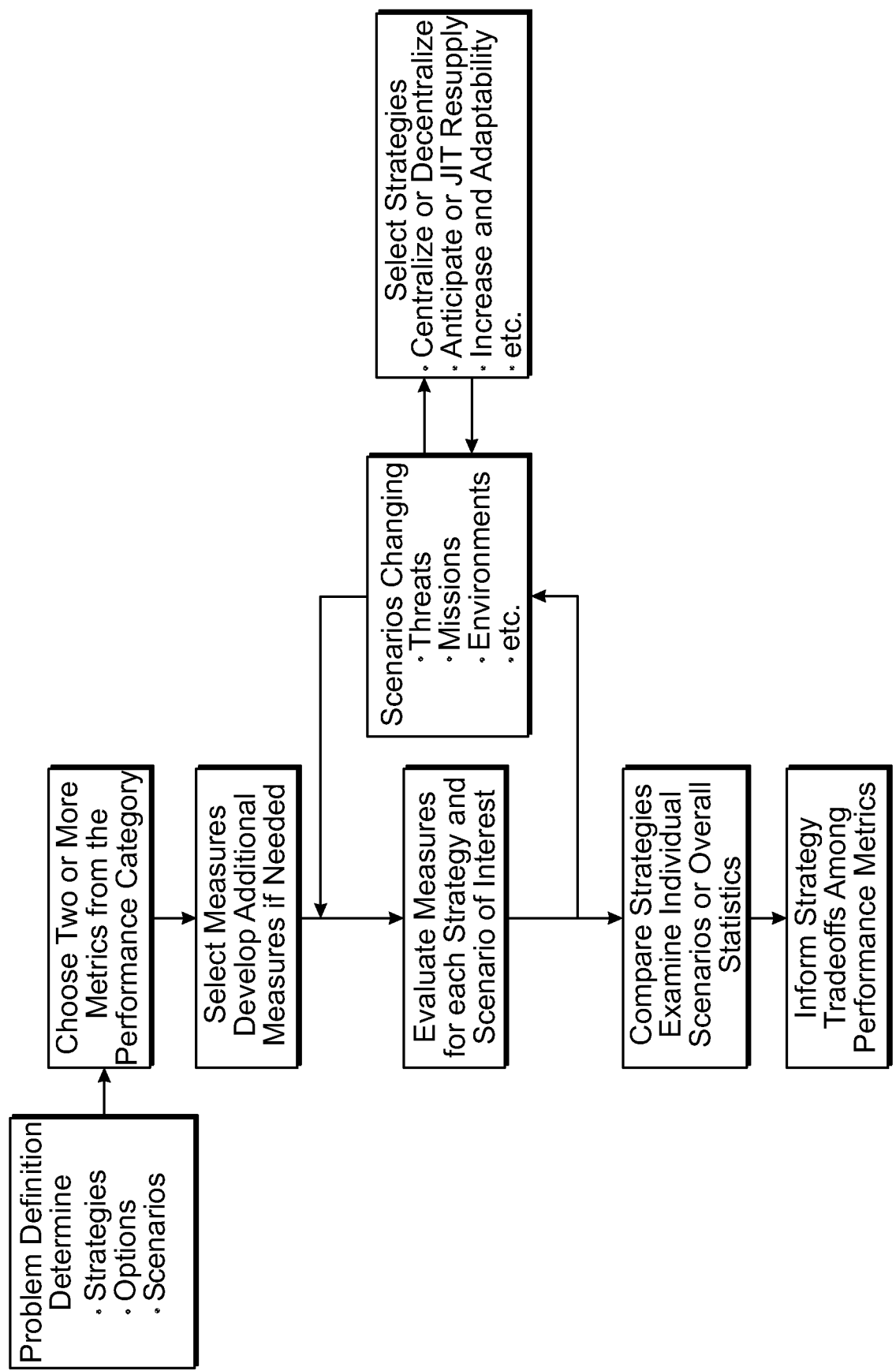
FIG. 4 shows a diagram of a method to determine which strategies for operating an SoS would be best for changing missions, threats, and environments according to an exemplary embodiment of the present disclosure.

FIG. 4 shows a diagram of a method to determine which strategies for operating an SoS would be best for changing missions, threats, and environments according to an exemplary embodiment of the present disclosure. The steps may vary based on application-specific requirements. Details could vary from implementation to implementation, for example by iterating among a subset of the steps to broaden the range of strategies or scenarios considered based on preliminary results. In the following, each step is discussed in greater detail.

Referring to FIG. 4, the method includes the following steps:

Problem Definition.

Before starting, it is necessary to have a clear definition of the problem to be solved; the basic strategies that are to be evaluated, including any options that each strategy may have; and the kinds of scenarios for which improved adaptability and performance are desired.

Choose Metrics.

Metrics should be chosen from the Performance category including cost, availability, efficiency, sustainability, and survivability. Metrics from the other adaptability categories can be chosen (if applicable) to give a complete picture of the effects of different strategies. Due to the generality of the Performance metrics list, not all metrics will apply to a given situation. Thus, the first step is to consider each metric in the list and determine whether it is applicable to the systems being evaluated.

Select Measures.

The detailed discussion above includes possible measures for the metrics, but they are intended only as examples. The best measure to use for a given metric depends strongly on the particular situation, so the measures listed should be considered a starting point. Additional measures might need to be developed for the particular metrics depending on the situation.

Evaluate Measures.

Apply the quantitative measures selected or developed in the previous step to the system designs of interest for a variety of change scenarios of interest. As an example and as discussed later in this disclosure, software contained in a computer system and computer program product can be used to generate scenarios and evaluate metrics for a simplified military deployment problem.

Scenarios.

The scenarios used for the evaluation step can include many types of changes appropriate to comparison of the systems, including changing threats, missions, budgets, environments (e.g., changing weather conditions, natural disasters), etc. The comparison could be done for a set of fixed scenarios, but stochastic simulations with random variation of important variables can be more appropriate. Random variations (for example, of the timing and magnitude of changes in threat or mission) introduce unpredictability and allow evaluation of how well a given design is able to cope with this unpredictability. A major issue with determining acceptable strategies is how to handle unforeseen (and even unforeseeable) situations. An approach to addressing such possibilities could be to include some random loss or degradation of system functions in the scenarios in addition to the "expected" losses and degradations caused by known threats, changes in environments, etc.

Select Strategies.

Strategies that can impact the way systems deal with uncertain future conditions include, but are not limited to, the following:

centralize or decentralize the decision-making for changes in system configuration; e.g., for decentralization, allowing a subsystem to decide whether to increase or decrease in number independently of the rest of the system;

on-demand meeting of functional needs; e.g., only order fuel based on current need;

anticipation of future functional needs; e.g., order more fuel in anticipation of increased demand;

hedging of future functional needs; e.g., order half of the fuel anticipated of increased demand;

outsourcing of functional needs; e.g., use contractor resupply for certain consumables;

increasing adaptability by taking steps that increase one or more other adaptability metrics; e.g., because of poor reliability increase redundancy or logistics capability.

Changes in conditions that could affect the system during the simulation include, but are not limited to, the following:

threat environment: targets, frequency of attack, method of attack, etc.;

mission environment: offensive, defensive, peacekeeping, humanitarian, etc.;

natural environment: weather (cold, heat, sandstorms, etc.), terrain, etc.;

natural disasters: flood, hurricane, tornado, earthquake, tsunami, volcanic eruption;

external economic pressures; e.g., disruption of supply chain;

budgetary pressures for maintaining or updating the system;

reduced number of operating or operable parts/systems of a given type because of reliability issues, overuse of consumables (e.g., fuel), combat damage, or other events; e.g., desert operations decrease vehicle reliability.

The strategies are tied to quantitative actions that can effect a measurable change in system configuration and system behavior. The actions include, but are not limited to, the following:

increase or decrease the number of subsystems (or systems within an SoS); e.g., increase the stockpile of spares by 10%;

increase or decrease the consumables stored; e.g., decrease fuel storage at downstream facilities by 50,000 gallons;

replace system components (or systems within an SoS); e.g., replace 100 tanks with 50 heavy guns;

add or subtract interconnections with other subsystems (or systems within an SoS); e.g., reconnect all fuel-transport connections to a new supplier.

The strategies are made usable by corresponding strategic change rules. Each strategy of interest is accorded one or more rules. Conceptually, rules are defined as a couplet consisting of one or more conditions and one or more actions. For example, if the existing threat changes to attacking convoys (the condition), then switch fuel transport to helicopter delivery (the action). Rules are specified initially and can either remain constant throughout a simulation or can change the behavior of the system as the simulation progresses or as conditions change.

Compare Strategies.

The strategies of interest can be compared for particular scenarios, or for the entire set of scenarios by using suitable statistical measures. Some strategies will typically be better for some scenarios, and other strategies will be better for other scenarios. Also, good strategies in some scenarios will sometimes conflict with good strategies in others. Thus, all strategy choices should be evaluated together to determine the best courses of action. Knowledge gained from the strategy comparison could potentially be applied to similar situations (i.e., similar strategies and scenarios) without having to rerun the entire method.

Inform Strategy Tradeoffs.

The final step is to use the quantitative comparison results to help select the "best" strategies, where "best" refers to the strategies that best meet the given criteria and requirements. The selection is informed by the insight gained from the performance, but other sources of information can be used as well. It is important to note that tradeoffs will likely be necessary. As an example, the most effective strategy might not be the lowest-cost design, so additional weightings might be needed, to define the relative importance of cost and performance.

As a simple example of the strategy-based simulation method applied to a complex system, consider the following. An Army combat outpost (COP), which consists of multiple power generators, fuel tanks, fuel delivery trucks, and accompanying patrol bases (PBs), is modeled. Of interest is a strategy (with a corresponding set of rules) that can be effective given possible changes in missions and threat environments. During the simulation, missions and threats are changed at random times and multiple realizations are simulated to incorporate uncertainty. The mission is to supply a number of PBs; a change in the number of PBs is considered to be a change in mission. The threats are combat damage to COP systems; a change in the target is considered to be a change in the threat. Four example simulations could be conducted: (1) a base case initialized to a run without threats, where all PBs are functional. (2) a global on-demand-strategy case where the rule is that whenever a system is inoperable (e.g., because of combat damage or reliability issues), a replacement is ordered from a forward operating base; (3) a global anticipation-strategy case where the rule is that two replacements are ordered for an inoperable system, under the assumption that such systems are likely to become inoperable more often; (4) a decentralization-strategy case where COP systems that are better protected from combat damage (the generators and fuel tanks) operate by on-demand rules and the other COP systems operate by an anticipation rule. In this simple example, the rules are set to be constant during the simulations to allow system performance evaluation given the various strategies. Dynamically chosen rules could be used to investigate other aspects of the problem, such as whether it is beneficial to change strategy based on the situation. During the simulations, the mission availability of the COP is monitored; here, mission availability is defined as the time-weighted percent of PBs that are functional. The four simulations are then conducted and the results compared. By comparison with the basecase, it is possible to determine the operational strategy (among those evaluated) that best supports the mission of the COP. The cost of each strategy could also be determined based on the number and cost of systems in the simulation. The overall cost could then be compared and, because cost could be inversely related to the availability, it could be traded off with the availability results. In this way, the performance of the COP under different strategies, especially with regard to its adaptability to different threats, can be evaluated—a capability that has been heretofore nonexistent.

In an embodiment and as further discussed below in application to an example, this tool can be used to calculate two measures related to logistics capability: the time required to resupply patrol bases from the time the order is placed until it is fulfilled and the fraction of failed orders. As discussed previously, performance and health metrics provide a basis for comparison of adaptability. For example, if two competing designs are put through the same set of stressing scenarios, the one with the better performance is presumable more adaptable. As with the adaptability metrics, the applicability of the performance metrics will vary depending on the system or SoS under study. It is also important to note that differences are expected among the performance metrics. It is likely that the SoS with better availability or survivability will have higher cost; therefore, tradeoffs will be necessary. The aspects of performance discussed here, out of cost, availability, efficiency, sustainability, and survivability, are cost and availability.

Cost is obviously an important consideration, and one that often goes against other performance measures. The usual cost categories are implementation cost, which is the up-front cost, and operation & support (O&S) cost, which is spread out over time and is usually expressed as a time rate. Total cost is the sum of both, and depends on the expected or actual time period involved.

Aside from actual cost, other quantities can be used as stand-ins or surrogates for cost. For example, total fuel usage could be a measure of cost (one part of O&S cost). Total number of systems could be used as a measure of cost (assuming no large discrepancies in the cost per system). The tool, dSoS, that includes the dSoS software includes calculation of one measure related to cost: the total amount of fuel used (see below).

Generally speaking, availability is the fraction of time that a system or SoS is available to perform its function. Several specific measures of availability are used, with differences in exactly what it means to be available. Two common measures for military SoS are operational availability ($A_O$) and sustainment availability ($A_S$). Mission availability can also be defined as the amount of time that systems are actually available to perform a mission divided by the amount of time they were supposed to be available, and energy availability as the amount of time that energy is actually available versus total mission time. Simpler measures related to availability include downtime and time with needed inputs not available (e.g., number of hours with no fuel); these are in a sense opposites of availability (larger downtime implies smaller availability).

The present disclosure also includes a new availability measure called SoS availability ($A_{SoS}$), which takes into account the possibility of stand-in redundancy, meaning the possibility of systems with similar functions being able to substitute for each other. The definition of $A_{SoS}$ starts with a set of functions and a set of "success paths" for each function. A success path is list of system types and their count such that if they are operating there is a full level of success for the function. An example helps to explain the concepts.

Consider two functions: targeting and lethality, both of which can use UAVs. Targeting can be done with any combination of two UAVs (U) or satellites (S). Specifically there are 3 success paths for targeting:
1. 2U
2. 1U+1S
3. 2S Lethality can be accomplished with any combination of three Apache helicopters (A) or UAVs. Specifically there are 4 success paths for lethality:
1. 3A
2. 1U+2A
3. 2U+1A
4. 3U The combined success paths are ordered pairs of the success paths: (1, 1), (1, 2), . . . , (3, 4). Here (1, 1) means the combination of 2U for targeting and 3A for lethality. Stand-in redundancy comes in for a combination like (1, 3), which is a combination of 2U for targeting and 2U+1A for lethality. If we assume that the 2U can be used for both targeting and lethality, then (1, 3) collapses to 2U+1A. If the 2U cannot be used for both targeting and lethality, then success path (1, 3) would instead require 4U+1A. Such choices would have to be specified as part of the problem.

With this background, then, $A_{SoS}$ is defined as follows:

$$A_{SoS} = \frac{1}{t_{tot}} \sum_{i=1}^{N_{times}} \Delta t_i \max_{\substack{j=possible \\ \text{"success-path"} \\ combinations}} \left[ \min_{\substack{k=SP \\ requirements}} \left( \frac{N_{operating|operable_{k,j,i}}}{N_{required_{k,j,i}}} \right) \right],$$

which is just the time average of the instantaneous SoS availability:

$$\max_{\substack{j=possible \\ \text{"success-path"} \\ combinations}} \left[ \min_{\substack{k=SP \\ requirements}} \left( \frac{N_{operating|operable_{k,j}}}{N_{required_{k,j}}} \right) \right].$$

The outer "loop" is the maximum overall success-path combinations (the ordered pairs in the example above). The inner "loop" is the minimum of the numbers available for each system type divided by the number of that system type required for the success-path combination.

To continue the example, suppose that 2U, 0S, and 1A are available. If the U's are able to cover both functions (targeting and lethality), then we know from the example above that 2U+1A are sufficient for combined success path (1,3). If the U's are not able to cover both functions, then the availability calculation would be as shown in 4.

TABLE 4

Example of $A_{SoS}$ Calculation

| Success-path combination (outer loop) | Availability (inner loop) |
|---|---|
| (1, 1) | Required: 2U + 3A |
|  | Avail. = min(2/2, —, 1/3) = 1/3 |
| (1, 2) | Required: 3U + 2A |
|  | Avail. = min(2/3, —, 1/2) = 1/2 |
| (1, 3) | Required: 4U + 1A |
|  | Avail. = min(2/4, —, 1/1) = 1/2 |
| (1, 4) | Required: 5U |
|  | Avail. = min(2/5, —, —) = 2/5 |
| (2, 1) | Required: 1U + 1S + 3A |
|  | Avail. = min(2/1, 0/1, 1/3) = 0 |
| (2, 2) | Required: 2U + 1S + 2A |
|  | Avail. = min(2/2, 0/1, 1/2) = 0 |
| (2, 3) | Required: 3U + 1S + 1A |
|  | Avail. = min(2/3, 0/1, 1/1) = 0 |
| (2, 4) | Required: 4U + 1S |
|  | Avail. = min(2/4, 0/1, —) = 0 |
| (3, 1) | Required: 2S + 3A |
|  | Avail. = min(—, 0/2, 1/3) = 0 |
| (3, 2) | Required: 1U + 2S + 2A |
|  | Avail. = min(2/1, 0/2, 1/2) = 0 |
| (3, 3) | Required: 2U + 2S + 1A |
|  | Avail. = min(2/2, 0/2, 1/1) = 0 |
| (3, 4) | Required: 3U + 2S |
|  | Avail. = min(2/3, 0/2, —) = 0 |

$A_{SoS}$ = max(1/3, 1/2, 1/2, 2/5, 0, 0, 0, 0, 0, 0, 0, 0) = 1/2

The idea in choosing the maximum of the possible availabilities is that the systems are assumed to be deployed in such a way as to maximize the functionality: (1, 2) or (1, 3) in this example. The tool that includes the dSoS software includes calculation of three measures related to availability: the fielded PB availability, the number of hours with no fuel, and the SoS availability (see discussion of dSoS below).

Another performance metric of interest is efficiency, which is related to sustainability. Efficiency is the degree to which something is done well or without wasted energy. Possible measures related to efficiency include the amount of fuel or other consumable usage (low for efficiency), idle-time fraction (low for efficiency), the amount of excess power-generation capability (low for efficiency), ratio of power available to power needed (low for efficiency, but not lower than 1), and power utilization (high for efficiency). The tool, dSoS, that includes the dSoS software includes calculation of two measures related to efficiency: the average number of idle systems and the average excess-power ratio (see below).

If a system or SoS is "hard," or has high survivability, that means that is has the ability to withstand threats with low downtime. Possible measures of survivability include the number of systems not killed and the number of fatalities (low for good survivability). If some locations are more dangerous than others (e.g., higher rate of combat damage), then the average number of systems in these vulnerable locations could be used as a measure of survivability (a system design that is able to limit such exposure would be better). The tool, dSoS, that includes the dSoS software includes calculation of one measure related to survivability: the average number of systems in transit (see dSoS discussion below).

The SoS Adaptability Index provides a method to combine individual adaptability metrics into an overall adaptability measure, and is useful to compare adaptability of different SoS designs. Different designs can address different facets of adaptability; with SoSAI, the different facets can be considered as a cohesive group in an unbiased manner. SoSAI combines only the adaptability metrics relevant to the problem being explored rather than the complete metric set.

To calculate the SoSAI, a standardized weighted average is applied:

$$SoSAI = \sum_{i=1}^{n} w_i \frac{X_i - \mu_i}{\sigma_i}$$

where i is the index for the metrics being calculated for a given trial (i.e., a simulation run corresponding to a mission or scenario), n is the number of metrics being calculated, $X_i$ is the value of a metric, $\mu_i$ and $\sigma_i$ are the arithmetic mean and standard deviation of the metric distribution across all trials, and $w_i$ is the weight for that metric. Typically, n would be a minimum of four, one metric from each of the adaptability categories, as is true in our case. Thus, the SoSAI for each trial or simulation run is the sum of the standardized, relevant individual metrics.

As a starting point, all metrics are weighted as ±1, depending on whether the metric is one that is desirable to maximize (+1) (e.g., storage utilization, availability) or minimize (−1) (e.g., hours without fuel, failed fuel orders, number of idle systems). The default is plus one (+1) for the metrics that are neither maximized nor minimized (e.g., fuel level, ordered replacement systems).

According to another embodiment of the invention, methods, systems and computer program products are disclosed that evaluate the suitability or usefulness of adaptability metrics in the context of an SoS operating under changing environments. Any of the methods, systems and computer program products may be referred to as a tool in the context of this disclosure. The method, system and computer program product, which may be referred to as a "tool," may be referred to as dynamic System of System (dSoS) methods, systems and computer program products, and will be discussed hereafter by referring to dSoS. The purpose of the dSoS is to provide a quantitative analytical method system and tool to answer specific questions concerning the efficiency, effectiveness, and adaptability of dynamic Systems of Systems (dSoS). In an embodiment, dSoS may be used to answer specific questions concerning the efficiency, effectiveness, and adaptability of dynamic Systems of Systems (dSoS) that are important to SoS design and operation, such as, but not limited to national security, power grids, space systems, distribution systems, industrial production, organizational operation and structure, such as, but not limited to military deployment.

Current practice in designing dSoS is to use teams of specialists guided by manuals and databases—but without a holistic assessment of the design or its evolution. In some respects, dSoS resembles complex adaptive systems (CAS), and research in CAS is of academic interest (e.g., community building and social network development using artificial-life techniques and of interest to business (e.g., supply chain management. The disclosed tool, dSoS: (1) concentrates on generally applicable dynamic SoS analytics and the adaptability metrics to evaluate them; (2) incorporates automatic adaptation in multiple executions, with assessment of adaptation metrics in post-processing; (3) develops the capability to provide quantitative answers to questions of efficiency, effectiveness, and adaptation for a dSoS.

Table 5 shows high level requirements for a general purpose exemplary dSoS toolset. The dSoS requirements may be expanded, modified or a subset of the requirements listed in Table 5.

TABLE 5

High level requirements for a general purpose dSoS.

| Post Office & Military | REQ |
|---|---|
| Mission<br>Deliver mail<br>Deploy and sustain patrol bases | dSoS shall provide a means to define mission performance and end conditions, including: mission success, mission failure, and mission duration. Examples of end conditions include blue team availability of key systems <75% and adversary availability <75%.<br>dSoS shall provide a means of describing blue and red team activities (e.g. scenarios), and allow probabilistic definitions of parameters (e.g. time, size of convoys, adversary attack points, etc.) that control the activities. |

TABLE 5-continued

High level requirements for a general purpose dSoS.

| Post Office & Military | REQ |
|---|---|
| | dSoS shall provide a means of describing the activities of an aggregated pool of systems and allow probabilistic definitions of parameters that control the activities. For example, the op tempo of an aggregation could be different for different locations. |
| | Jack's issue: How do we have the analyst set up the triggers/thresholds for adding/closing patrol bases (branch offices) and COPs and FOBs. |
| Model Structure | dSoS shall allow definition of logical |
| Logical locations (versus physical) | locations. Locations can be initially empty. |
| Buildings, facilities, homes - hierarchical | dSoS shall allow definition of system types. |
| Network/topology structure is important (not physical location) and is changeable (continuous and by trigger activation) | dSoS shall allow system type properties, such as capacity and throughput. System types can suffer reliability failures. |
| Physical distance can be represented by delay time between deliveries or communications | dSoS shall allow specification of the number of initial system instantiations |
| Nodes w/properties attributes | within each system type and the location of |
| Capacity, throughput (changeable) (inbound/outbound maximum rate of flow) | each system. |
| Ability to add new nodes based on trigger | dSoS shall be able to add and subtract one or more systems during execution based on |
| Edges w/properties, distances & connections | conditions and trigger activation, including |
| Node and edge Attributes settable and change in response to trigger | meeting a demand, combat damage, environmental damage, strategic goals, and |
| Nodes can be created/destroyed | changing mission. |
| Mobility of Nodes | dSoS shall allow aggregation of one or |
| Edges become available or not (comms) | more systems into a pool, whereby |
| Communications | systems can be managed as a group as |
| Lack of communication could result in: | opposed to individually. |
| delays | Systems within the pool shall inherit the |
| impacts combat damage level | gross behaviors of the pool (e.g., |
| decreased situational awareness | movement, power usage, op tempo). |
| and therefore delay in response to | System properties shall be changeable |
| adaptive enemy | during execution (e.g. rate of flow) based |
| Transportation of information | on conditions and trigger activation. |
| Time scale is seconds to hours | dSoS shall allow definition of connection types (for definition of potential movement or communication between locations). Connection types shall be specified by starting and ending location, the system type or consumables that will use the connection, and the travel time and/or other delay times (for deliveries, communications, order delay times, etc.) for systems over this type of connection. (Note: Information - communications - can be considered a consumable or system type or other.) Other properties of the connection type shall be possible, such as distance, directionality, and capacity. dSoS shall be able to add and subtract connections during execution based on conditions and trigger activation. dSoS shall allow counting the number of trips over a connection or the number of connections, depending on how connections are implemented. (Note: connections can be implemented in at least two different ways: 1) semi-permanent connections that are active or not, 2) only exist when active.) dSoS shall allow selection of functions for each system type. The functions shall include (at least) mobility, storage, C3, protection, transport, power generation, and lethality. The user shall be able to specify properties for each function, such as consumable usage rate and capability of a function (e.g., capacity, throughput) that is assigned to a system type. These properties can include a threshold value associated with a trigger. |

TABLE 5-continued

High level requirements for a general purpose dSoS.

| Post Office & Military | REQ |
|---|---|
| | In order to group and display results, dSoS shall allow hierarchical organization of locations and possibly systems types and aggregated pools. |
| Transport Entities - Trucks, airplanes, humans, etc Model each individual or are they aggregated (e.g. to a fleet)? - aggregating an option Could be an object that has state (e.g. hours since purchased, last repaired), would travel along edges, associated with nodes Different size/type vehicles and quantities Reliability Need to be able to model individual vehicles Need protection force (note: 1 protection vehicle for every 3 cargo vehicles) | See above: system types, system instances, and see above connections dSoS shall provide the ability to probabilistically model failures, repairs, and different SoS, system functions, and connections (e.g. operating, operable, etc.). At a minimum, dSoS systems and connections shall have operable, operating, and inoperable states. dSoS shall provide the ability to model a means to counter or diminish the effects or frequencies of adversary attacks or influences (e.g. FedEx influencing US Post office customers to switch). |
| Consumables User/target Entities - mailboxes, homes Capacity, quantity Customer "consumes" certain amount of mail/packages per day - demand Receiving locations (e.g. COP, PB) Fuel storage tanks - capacity, quantity Applies to consumables: spares, replacement systems, fuel, etc. | dSoS shall allow definition of consumables. Pre-defined consumables shall include fuel, water, and ammunition. The user shall be able to define one or more consumables and indicate what functions use that consumable and at what rate based on system state (demand). dSoS shall allow definition of consumable amount (quantity) for system instances and consumable storage capacity for system types. dSoS shall provide ability to order consumables and systems based on conditions and trigger activation. dSoS shall provide ability to supply consumables and systems based on conditions, triggers (e.g. orders), or user specification. dSoS shall allow definition of supply capacity (weight, volume, supply rates). |
| Transport Capability Ability to assemble "convoy"/delivery based on demand (one entity with a # vehicles it contains) (Assemble individual entities) Demand: weight and volume Capacity: weight and volume Travel time Backlog (number of mail items that have accumulated - maybe part of facility?) Delays due to traffic, accidents, etc. captured in "time to travel" or rate of delivery Income Cost to mail packages (variable) Users bring items to local facility for delivery | dSoS shall provide the ability to transport consumables and systems. dSoS shall allow definition of transport capacity (count, weight, and volume) or transport rates. dSoS shall provide ability to model orders, including order fulfillment, backlog (storage), and queuing. Note: "convoy" is covered under the "pool" concept. Travel time and delays under connections and delay times and delivery rate above dSoS shall provide a means to associate an income amount (which can change over time) with systems instances or consumables (e.g. mail). |
| Expenses facilities, cost to transport, employees Regulations Administrative overhead Expenses Soldiers (versus employees) Adaptive Threat (competition, congress) Targeted at customer nodes Affects demand and income Natural disaster - random loss of function Threat is enemy forces Adaptive enemy (red team) Blue team responds to attacks Properties of an adaptive enemy AE is a finite force AE behavior reinforced by success, diminished by failure ditto for strength AE has a corresponding adaptive blue protective force (PF) of finite force AE can attack blue locations, systems, and connections | dSoS shall provide a means to associate an expense amount (can change over time) with systems instances (e.g. facilities, convoys) or consumables (e.g. fuel). Note: Regulations and overhead could be modeled by their impact on expenses. dSoS shall provide for one or more adaptive enemies (AE). An AE consists of a finite level of resources that can be used in attacks. A property of an attack is the allocation of resources by an AE. An attack can target one or more (actually whatever is on the connection). Note: might want to assign target priorities for systems in a location, pool, connection (might have multiple lists; might be properties of the AEs). dSoS shall provide for a probability of damage to a target given an attack. Damage will be a reduction in functionality or metric value (e.g., income) up to and including complete loss. |

TABLE 5-continued

High level requirements for a general purpose dSoS.

| Post Office & Military | REQ |
|---|---|
| an attack inflicts combat damage<br>combat damage success is governed by a probability<br>blue PF can reduce combat damage | dSoS shall determine the probability of damage as a function of the AE and blue-team resources allocated. Resources can be modeled as explicit systems or more simplified as units of force or resources.<br>dSoS shall provide for a means to increase or diminish AE resources in an attack commensurate with the size and success of the attack. Blue team resources can be ordered using triggers and thresholds (similar to replacing other systems).<br>dSoS shall provide for global threshold levels of AE and blue-team resources and triggers that stop execution once one of the thresholds is crossed (see Mission Requirements).<br>dSoS shall provide for assigning a time-dependent probability or frequency of attack to a location, a pool, and a connection type.<br>dSoS shall provide for increasing (decreasing) the probability or frequency of attack on similar types of targets based on the success (failure) of previous attacks. |
| Business Rules<br>Ability to define business rules<br>Rules changeable<br>Strategies of how to deal with adaptive threats | Note: Business rules would be implemented through thresholds and triggers and corresponding actions.<br>dSoS shall allow trigger thresholds and the actions they trigger to be applied hierarchically or at the individual system or connection (centralization vs. decentralization). |
| Triggers<br>Ability to define metric thresholds<br>"Action" defined based on trigger activation (including attribute value modification and network structure modification) | dSoS shall allow user-definable metric thresholds that can trigger a user-definable action or behavior.<br>Trigger thresholds and actions shall be changeable over time. One possible action could be to change the threshold.<br>Trigger thresholds and actions can be associated with any type or instance of systems, pools, connections, or resources, including both blue and red teams.<br>dSoS shall allow actions such as: attribute value modification, network structure modifications (including addition/deletion of systems), mobility actions, resource changes, etc. |
| Metrics<br>Adaptability Metrics<br>Ability to measure impact of change on system performance<br>Measure of how well threat is dealt with<br>Correlate with success<br>Operational Metrics<br>Ability to define metrics (operational)<br>Evaluate at each time step and/or continuously | dSoS shall provide for defining metrics and tracking metric values, including adaptability and operational metrics.<br>orders and successful orders<br>changes in consumables, systems, connections<br>#triggers triggered and #thresholds crossed |
| End Condition<br>Time<br>In response to trigger<br>Other? | See Mission |

The dSoS capability concentrates on adaptability quantification of SoS, and provides a general capability for evaluating adaptability and the relative effectiveness of decision strategies and rules. An example focused on the military forward basing environment is disclosed below. It should be noted that this example may be modified to different systems and environments as would be appreciated by one of ordinary skill in the art. This environment must have SoS that can change rapidly due to changing mission requirements and significant threat conditions. The dSoS is intended to provide an analytical tool to help evaluate the relative adaptability performance of different basing designs and strategies.

According to this example, the software models a reactive/dynamic system of systems.

1. The systems must respond to changing conditions
2. Systems can be eliminated or added 3. The reasons for addition of systems are governed by the input and changing conditions
4. Results that are relevant to adaptability metrics must be captured and reported The high level requirements for a specific military-deployment instantiation of dSoS are as follows:

1. There must be a descending hierarchy of locations
   a. Location one is used to simulate a forward operating base (FOB)
   b. Location two is used to simulate a command outpost (COP)
   c. Location three is used to simulate an area (PBA) in which patrol bases (PBs) are fielded
   d. The FOB supplies the COP with systems and fuel
   e. The COP supplies fuel to the fielded PBs
2. There must be a variety of systems types each with defined roles
   a. A convoy system carries fuel and replacement systems from the FOB to the COP
   b. The COP has a fuel supply inventory system (fuel tanks)
   c. The COP has generator systems to supply electricity to itself
   d. The COP has fuel carrier systems (fuel trucks) to supply fuel to the fielded PBs
   e. The COP has combat system types to enable its function and security
   f. A PB is an aggregated patrol base system that accounts for the fuel usage of its generators and vehicles
3. The COP operations can be user defined
   a. COP functions typically include base security and external combat operations
   b. The user defines combinations of system types and their counts needed to accomplish the functions. Stand-in redundancy is allowed.
   c. The number and type of escort systems for fuel deliveries to a PB are user defined
4. The COP commander must have a measure of operational effectiveness on which to base decisions
   a. The measure should account for stand-in redundancy
   b. Threshold values are user defined to help make decisions
   c. The current value can trigger the ordering of additional systems
   d. The current value can allow/disallow fuel delivery to a PB
5. The systems must respond to changing conditions
   a. Any system can suffer combat damage while either stationary or in transit
   b. A system can run low on (or out of) fuel and must request replenishment
   c. A PB can return from the field if fuel supply is not forthcoming
6. Systems can be eliminated
   a. A system is eliminated if it is totally disabled by combat damage
   b. A system is effectively eliminated if is considered surplus at the COP
7. A commander decides the number of PBs to field
   a. The decision occurs periodically
   b. The decision can be to increment by one, decrement by one, or no change
8. Results that are relevant to adaptability metrics must be captured and reported
   a. Actual and desired deployed patrol base hours, and their ratio
   b. Total fuel used, average fuel level, and hours with no fuel; all at the COP
   c. Hours that generators over-, under-produce, and average production/need ratio at the COP
   d. Successful fuel orders and their required time and unsuccessful orders and the reason
   e. System counts for total, idle, ordered, and in transit
   f. Nodes and edges for the COP fuel network
   g. SoS Availability ($A_{SoS}$) used as the measure of effectiveness at the COP The design of dSoS meets the requirements stated previously. Conforming to the military forward basing use case, there are three (virtual) locations. The design allows that system types and the roles they play to be flexible in number. Systems travel between locations using defined connections. Systems are subject to combat damage both while on base on in transit. The primary function of the middle location is to field patrol bases but the design allows the user to define other functions. The base commander makes decisions both at random and based on current conditions.

The dSoS physical model uses three locations. The input refers to these as locations one, two, and three and the user can provide any names for them. For the use case example the first location is a forward operating base (FOB) and it is assumed to have unlimited resources. The FOB responds to the needs of the second location which is a command outpost (COP). The COP is supplied by the FOB and it is responsible for its own security and combat operations, and fielding and supporting PBs. The general area within which the PBs are deployed is the third location, referred to as the patrol base area (PBA).

Figure 5:
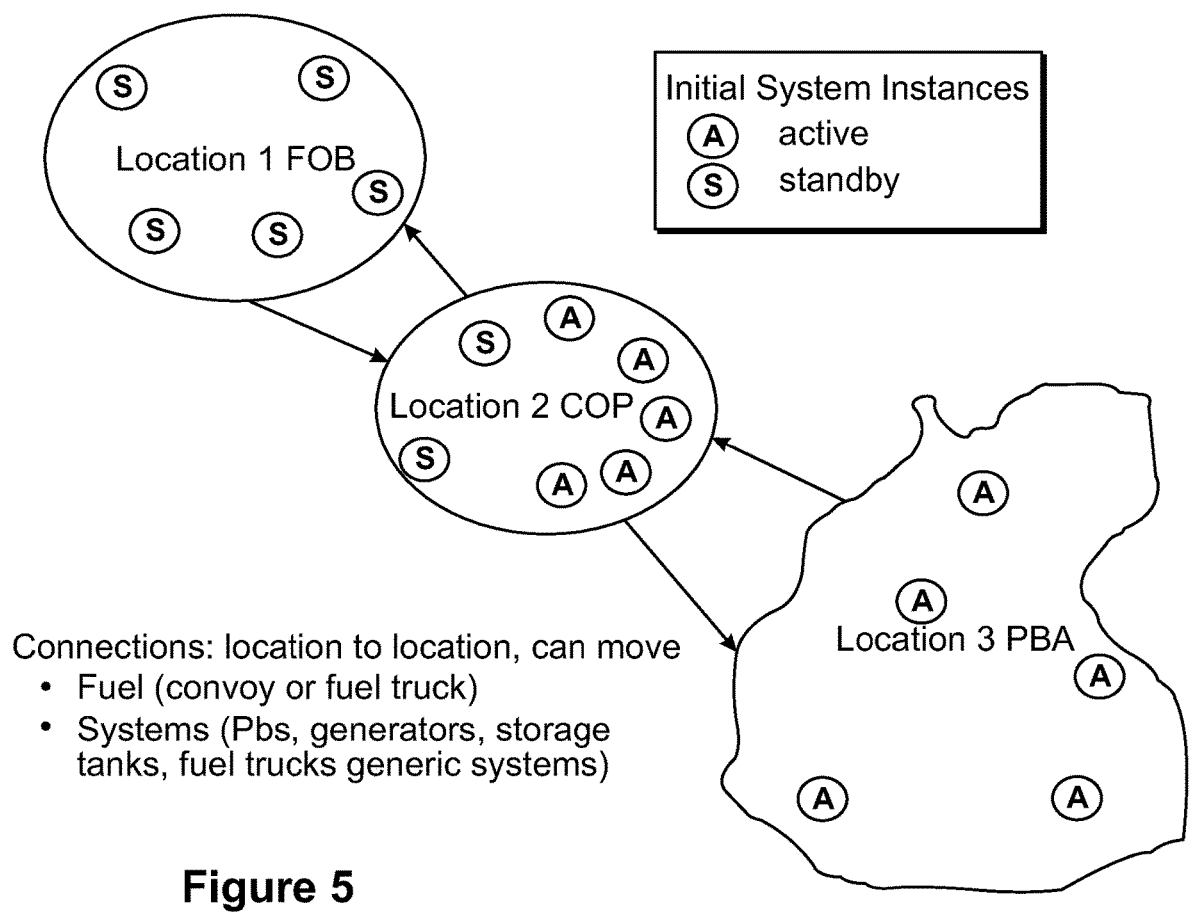
FIG. 5 shows dSoS locations in an example according to an exemplary embodiment of the disclosure.

FIG. 5 shows the concept of operations for the dSoS. There are connections between the three locations that provide movement of fuel and systems between the locations. Further assumptions for the locations include:

1. The FOB can produce limitless fuel and replacement systems for the COP
2. Systems at the FOB are not subject to combat damage
3. Systems at the FOB are not active (do not use fuel)
4. Systems at the COP can be active or standby
5. Systems at the COP are subject to combat damage and there is a COP-wide multiplier applied to each system's combat damage rate
6. Systems at the COP can have different fuel usage rates when active and standby
7. The user specifies the standard number of personnel at the COP
8. The only system types at the PBA are patrol bases except the temporary time when a fuel truck and its escorts are delivering fuel to a PB
9. Fielded patrol bases are subject to combat damage and there is a PBA-wide multiplier applied to each one's combat damage rate
10. The initial number of systems and their types must be specified for the COP and FOB
11. The minimum number of systems and their types must be specified for the COP (which can be zero)

Each system type is characterized by several properties including the role it is to play in the simulation. Some properties are not used by a given system type. In the descriptions that follow only the applicable properties are discussed. If there are to be N instances of a system type, N systems are derived from the type. The feature that distinguishes the instances of the mobile systems and generators is the rate at which they burn fuel. The nominal burn rate for the system type is defined. For each system instance, a value is randomly sampled from the multiplier distribution for the system type and the product of nominal rate times sampled value becomes the burn rate for the system instance.

The FOB supplies the COP via periodic convoys. dSoS assumes there is always one convoy. The convoys carry fuel and replacement systems. The latter can be fuel storage tanks, electrical generators, systems used for operations at the COP, and systems used to supply PBs (fuel trucks). Properties of the convoy system are:
1. Frequency (hrs). The time after time zero of the first convoy and then the time between convoys
2. Build time (hrs). The time required to rebuild a convoy if one is totally destroyed while en route to the COP. Once it is rebuilt, it leaves the FOB immediately.
3. Capacity (gals). The fuel capacity of the convoy
4. Combat damage rate (hrs)$^{-1}$. The rate parameter for the exponential distribution that describes the time-to-combat-damage.
5. Disable probability. Conditioned on the occurrence of a combat damage event, this is the probability that the convoy is totally disabled.
6. Fuel loss distribution. When a non-disabling combat damage event occurs and the fuel carriers are damaged, this distribution is randomly sampled to determine the fraction of fuel lost.
7. FOB to COP connection. The connection is specific to a convoy.
   a. Connection type is Move Both which means the convoy can carry both systems and fuel
   b. Source location is the FOB and destination is the COP
   c. The system type being moved is the Convoy
   d. Delay time distribution (hrs). The transit time from the FOB to the COP.
   e. Threat multiplier distribution. The combat damage rate is multiplied by this to (presumably) increase the combat damage rate while the convoy is in transit There is special treatment in dSoS when there is a non-disabling combat damage event on a convoy during transit.

The code counts the systems the convoy is carrying and adds one for the fuel, say N.

The fuel and each system are given probability 1/N of suffering damage.

If a system is damaged its system type has a probability of disabling damage. If the system is disabled, a replacement system is placed in the next convoy. If it is not disabled it can be repaired. Thus, it is delivered to the COP and spends some time being repaired before it is eligible for use. Repair time is also a property of each system type.

If the fuel carriers are damaged the fuel loss distribution is sampled and the remaining fuel is calculated. If the remaining fuel is zero, the convoy turns back to the FOB. It is treated the same as a disabling event on the convoy. Otherwise it continues on to the COP but may not have sufficient fuel supply to completely fill the fuel tanks at the COP.

The convoy can be carrying fuel and/or the tanks used at the COP to hold the fuel. If it is bringing replacement tanks they are filled (if possible) with the convoy fuel. If the convoy is not bringing replacement tanks, it fills the existing tanks to the extent possible. The convoy returns to the FOB carrying any excess fuel. As soon as the COP storage tanks are filled, all potential user systems are pinged to see if they need fueling.

The return trip from the COP to the FOB is not modeled, so it requires zero time and zero fuel, and is not subject to combat damage. The convoy can already have orders. These are for those systems disabled during the current trip and those requested after the convoy left the FOB. The orders are collected but the convoy must wait until its next scheduled time to deliver them.

The COP requires combat vehicles for its operations. They are subject to combat damage and they require fuel. Various system types can be defined and used for specific functions. Properties to be defined are:
1. Fuel level (gals). The capacity of fuel tank
2. Usage rate (gals/hr). The nominal rate at which this system type burns fuel
3. Reorder fraction. The vehicle orders fuel replacement when its fuel reaches this fraction of its Fuel Level.
4. Usage rate multiplier distribution. This distribution is sampled and the result is multiplied by the Usage Rate to get the specific fuel usage rate for an instance of this type
5. Standby utilization. The fraction of the usage rate burned while the system is on standby at the COP
6. Surplus time (hrs). The number of consecutive hours that the system is on standby to be considered surplus at the COP
7. Combat damage rate (hrs)$^{-1}$. The rate parameter for the exponential distribution that describes the time-to-combat-damage. One rate while on standby and another while active.
8. Disable probability. Conditioned on the occurrence of a combat damage event, this is the probability that the system is totally disabled.
9. Repair time distribution. When a non-disabling combat damage event occurs, this distribution is randomly sampled to determine the time to repair (hours) the system. The systems do not burn fuel while they are down for repair.

When combat systems are included in COP operations their status affects the measure of effectiveness ($A_{SoS}$). When non-disabling combat damage occurs, $A_{SoS}$ is reduced while the system is being repaired. If the system is disabled the commander decides whether to replace the system and could order a different system type. $A_{SoS}$ is reduced until replacement systems arrive on the next convoy.

Escort vehicles can be required for each fuel delivery from the COP to the PBA. The user specifies the count, which can be zero. If N>0 are required, then there must be N available before the delivery can depart. Because it travels with the fuel truck the time an escort vehicle is in transit is the same as that for the delivery, and return. These special vehicles can also be used for COP functions, typically as stand-ins for other combat systems. They are subject to combat damage and they require fuel. Only one system type can be defined as an escort. Properties to be defined are:
1. Fuel level (gals). The capacity of fuel tank
2. Usage rate (gals/hr). The nominal rate at which the system type burns fuel
3. Reorder fraction. The vehicle orders fuel replacement when its fuel reaches this fraction of Fuel Level. Also, the system is automatically filled when it returns from a delivery.
4. Usage rate multiplier distribution. This distribution is sampled, the result is multiplied by the Usage Rate to get the specific fuel usage rate for an instance of this type
5. Standby utilization. The fraction of the usage rate burned while the system is on standby at the COP 6. Surplus time (hrs). The number of consecutive hours that the system is on standby to be considered surplus at the COP
7. Combat damage rate $(hrs)^{-1}$. The exponential distribution rate parameter that describes the time-to-combat-damage. One rate while on standby and another while active.
8. Disable probability. Conditioned on the occurrence of a combat damage event, this is the probability that the escort vehicle is totally disabled.
9. Repair time distribution. When a non-disabling combat damage event occurs, this distribution is randomly sampled to determine the time to repair (hours) the system. The systems do not burn fuel while they are down for repair.

If an escort system is combat damaged while en route to the PBA, the fuel truck continues on without it. If the escort is totally disabled, the fuel truck also returns to the COP without it. If it has repairable damage, it is repaired at the PBA and both it and the fuel truck return to the COP after repair is completed. If an escort system is combat damaged while returning to the COP, the fuel truck continues on without it. If it has repairable damage, it is repaired at the COP.

Because an escort system can optionally be used for COP operations, it can be active in those operations when a fuel order from a PB is placed. The commander must decide whether to release it for fuel delivery or continue its use for operations. There is a threshold value for this decision discussed below in Command Decisions.

Fuel at the COP is treated as a pooled resource system. It is subject to combat damage and is always active so standby properties are not required. Properties of the COP fuel pool are:
1. Capacity (gals). The total fuel that can be held in the tanks
2. Combat damage rate $(hrs)^{-1}$. The rate parameter for the exponential distribution that describes the time-to-combat-damage.
3. Disable probability. Conditioned on the occurrence of a combat damage event, this is the probability that the COP fuel pool is totally destroyed
4. Fuel loss distribution. When a non-disabling combat damage event occurs, this distribution is randomly sampled to determine the fraction of fuel lost Even though its status is "active", the COP fuel pool takes no action. Whenever another system requests part of its fuel, the amount is deducted from its inventory. It is refilled when the next convoy arrives.

The COP requires electricity for its operations which is supplied by generators. They are subject to combat damage and they require fuel. Generators at the COP are treated differently from those included in a patrol base aggregation system. There is a calculation (shown below) to determine how many generators are required to meet the demands of the COP. If more are needed they are either activated from a standby generator at the COP or are ordered from the FOB and will arrive with the next convoy. If there are more than enough, some are shut down and after a period of time could be considered surplus at the COP. In that case the generator is returned to the FOB. Properties of the generators are:
1. Fuel level (gals). The capacity of the fuel tanks
2. Usage rate (gals/hr). The nominal rate at which the system type burns fuel
3. Reorder fraction. The generator requests fuel replenishment when its fuel reaches this fraction of its Fuel Level.
4. Usage rate multiplier distribution. This distribution is sampled and the result is multiplied by the Usage Rate to get the fuel usage rate for an instance of a generator
5. Surplus time (hrs). The number of consecutive hours that the generator is on standby to be considered surplus at the COP
6. Capacity (kW). The kW produced by the generator
7. Combat damage rate $(hrs)^{-1}$. The rate parameter for the exponential distribution that describes the time-to-combat-damage. The rate can be different when the generator is active versus when it is on standby.
8. Disable probability. Conditioned on the occurrence of a combat damage event, this is the probability that the generator is totally disabled.
9. Repair time distribution. When a non-disabling combat damage event occurs, this distribution is randomly sampled to determine the time to repair (hours) the generator. The generator does not burn fuel while it is down for repair.

The COP generators supply the needs for the standard number of personnel at the COP. The total personnel at the COP can fluctuate according to the number of standby patrol bases it houses. The personnel for a patrol base utilize the electricity of the COP while there. Their own generators are only used when they are deployed in the field.

To determine the required number of active generators at the COP,

Let P=the number of personnel currently at the COP (standard number plus standby patrol base personnel)
Let D=demand for a single person (kW/Day)
The power required each day is then R=P×D.
Divide R by the generator capacity and round up to get the number of generators needed The COP supplies the fielded patrol bases with fuel on demand using supply vehicles (fuel trucks) and optionally escorts. Properties of the fuel supplier system are:
1. Fuel level (gals). The amount of fuel in the tank of the fuel truck
2. Usage rate (gals/hr). The nominal rate at which the system type burns fuel
3. Reorder fraction. The fuel truck orders fuel replacement when its fuel reaches this fraction of its Fuel Level. Also, the truck is automatically filled when it returns from a delivery.
4. Usage rate multiplier distribution. This distribution is sampled and the result is multiplied by the Usage Rate to get the specific fuel usage rate for an instance of the fuel truck.
5. Surplus time (hrs). The number of consecutive hours that the fuel truck is on standby to be considered surplus at the COP
6. Capacity (gals). The fuel capacity of the fuel truck (the fuel being carried to a patrol base)
7. Combat damage rate $(hrs)^{-1}$. The rate parameter for the exponential distribution that describes the time-to-combat-damage. The rate can be different when the fuel truck is active (in transit) versus when it is on standby (at the COP awaiting the next fuel order).
8. Disable probability. Conditioned on the occurrence of a combat damage event, this is the probability that the fuel truck is totally disabled.
9. Repair time distribution. When a non-disabling combat damage event occurs, this distribution is randomly sampled to determine the time to repair (hrs) the fuel truck. The fuel truck does not burn fuel while it is down for repair.

10. COP to PBA connection. The connection between fuel truck and PBA to deliver fuel.
   a. Connection type is Move Fuel
   b. Source location is the COP and destination is the PBA
   c. The system type carrying the fuel is the fuel truck
   d. The system type receiving the fuel is the patrol base
   e. Delay time distribution (hrs). The transit time for the delivery. It is sampled once for the outbound trip from the COP to the PBA and once again for the return trip
   f. Threat multiplier distribution. The combat damage rate is multiplied by this to (presumably) increase the combat damage rate while the fuel truck is in transit When a PB requests fuel from the COP, there is a search for an available fuel truck.

There are two fuel truck lists: those that are idle and operable and those that are not.

If there is at least one idle fuel truck, one of these will be selected. The selection is made to maintain surplus hours, that is, if a fuel truck is near the time to be considered as surplus it is not selected. So the fuel truck with the longest time left to be considered surplus is selected.

If there are no idle fuel trucks and no other fuel trucks, the order is not placed.

Otherwise the other fuel trucks are screened for those that do not need fuel. If all do need fuel they will presumably get it at the same time, which is the arrival of the next convoy. The selected fuel truck is then the one with the shortest estimated delivery time for those orders in its queue.

If some do not need fuel then estimated delivery time for those orders in its queue is added to the time remaining until they are repaired (if they are down). The selected fuel truck is the one with the shortest total time.

When fuel truck departs the COP toward the patrol base the time required for the trip is sampled as is the time for the next combat damage event. If the latter exceeds the former then the fuel truck will arrive without damage. Otherwise it will incur damage.

Repairable damage is assumed to be field repair repairable. The time to repair distribution is sampled and the arrival at the patrol base is delayed by that time (or more if a second combat damage event occurs before arrival). If the damage is not repairable the fuel truck is disabled. All of its orders are canceled and the patrol bases that were to receive fuel are pinged to reorder from a different supplier. The fuel truck is replaced on the next convoy if the minimum number of fuel trucks at the COP is now violated, otherwise it is not replaced.

When a fuel truck arrives at the PBA, it transfers fuel to the requesting PB in zero time and then starts back to the COP. The time required for the return trip is sampled, as is the time for the next combat damage event. If the latter exceeds the former then the fuel truck will return without damage. If the damage is repairable the return trip is delayed by the sampled repair time. If it is disabled the order cancellation and potential replacement considerations are the same as for the outbound trip.

When a fuel truck arrives back at the COP it immediately requests fuel from the storage tanks both for the fuel burned for the trip and to refill its inventory. If both cannot be completely filled, the fuel truck is considered unusable until it is filled. It remains that way until more fuel is available in the COP storage tanks. If it can be filled, it sits as standby if it has no further orders or departs for the next PB in its queue otherwise.

Fuel truck departure can be delayed if escort systems are required and the minimum number is not available. In that case the fuel truck sits on standby at the COP until escorts become available and are released by the commander.

A PB is aggregated into a single mobile unit and it can travel throughout the theater on its own. The aggregation means that the personnel, vehicles, generators, etc. are treated as a single entity that requires fuel. PB units are active when deployed to the PBA, are on standby while at the COP, and are inactive while at the FOB. Periodically a PB is deployed or stood down so it changes location over time.

Properties of the PB system are:
1. Fuel level (gals). The amount of fuel stored by the patrol base
2. Usage rate (gals/hr). The nominal rate at which the system type burns fuel
3. Reorder fraction. The patrol base orders fuel replacement when its fuel reaches this fraction of their Fuel Level.
4. Usage rate multiplier distribution. This distribution is sampled and the result is multiplied by the Usage Rate to get the specific fuel usage rate for an instance of a PB
5. Standby utilization. The fraction of the usage rate burned while the patrol base is on standby at the COP
6. Surplus time (hrs). The number of consecutive hours that the patrol base is on standby to be considered surplus at the COP
7. Combat damage rate $(hrs)^{-1}$. The rate parameter for the exponential distribution that describes the time-to-combat-damage. The rate can be different when the patrol base is active (in transit or at the PBA) versus when it is on standby at the COP
8. Disable probability. Conditioned on the occurrence of a combat damage event, this is the probability that the patrol base is totally disabled.
9. Repair time distribution. When a non-disabling combat damage event occurs, this distribution is randomly sampled to determine the time to repair (hours) the patrol base. The patrol base does not burn fuel while it is down for repair.
10. COP to PBA connection. The connection is specific to deploying a patrol base.
    a. Connection type is Move System
    b. Source location is the COP and destination is the PBA
    c. The source and destination system type is the patrol base
    d. Delay time distribution (hrs). The transit time for the move.
    e. Threat multiplier distribution. The PB's active combat damage rate is multiplied by this to change the combat damage rate while the patrol base is in transit
    f. Fuel used (gals). The amount of fuel required for the trip
11. PBA to COP to connection. The connection is specific to recalling a patrol base.
    a. Connection type is Move System
    b. Source location is the PBA and destination is the COP
    c. The source and destination system type is the patrol base
    d. Delay time distribution (hrs). The transit time for the move.

e. Threat multiplier distribution. The PB's active combat damage rate is multiplied by this to change the combat damage rate while the patrol base is in transit f. Fuel used (gals). The amount of fuel required for the trip 12. FOB to COP to connection. The connection is specific to replacing a standby patrol base at the COP or as the first leg of deploying a patrol base from the FOB to the PBA via the COP.
    a. Connection type is Move System
    b. Source location is the FOB and destination is the COP
    c. The source and destination system type is the patrol base
    d. Delay time distribution (hrs). The transit time for the move.
    e. Threat multiplier distribution. The PB's active combat damage rate is multiplied by this to change the combat damage rate while the patrol base is in transit
    f. Fuel used (gals). The amount of fuel required for the trip 13. Additional patrol base properties.
    a. Number of personnel. Used to increment the count of personnel at the COP whenever a patrol base is on standby at the COP
    b. Critical fuel level fraction. This should be less than the reorder fraction. If fuel reaches this level a deployed patrol base returns to the COP. The only exception occurs if there is a fuel truck en route to the patrol base, in which case it waits.

When a PB suffers disabling combat damage it cancels any incoming fuel order. If it is not the active order for the fuel truck it is removed from the fuel truck's queue. If it is the active order and the fuel truck is on its way, the truck is reversed and heads back to the COP. The decision to replace the patrol base depends on the following circumstances.

If the patrol base is en route from the FOB to the COP, it is replaced. Another PB is immediately sent from the FOB.

If the patrol base is on standby at the COP, it is replaced only if required to maintain a minimum number of PBs at the COP.

In any other circumstance the decision to replace the patrol base or not is made the next time there is a patrol base deployment decision.

If the combat damage is repairable, it is assumed that repairs can be made wherever the PB is located. The time to repair distribution is sampled and the PB is down for that time. It burns no fuel during the repair time.

A patrol base can arrive at the COP for three reasons. (1) It is ordered from the FOB to serve as a standby PB at the COP. Its status is set to standby. (2) It comes back from the PBA on its own accord due to critically low fuel. It attempts to fill its tanks from the COP fuel storage and its status is set to standby (and needing fuel or not). (3) It has been ordered back by command. If the COP already has its minimum number of standby PBs, the PB is sent back to the FOB. Otherwise it attempts to fill its tanks from the COP fuel storage and its status is set to standby (and needing fuel or not).

Any time a PB leaves or arrives at the COP the generator load is adjusted. Generators can be shut down and their surplus time clock started or they can be activated or ordered from the FOB.

When the number of fielded PBs is to be increased, command looks first at the COP. If there is a PB on standby and its fuel levels can be topped off, it is sent out to the PBA. If the minimum count at the COP is then violated, a new PB is ordered from the FOB. If there is no eligible PB at the COP, one is ordered from the FOB. It travels to and through the COP out to the PBA. So travel times and fuel usages are added for the two legs of the connection.

When the number of fielded PBs is to be decreased, the selection of which PB should return is random. Each has an equal chance of being selected.

Combat damage in dSoS is treated as a Poisson process. As such the time-to-damage distribution is an exponential distribution that requires one parameter—a rate $(hr)^{-1}$. Rates are assigned to each system type for when the system is active and when it is on standby (see System Types). The rates can also be modified depending on where the system is stationed (see Locations) or when it is in transit (see the connections for each system type in System Types). The modifiers are multipliers so the system type rate is multiplied by the user-defined factor.

Let $\lambda$ be the combat damage rate (appropriately modified). The sampled time to the next combat damage event is then $T=-\ln(1-u)/\lambda$, where u is a random number between 0 and 1. If the system changes location before time T, time T is discarded and then recalculated for the new modified rate.

The initial number of fielded patrol bases is specified by the user (see Locations). The following inputs are used to determine how this count changes with time.
1. Random seed. An integer seed for the random number generator
2. Number of trials. The number of deployment scenarios to simulate
3. Simulation time (hrs). The time to simulate the system of systems
4. Scheduler distribution. When sampled it gives the time (hours) from the current deployment decision time until the next So that PB deployment scenarios will be reproducible, the first action that dSoS takes is to seed the random number generator. It then generates a number of scenarios specified. Each scenario starts at time zero. The scheduler distribution is sampled to get the elapsed time until the next change.

At the time of change there is an equal probability (⅓) of decrementing the deployed count by one, incrementing it by one, or making no change. In the case of decrementing it is the same as no change if there are no PBs currently deployed. The scheduler distribution is sampled repeatedly until the cumulative sampled time exceeds simulation time. At that point the scenario is fully defined. The next scenario is then generated, up to the number of scenarios (trials) requested.

Future implementation may require that the deployment decision be based on current or cumulative past circumstances. This can be accomplished by changing the deployment probabilities from equal to some other disjoint set of values. Also, the scenarios would not be developed a priori but rather during the simulation.

In addition to fielding and supplying PBs, the user can define any number of other COP functions (e.g., base security, area presence). dSoS uses a novel definition of availability of system of systems ($A_{SoS}$) to measure how well these functions are being performed.

The user specifies the system types and their counts needed to accomplish each function. All eligible system types must be COP combat systems (optionally including escorts). Different mixes of system types that can serve to accomplish a given function are called different success paths in dSoS. Each function can have multiple success paths. All combinations of success paths (taking one from each function) are formulated and the total number of each system type required by a combination is determined. The ratios of available to required systems are used to calculate $A_{SoS}$ (the calculation is discussed in Metric Definitions). At each point in time that the availability of one of the systems involved in the COP functions changes, $A_{SoS}$ is recalculated and the current value is compared to user-specified thresholds.

$A_{SoS}$ threshold for command decision. If the value of $A_{SoS}$ is below this threshold for the specified number of consecutive hours (see next), the COP commander makes a decision.

$A_{SoS}$ hours below threshold. If the value of $A_{SoS}$ is below its threshold (see above) for this number of consecutive hours, the COP commander makes a decision.

Command decision. When prompted by threshold, the commander can decide to

Take no action. In this case the enemy can increase its attack frequency by applying a multiplier to combat damage rates. If the multiplier is set to 1, there is no change.

Order more systems. dSoS will either find the one system that, if available, would increase $A_{SoS}$ by the greatest amount or find the best mix of systems that, if available, would increase $A_{SoS}$ to 1. The identified systems are ordered for the next convoy. (These two options are not currently exposed to the user.)

Abandon the COP. All simulation stops for the current trial (scenario).

The same command decisions can be based on the ability to successfully deploy PBs. dSoS defines an instantaneous PB availability as the number of PBs deployed to the PBA divided by the desired number. The threshold and time for this decision are parallel to that for $A_{SoS}$. The only difference is in the decision of which systems to order.

PB availability threshold for command decision. If the value of PB availability is below this threshold for the specified number of consecutive hours (see next), the COP commander makes a decision.

PB availability hours below threshold. If the value of PB availability is below its threshold (see above) for this number of consecutive hours, the COP commander makes a decision.

Command decision. When prompted by threshold, the commander can decide to

Take no action. In this case the enemy can increase its attack frequency by applying a multiplier to combat damage rates. If the multiplier is set to 1, there is no change.

Order more systems. The commander orders one extra PB and one additional fuel truck. If escorts are required for a fuel delivery the commander also orders one additional escort system.

Abandon the COP. All simulation stops for the current trial (scenario).

The minimum number of systems required by the COP is large enough to maintain a large value of $A_{SoS}$, the decision to order more systems based on the value of $A_{SoS}$ may have very little impact on the simulation. The same applies to the number of standby PBs at the COP. That is, if loss of a system results in a violation of the minimum number to maintain at the COP, a replacement is automatically ordered. Thus, the potential opportunity to encounter smaller values of $A_{SoS}$ or PB availability can be greatly reduced. To observe the maximum impact of the command decision thresholds, the minimums to maintain should be zero.

Fuel deliveries to the PBA can be directly affected by the current value of $A_{SoS}$. An escort vehicle might be involved in the COP functions (an escort vehicle is assumed to also be a combat system). If releasing that escort to accompany a fuel delivery would compromise the COP functions, the commander must decide which has priority. To this end, the user specifies Number escorts per delivery. One combat system type can be designated as an escort system for fuel deliveries from the COP to the PBA. This is the number of escort systems required per delivery.

$A_{SoS}$ allow delivery threshold. When a fuel request arrives from a PB and an available fuel truck is identified, a search is made for available escort systems. If N are required and there are fewer than N escorts currently on standby at the COP, but there are some currently active in COP operations, the commander must decide whether to release the active escorts for the delivery. If releasing sufficient escorts will not reduce $A_{SoS}$ to a value below this threshold, the escorts are released for the delivery. Otherwise the delivery is delayed until a change in available systems occurs.

dSoS does not perform sensitivity analysis but offers the option to select input and output variables on which such analysis can be performed. It reports values for each trial in a handy tabular format to facilitate post-processing. The trial to trial variation is separate from the randomness inherent within a given trial (i.e, within a given PB deployment scenario).

The randomness within a trial in dSoS arises from several sources:

1. PB deployment scenario. The scheduler distribution is randomly sampled to define the time between deployment decisions. This is repeated until accumulated time exceeds simulation time. At each decision point the code randomly elects to deploy a PB, recall a PB, or neither. If the decision is to recall and there are multiple candidates, one PB is selected at random.

2. Fuel usage rate. Whenever an instance of a system type is to be created, the fuel usage rate multiplier distribution is randomly sampled and the result multiplies the nominal fuel usage rate to determine a rate for the instance.

3. Combat damage time. Whenever the location of a system changes the applicable combat damage rate is found. Then assuming an exponential time-to-occurrence distribution, a time of damage is sampled.

4. Whenever combat damage occurs to a system, a random number is compared to the disable probability to determine if the damage is disabling or repairable.

5. Whenever repairable combat damage occurs to a system, the repair time distribution is sampled to determine the downtime for the system. If the system stores/carries fuel the distribution is interpreted as the fraction of fuel lost to the damage.

6. When a connection is established to move a system, fuel, or both, two distributions are sampled. One gives the one way travel time to the destination and the other gives a threat multiplier to apply to the affected systems' combat damage rate during transit.

Because the sensitivity variables apply internally within a scenario simulation, there is no control as to the frequency of their application. Thus to perform a sensitivity analysis, a set of inputs was selected to have distributions that are to be sampled once at the beginning of a scenario and remain fixed throughout the simulation of that scenario. Table 6 shows a list of candidate input variables. On any given run all are optional, but if selected, a variable must have a valid distribution. Also, none will be sampled if the user elects not to do sensitivity analysis. If sensitivity analysis is to be done, the sampling scheme can be Latin Hypercube Sampling (LHS) or random.

Table 6 lists the candidate input variables.

TABLE 6

Candidate Input Variables

Base CD Rate for Convoys
Base CD Rate for COP Combat Vehicles
Base CD Rate for COP Fuel Storage
Base CD Rate for COP Generators
Base CD Rate for PB Suppliers
Base CD Rate for PBs
Convoy Build Time (hrs)
Convoy Frequency (hrs)
Convoy Fuel Capacity (gals)
COP Initial Systems Combat Vehicles
COP Initial Systems Generators
COP Initial Systems PB Suppliers
COP Initial Systems PBs
COP Minimum Systems Combat Vehicles
COP Minimum Systems Generators
COP Minimum Systems PB Suppliers
COP Minimum Systems PBs
Fuel Storage Capacity at COP (gals)
PB Critical Fuel Level Fraction
PB Personnel Count
PBA Initial Systems PBs
Personnel Power Usage (kW/day)

Table 7 lists the output variables that can be saved. dSoS writes all results to a table in the form of a comma-separated-values (CSV) file. Each trial is represented by a row. The selected input columns appear first and contain the sampled input. The selected output columns appear next and contain the value generated by trial.

TABLE 7

Candidate Output Sensitivity Variables

| Category | Variable |
| --- | --- |
| COP Fuel | Hours With No Fuel |
| COP Fuel | Total Fuel Used |
| COP Fuel | Average Fuel Level |
| COP Fuel | Fuel Level Before Refill |
| COP Fuel | Storage Utilization |
| FOB-Ordered Systems | Total Number |
| FOB-Ordered Systems | Number Generators |
| FOB-Ordered Systems | Number Fuel Storage |
| FOB-Ordered Systems | Number Fuel Suppliers |
| FOB-Ordered Systems | Number Combat Vehicles |

TABLE 7-continued

Candidate Output Sensitivity Variables

| Category | Variable |
| --- | --- |
| FOB-Ordered Systems | Number Patrol Bases |
| Fuel Orders | Total Number |
| Fuel Orders | Successful Number |
| Fuel Orders | Successful Delivery Time |
| Fuel Orders | Successful Fraction |
| Fuel Orders | Failed Fraction |
| Fuel Orders | Failed PB Critical |
| Fuel Orders | Failed PB Ordered Back |
| Fuel Orders | Failed PB Disabled |
| Fuel Orders | Failed Supplier Down |
| Fuel Orders | Failed Simulation End |
| Generator Power | Underpowered Hours |
| Generator Power | Overpowered Hours |
| Generator Power | Usage Ratio |
| ASoS | ASoS |
| PB Deployment | Intended Hours |
| PB Deployment | Actual Hours |
| PB Deployment | Number Deployed |
| PB Deployment | Function Availability |
| Idle COP Systems | Total Number |
| Idle COP Systems | Number Generators |
| Idle COP Systems | Number Fuel Suppliers |
| Idle COP Systems | Number Patrol Bases |
| Idle COP Systems | Number Combat Vehicles |
| COP Systems | Total Number |
| COP Systems | Number Generators |
| COP Systems | Number Fuel Storage |
| COP Systems | Number Fuel Suppliers |
| COP Systems | Number Combat Vehicles |
| COP Systems | Number Patrol Bases |
| COP Fuel Network | Number Nodes |
| COP Fuel Network | Number Edges |
| In Transit | Number Moving |
| In Transit | Total Number |
| In Transit | Fraction Mobile |

Following the pattern of the SoSAT software, dSoS stores its input in Access database tables. The tables that contain input definitions (System Types, Locations, Connections, and Functions) require an integer ID field and a string Name field, both of which must be unique to the table. The Name is used when interfacing with the user. The ID field is internally generated and used by the code to identify and link objects. Subordinate tables (System Locations and Success Paths) use the ID to identify parents. The tables for Simulation Parameters, Sensitivity Input, and Sensitivity Output are special cases.

All input tables are presented in the text that follows and a list of system types and descriptions is shown in Table 8. The meaning of each field should be clear from the variable name and description. Further details are shown as notes for each table, as necessary.

System Types

TABLE 8

System Types and Descriptions

| Variable | Type | Description |
| --- | --- | --- |
| ID | Integer | Unique identifier for the system type |
| Name | String | Name of the system type |
| Role | Enumerated | Role the system type plays in the analysis |
| Full Level | Single | Number of gallons of fuel the system holds |
| Reorder Level | Single | Fraction of fuel remaining to trigger a reorder |
| Usage Rate | Single | Fuel usage rate (gals/hr) |
| Rate Multiplier Dist | Enumerated | Type of distribution for varying system usage rates |
| Rate Parameter1 | Single | First parameter of the selected multiplier distribution |
| Rate Parameter2 | Single | Second parameter of the selected multiplier distribution |
| Rate Parameter3 | Single | Third parameter of the selected multiplier distribution |
| Standby Utilization | Single | Fuel utilization fraction while on standby |

TABLE 8-continued

System Types and Descriptions

| Variable | Type | Description |
|---|---|---|
| Max Surplus Time | Single | Considered surplus if idle for these consecutive hours |
| Capacity | Single | Fuel inventory (gallons) or generator power (kW) |
| Cost | Single | Cost to purchase |
| CD Standby Rate | Single | Combat damage rate (1/hr) while on standby |
| CD Active Rate | Single | Combat damage rate (1/hr) while active |
| Disable Probability | Single | Probability that combat damage disables system |
| CD Effect Dist | Enumerated | Type of distribution for effect of non-disabling combat damage |
| Effect Parameter1 | Single | First parameter of the selected effect distribution |
| Effect Parameter2 | Single | Second parameter of the selected effect distribution |
| Effect Parameter3 | Single | Third parameter of the selected effect distribution |

Notes

The enumeration for the Role is:

| ID | Name | Description |
|---|---|---|
| 0 | Combat | This system is involved in COP operations |
| 1 | Patrol Base | This system gets deployed and removed on a schedule |
| 2 | Fuel Storage | This system holds fuel for the COP |
| 3 | Electric Generator | This system generates electricity |
| 4 | Fuel Supplier | This system carries fuel from the COP to fielded patrol bases |
| 5 | Periodic Convoy | This system emulates an entire convoy |
| 6 | Fuel Truck Escort | This system escorts a fuel delivery from the COP to the PBA |

Full Level is the fuel tank size in gallons for the system (combat, patrol base, generator, fuel supplier, escort). Capacity is the gallons of fuel carried (fuel supplier, convoy, storage tanks) or the kW power produced (generator).

None of the Reorder Fraction, the Usage Rate, or the Usage Rate Multiplier Distribution is used for the convoy and the fuel pool. The distribution type for usage rate multiplier can be Fixed, Uniform, Normal, or Triangular. They will require 1, 2, 2, and 3 parameters, respectively.

Standby utilization is applied to patrol bases, combat systems, and escorts when they are idle at the COP Max Surplus Time applies to combat systems, escorts, generators, fuel suppliers, and idle patrol bases.

Cost is not currently used.

The Active Rate for combat damage applies to all systems when they are active.
  Convoys, fuel suppliers, and escorts when in transit
  Combat systems and escorts when performing COP functions
  Always for the fuel pool
  Patrol bases when they are fielded or in transit
  Generators when they are in use The Standby Rate for combat damage applies to idle systems.
  Fuel suppliers and escorts when awaiting their next order
  Patrol bases when they are on standby at the COP
  Generators and combat systems when they are not in use When sampled, the Combat Damage Effect distribution value is the repair time (combat systems, generators, patrol bases, fuel suppliers, and escorts) or the fraction of fuel lost (convoys, fuel pool). The distribution type for combat damage effect can be Fixed, Uniform, Normal, or Triangular. They will require 1, 2, 2, and 3 parameters, respectively.

Area Locations

Table 9 shows a list of area location types and descriptions

TABLE 9

Area Locations Types and Descriptions

| Variable | Type | Description |
|---|---|---|
| ID | Integer | Unique identifier for the location |
| Name | String | Name of the location |
| Number Personnel | Integer | Typical personnel count for the location |
| Threat Multiplier | Single | Multiply system's combat damage rate for each system here |
| Level | Integer | 0, 1, or 2 for FOB, COP, and PBA |

Notes

Number of personnel is only used to determine generator demand and only applies to the COP.

The threat multiplier is ignored for the FOB—combat damage does not occur there

System Locations

Table 10 shows a list of system location types and descriptions

TABLE 10

System Locations Types and Descriptions

| Variable | Type | Description |
|---|---|---|
| ID | Integer | Unique identifier for system type and location pairing |
| Location ID | Integer | The ID for the location |
| System Type ID | Integer | The ID for the system type |
| Number Assigned | Integer | Number of system instances initially assigned to the location |
| Minimum Number | Integer | Minimum number of system instances that are to be maintained at the location |

Notes

Only convoys should be assigned to the FOB. Only patrol bases should be assigned to the PBA.

The minimum number of systems is only applied for the COP.

Connections

Table 11 shows a list of connection types and descriptions.

TABLE 11

Connections Types and Descriptions

| Variable | Type | Description |
|---|---|---|
| ID | Integer | Unique identifier for the connection |
| Name | String | Name of the connection type |
| Purpose | Enumerated | What does the connection Move (Fuel/System/Both)? |
| From Location ID | Integer | The originating location |
| From System Type ID | Integer | System type supplying or moving |
| To Location ID | Integer | The destination location |
| To System Type ID | Integer | System type receiving (if Move Fuel) |
| Fuel Required | Single | Gallons of fuel required to move a system (if Move System) |
| Time Delay Dist | Enumerated | Distribution for time required for one way transport (hr) |
| Time Parameter1 | Single | First parameter of the selected time distribution |
| Time Parameter2 | Single | Second parameter of the selected time distribution |
| Time Parameter3 | Single | Third parameter of the selected time distribution |
| Threat Mult Dist | Enumerated | Type of distribution for multiplying combat damage rates |
| Threat Mult Parameter1 | Single | First parameter of the selected multiplier distribution |
| Threat Mult Parameter2 | Single | Second parameter of the selected multiplier distribution |
| Threat Mult Parameter3 | Single | Third parameter of the selected multiplier distribution |

Notes

The Purpose of the connection can be to Move Fuel (0), Move System (1), or Move Both (2). The first is for supplying fielded patrol bases with fuel. The second is for relocating patrol bases. The third is for convoys.

The Fuel Required is only used when relocating patrol bases.

The distribution type for delay times and threat multipliers can be Fixed, Uniform, Normal, or Triangular. They will require 1, 2, 2, and 3 parameters, respectively Functions and Success Paths Tables 12 and 13 shows function variables, types and descriptions and success paths variables, types and descriptions, respectively.

TABLE 12

Function Variables, Types and Descriptions

| Variable | Type | Description |
|---|---|---|
| ID | Integer | Unique identifier for the function |
| Name | String | Name of the function |

TABLE 13

Success Paths Variables, Types and Descriptions

| Variable | Type | Description |
|---|---|---|
| ID | Integer | Unique identifier for the success path |
| Function ID | Integer | The ID for the owning function |
| Success Path Num | Integer | The success path number within the function |
| System Type ID | Integer | The ID for a system type required |
| System Count | Integer | Number of the system type required |

Notes

If a function has K success paths they are initially numbered 1 through K. The numbering could change as the user edits the initial input.

If success path K involves M system types, K will be repeated M times.

Simulation Parameters.

Table 14 shows a list of simulation parameters types and descriptions.

TABLE 14

Simulation Parameters Types and Descriptions

| Variable | Type | Description |
|---|---|---|
| Seed | Integer | Seed that is used to initialize the random number generator |
| Number Sims | Integer | Number of simulations/scenarios to generate and run |
| Duration | Single | Total problem simulation time for each scenario (hr) |
| Keep Details | Boolean | Keep all change details for every scenario |
| Do Sensitivity | Boolean | Sample distributions assigned/selected for various inputs |
| Sampling Scheme | Enumerated | Use LHS or random sampling |
| Change Time Dist | Enumerated | Type of distribution for scheduling patrol base deployment |
| Rate Parameter1 | Single | First parameter of the scheduler distribution |
| Rate Parameter2 | Single | Second parameter of the scheduler distribution |
| Rate Parameter3 | Single | Third parameter of the scheduler distribution |
| Change Probability | Single | Probability of considering a change in patrol base deployment at each sampled change time |
| PB Personnel | Integer | Number of personnel assigned to a patrol base |
| PB Vehicles | Integer | Number of vehicles assigned to a patrol base |
| PB Vehicle Usage | Single | Average fuel usage rate for a typical patrol base vehicle (gallons/hr) |
| PB Generator Usage | Single | Average fuel usage rate for all generators at a patrol base (gals/hr) |

TABLE 14-continued

Simulation Parameters Types and Descriptions

| Variable | Type | Description |
| --- | --- | --- |
| Personnel kW Usage | Single | Average daily kW usage per person for all personnel (kW/person/day) |
| PB Fuel Return | Single | Fraction of fuel remaining at a PB to trigger a return to the COP |
| PB Fuel Interval | Single | PB will receive fuel at this many hour intervals |
| Convoy Interval | Single | Number of hours between convoys |
| Convoy Build Time | Single | Number of hours to rebuild a convoy if one is totally disabled |
| PB Availability Threshold | Single | If PB availability less than this for defined time (next), trigger a command decision |
| PB Availability Hours | Single | If PB availability less than defined threshold (previous) for this time, trigger a command decision |
| ASoS Threshold | Single | If ASoS less than this for defined time, trigger a command decision |
| ASoS Hours | Single | If ASoS less than defined threshold (previous) for this time, trigger a command decision |
| Command Decision | Enumerated | Action to take |
| Enemy Rate Adjust | Single | If command decision is no action, multiply combat damage rates by this value |
| Num Escorts Per Delivery | Integer | Number of escort vehicles required for fuel delivery, COP to PBA |
| ASoS Allow Threshold | Single | Allow/disallow escort vehicle to be removed from COP functions to escort delivery based on new ASoS compared to this value |

Notes
  Keep Details only applies for fewer than 25 trials
  If Do Sensitivity is false all sensitivity input and output is ignored
  The sampling scheme for sensitivity analysis can be LHS (0) or random (1)
  The distribution for time to change the patrol base count can be Fixed, Uniform, Normal, or Triangular. They will require 1, 2, 2, and 3 parameters, respectively.
  None of PB Vehicles, PB Vehicle Usage, and PB Generator Usage is currently used. They can be used outside dSoS to calculate a total PB fuel usage rate.
  PB Fuel Interval is not used. Fuel is ordered on demand.
  Command actions to take are no action (0), order systems (1), or abandon COP (2).
  Sensitivity Input Variables
  Table 15 shows a list of sensitivity input variables types and descriptions.

TABLE 15

Sensitivity Input Variables Types and Descriptions

| Variable | Type | Description |
| --- | --- | --- |
| Name | String | Variable to sample (not editable) |
| Include | Boolean | Sample this variable for this run or not |
| Dist Type | Enumerated | Type of distribution for this variable |
| Sens Parameter1 | Single | First parameter of the distribution |
| Sens Parameter2 | Single | Second parameter of the distribution |
| Sens Parameter3 | Single | Third parameter of the distribution |

Notes
  The distribution type can be Fixed, Uniform, Normal, or Triangular. They will require 1, 2, 2, and 3 parameters, respectively
  Sensitivity Output Variable
  Table 16 shows a list of sensitivity output variables types and descriptions.

TABLE 16

Sensitivity Output Variables Types and Descriptions

| Variable | Type | Description |
| --- | --- | --- |
| Selected | Boolean | Include this variable in the output or not |
| Category | String | General category for the variable (not editable) |
| Name | String | Specific variable within its category (not editable) |
| Grid | String | Name of the grid used to store this output (internal use) |
| Role | Enumerated | System type role if applicable, else 255 (internal use) | dSoS is designed to compute selected adaptability metrics. The general category for each metric and the specific measure are discussed in the following paragraphs. All values are written to predefined worksheets in an Excel workbook or to CSV files. The former is only practical when the worksheets are small (typically for runs with 25 or fewer trials).

Changeability—Logistics Capability

There are two measures to help quantify the logistics capability in dSoS. One is the time required to resupply patrol bases from the time the order is placed until it is fulfilled. Another is the fraction of failed orders.

An order is placed when the patrol base fuel level reaches its reorder level. The search for a fuel truck is described in Patrol Base Suppliers. If necessary, escort systems must be identified. Upon departure from the COP, the distribution of fuel delivery times is sampled to get a delivery time for the order. In the absence of resource contention and combat damage then, the average delivery time would be the mean of the distribution. If the fuel truck has to finish other orders in its queue before starting out to the requesting PB, it prolongs the delivery time. If the fuel truck is combat damaged on the way to the PB, it also delays the delivery. Thus the average order fill time will generally exceed the mean of the delivery time distribution.

An order will fail to be fulfilled for 5 reasons in dSoS.
  1. The delay is long enough that the fuel at the PB reaches a critical level and the PB cancels the order and returns to the COP.
  2. The PB becomes disabled by combat damage after submitting the order and before it is delivered.

3. The PB is ordered to return to the COP after submitting the order and before it is delivered.
4. The fuel truck is disabled by combat damage while on the way to the PB.
5. The simulation ends before the fuel is delivered.

The count of these reasons is tracked and reported. None of the time consumed for failed orders is included in the average order fill time for the successful orders.

Composition—Storage

The measure to help quantify storage in dSoS is the average amount of fuel present at the COP. The fuel level in storage at the COP is frequently changing. It is increased with the arrival of a convoy. It is decreased with each demand from the generators, combat systems, fuel trucks, escorts, and standby patrol bases at the COP. A time-weighted average of fuel level is calculated for each scenario.

Organization—Complexity (Connectedness)

The measure of connections within a system of systems is proportional to the complexity level. For dSoS the network of fuel delivery connections is of interest. An example network is shown in 6. It is frozen in time for the system counts shown but will change as conditions change.

There is a single connection for fuel (via the convoy) from the FOB to the COP. The connections from the COP fuel pool to its users depend on the number of active generators, patrol base suppliers, escorts, and combat vehicles plus the number of idle patrol bases. The number of possible connections from the patrol base suppliers to the fielded patrol bases is the product of their counts.

Figure 6:
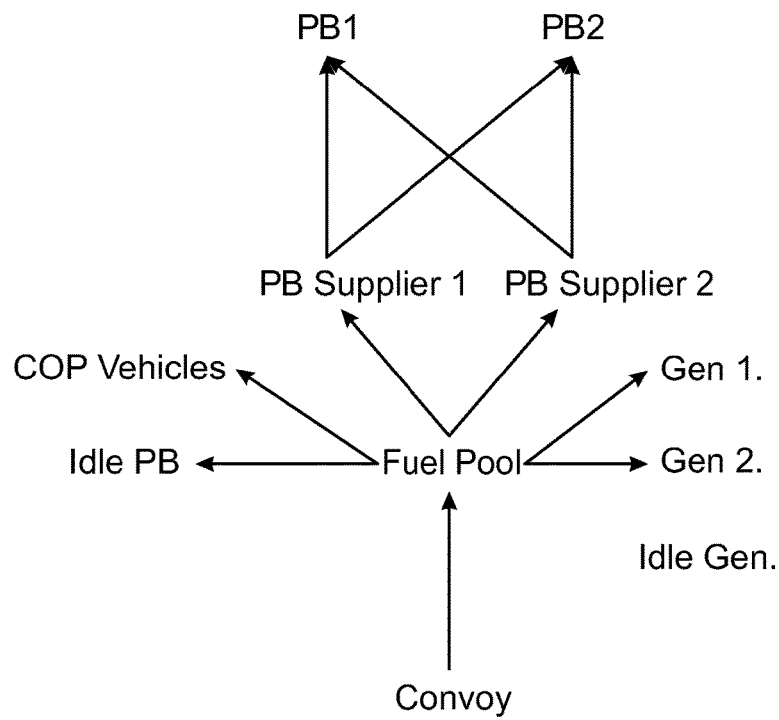
FIG. 6 shows an example Fuel Network in dSOS according to an exemplary embodiment of the disclosure.

As can be seen in the example shown in FIG. 6, the number of nodes is 10. In general the number of nodes is the sum of:

The number of convoys
The number of COP fuel pools
The number of active generators at the COP
The number of patrol base suppliers assigned to the COP
The number of COP vehicle systems (combat and escort)
The number of idle patrol bases at the COP
The number of fielded patrol bases at the PBA In the example, the number of edges is 11. In general the number of edges is the sum of:

The number of convoys
The number of active generators at the COP
The number of patrol base suppliers assigned to the COP
The number of COP vehicle systems (combat and escort)
The number of idle patrol bases at the COP
The product of the number of patrol base suppliers assigned to the COP with number of fielded patrol bases at the PBA The counts change with time and could be tracked as such. However, dSoS uses the time-averaged system counts for scenarios to obtain the time-averaged number of nodes and edges.

Robustness—Overdesign (Growth Potential)

This measure is the excess number of systems at the COP. It is the number of idle PBs plus the number of idle generators plus the number of idle COP systems (combat and escort). The temporary time that patrol bases suppliers spend as idle is not included here.

A patrol base can be on standby at the COP for two reasons:

1. By design. The analyst can specify that a minimum number of PBs be kept at the COP at all times and
2. When it returns from the field prematurely from the PBA to the COP due to critical fuel levels. It is held there until the next deployment decision.

Note, if a PB is ordered back from the PBA and the count of PBs at the COP exceeds its minimum requirement, the PB is immediately sent back to the FOB as surplus, and hence is not counted as idle.

A generator is shut down if the remaining generators can adequately meet the electricity needs of the COP. A surplus time can be specified for generators. If they are idle for that length of time they are sent back to the FOB and are no longer counted as idle at the COP. Combat systems will also be idle when there are more than enough to serve the COP functions. They also have a surplus time specified and can be sent back to the FOB.

Performance—Cost

Theoretically the cost of operations would include both fuel costs and replacement system costs. But the FOB is assumed to have infinite systems so their cost is already absorbed. Thus cost is focused on fuel usage at the COP. There is no input item for cost of fuel per gallon in dSoS so total fuel used by the COP is the surrogate for cost. This is available for each scenario.

Performance—Availability

Two standard metrics are used to judge availability for operations at the COP. The first is fielded PB availability. Over a given period of time, commanders order that a changing number of PBs be deployed. PB availability is measured as the actual deployed PB hours divided by the desired deployed PB hours.

The second is fuel availability. The unavailability is the number of hours the COP has no fuel divided by the simulation time. The complement is the availability.

Performance—Availability of SoS ($A_{SoS}$)

In dSoS, $A_{SoS}$ is used to aid the COP commander in making decisions and is also reported as an output value. The analyst defines:

1. The functions that the COP must perform (apart from fielding PBs).
2. The mix of system types and their counts that can be assigned to accomplish each function.

If each function can only be performed by a single system type, the $A_{SoS}$ calculation is simplified. The availability of each function at a given point in time is the number of available systems divided by the number required for the function. In this case $A_{SoS}$ can be defined as the minimum availability taken across all functions.

If a function can have multiple system type combinations that can be used to successfully perform the function and some of the system types could be used for more than one function, a more general definition is needed. A single mix of systems that can perform a function is referred to as a success path in dSoS. For example if function $F_1$ can be accomplished with a mix of 3 instances of system type A and 2 instances of system type B, {3A, 2B} is a success path. Function $F_1$ can have any number of alternative workable system type mixes, hence success paths. Suppose one of the success paths for function $F_2$ is {1A, 2B, 2D}. To adequately perform both functions using this combination of success paths requires 4A, 4B, and 2D systems. If there are that many systems available then $A_{SoS}=1$. Otherwise, the following equation is used to define $A_{SoS}$ at any point in time:

$$A_{SoS} = \max_{\substack{J \text{ success path} \\ \text{combinations}}} \left[ \min_{\substack{K \text{ system} \\ \text{types}}} \left( \frac{N_{available_K}}{N_{required_{K,J}}} \right) \right]$$

The equation can be unpacked as follows.
1. For M functions suppose function $F_N$ has $S_N$ possible success paths for N=1, . . . , M.
2. Success path combination J is found by selecting one path from function $F_1$, one from $F_2$, etc. There are $S_1$, $S_2$, ... $S_M$ such combinations and each is assigned a value. $A_{SoS}$ is the maximum of those values.

To find the value for combination J,

3. Find the total instances of each system type required. For a given system type K this becomes the denominator for the innermost brackets in the equation.
4. Count the number for each system type currently available at the location. For a given system type K this becomes the numerator for the innermost brackets in the equation. Note that the numerator is fixed at the point in time, so the count is independent of success path combination.
5. Over all the system types included in success path combination J find the minimum fraction, i.e., the worst ratio of available-to-required. That value is assigned to success path combination J.

Repeat steps 3 through 5 for each possible success path combination and find the maximum value across all combinations. This is the value of $A_{SoS}$ at the current point in time. It will continue to apply until something changes the available system counts. At that time the calculation is redone.

It should be noted that this formulation contains the following assumptions.

Each COP function has equal importance and
A given system can only perform one function at a time An example of a system that can perform multiple functions simultaneously is a UAV. It can help with targeting, communications, and lethality effectively at the same time. In this case we would find the maximum number of UAVs needed by any function within a success path combination rather than the sum. The same approach could be taken if none of the functions must be performed simultaneously. This option is not currently implemented in dSoS.

Item 4 requires the number of systems currently available. The count is affected by combat damage and fuel supply. If a system is damaged but is repairable, it is not available during the repair time. If a system is disabled and ordered right away, a replacement is not available until the convoy arrives. The delay time is then the time interval until the next convoy departure plus the convoy travel time. But the delay could also be affected by:

The system is disabled after the convoy has already departed, in which case the delay includes the total time between convoys.
The replacement system is damaged while its convoy is en route. If the damage is disabling, the replacement is reordered for the next convoy. If the damage is repairable the system proceeds to the COP either under its own power or is towed. Once it arrives, repair begins and the system is not available until repairs are complete.
The entire convoy is destroyed. The convoy rebuild time is added to the delay.
The fuel tanks at the COP are empty. When this happens the systems operate until their fuel is depleted and they are no longer available at that point in time. When a convoy successfully arrives with fuel, the systems are refilled and can resume their function.

The time delays can accumulate and are important for commander decisions as discussed in the Command Decisions section.

Performance—Efficiency/Sustainability

In dSoS two availability metrics could be used to judge the efficiency of the COP. The first is the number of idle systems, which is discussed under Robustness. The second is the generation of electricity. The performance of generators is measured by the power ratio, R, which is calculated as discussed in System Types Generators. The time-weighted average of R is computed for each scenario.

Performance—Survivability/Vulnerability

Vulnerability is directly proportional to the time in transit and inversely proportional to survivability. In dSoS it is the average number of systems in transit over time. At any given time there could be:

A convoy en route from the FOB to the COP. The convoy system plus any replacement systems it is bringing to the COP are counted.
A patrol base supplier and escorts en route to the PBA or returning from the PBA.
A patrol base deploying from the COP to the PBA, returning from the PBA to the COP, deploying from the FOB to the PBA, or traveling from the FOB to the COP as a replacement unit.

These are weighted by the hours spent in transit to calculate the average systems in transit over time.

Output Files dSoS generates the data to fill 22 worksheets. Within dSoS the data for a worksheet is stored in a grid. For each grid, if the grid is considered sufficiently small, the grid is saved directly to a designated worksheet in a designated Excel workbook. This uses a built-in Flexgrid-to-Excel connection that Flexgrid provides.

For larger grids this "save" operation is either prohibited (limited to 256 columns) or requires an unacceptable amount of time (writing grid cell to worksheet cell, one at a time—several minutes). So for these grids the data is saved as a comma-separated-values (CSV) file. To completely fill a spreadsheet with all its tabs, such files must be copied into their appropriate worksheet in their designated workbook. Table 17 provides a description of the output workbooks and worksheets.

TABLE 17

Output Workbooks and Worksheets

| Workbook | Worksheet | Contents |
| --- | --- | --- |
| COPFuel.xlsx | COPFuel | The fuel level in the COP storage tanks versus time for each scenario |
|  | Summary | Total hours with no fuel at the COP, total fuel dispensed by the COP, and average fuel level at the COP over all time and just prior to refill for each scenario |

TABLE 17-continued

Output Workbooks and Worksheets

| Workbook | Worksheet | Contents |
| --- | --- | --- |
| COPGenPower.xlsx | COPGenPower | The fraction of over- under-power produced by the generators at the COP versus time (Generator Power Usage Ratio) |
| | Summary | Total hours spent over- and under-powered and average usage ratio for each scenario |
| COPSystems.xlsx | Total_COPSys | Total systems at the COP over time broken down by system type, for each scenario |
| | Idle_COPSys | Idle systems at the COP over time broken down by system type, for each scenario |
| | FOBOrderedSys | Total number of systems ordered from the FOB broken down by system type, for each scenario |
| | Total_Summary | Time-averaged total systems at the COP broken down by system type, for each scenario |
| | Idle_Summary | Time-averaged idle systems at the COP broken down by system type, for each scenario |
| | Nodes_Edges | Time-averaged network nodes and edges, for each scenario |
| | SysInTransit | Number of systems in transit over time, for each scenario |
| | SysInTransit_Summary | Time-averaged number of systems in transit, for each scenario |
| | SoSAvailability | ASoS versus time for each scenario |
| | SoSAvailability_Summary | Time-averaged ASoS for each scenario |
| FuelOrders.xlsx | FuelOrders | Time each fuel order placed and time delivered (success) or reason for failure, for each scenario |
| | Summary | Average delivery time (success) and count of failures for each scenario |
| PB_Deployments.xlsx | Planned_Deployment | Number of patrol bases intended to be deployed over time for each scenario |
| | Actual_Deployment | Number of patrol bases actually deployed over time for each scenario |
| | Availability | Total and actual deployed hours and their ratio (availability) for each scenario. |
| (None) | SummaryOfSummary.csv | The average over all scenarios for each summary worksheet above. |
| (None) | AvailabilityPlotData.csv | The average over all scenarios of PB Availability and ASoS versus time. |
| (None) | Sensitivity.csv | Sampled input and generated output for selected variables for each trial. |

If a grid was saved to a CSV file, the name of the file is the root name of the workbook to which it belongs, followed by an underscore character, followed by the worksheet name, followed by ".csv". So for example, file COPSystems_Idle_COPSys.csv contains the data for the Idle_COPSys worksheet of the workbook COPSystems.xlsx. The exceptions are for the last three csv files shown in the table, which have hard-wired names.

Each summary sheet gives the averages of values for each individual scenario. It then takes averages over all scenarios. These latter overall averages are collected by dSoS into a single grid and written to the SummaryOfSummary.csv file.

Relation to SoSAT (System of Systems Analysis Tool)

According to another embodiment of the disclosure, a method, system and software package, called SoSAT is disclosed. SoSAT may be used to model a wide variety of SoS problems. The design of dSoS borrowed much from the design of SoSAT. Although SoSAT implements considerably more detail than dSoS, there are some features that dSoS has that SoSAT does not. Similarities and differences are discussed below.

Similarities

The code and interface structure for dSoS borrows heavily from SoSAT.

Both codes store input in database tables. dSoS uses Microsoft Access which was used by earlier versions of SoSAT.

Both organize the editing of input with the use of a tree structure.

Once an input item is selected dSoS uses existing SoSAT forms to display the current input and to allow editing.

Each code has a separate simulation DLL that the user interface directs to run the trials.

The simulation DLL is event driven. dSoS uses the event scheduling software developed for SoSAT.

Differences

SoSAT has considerably more sophistication than dSoS in simulating systems of systems. In SoSAT systems can have multiple functions and function performance can depend on element (part) reliability, multiple consumable types, and functionality of other systems. SoSAT can model more types of services and the rules to select a service provider can be more refined. The combat damage model in SoSAT can be tailored to individual parts of systems and for weapon types. External conditions can affect the failure and repair of elements, the usage of consumables, and the combat damage model properties. Force structure in SoSAT can be realistically modeled.

Classes

The class structure for dSoS simulation is similar that of SoSAT, but has far fewer classes. The most important dSoS classes are:

1. dSoS. This class initializes a run, initializes and finalizes each trial (scenario), and finalizes the run. It also stores the run parameters and collections of the input objects.

a. For run initialization scenarios are defined, initial systems are distributed, and results grids are initialized
b. Trial initialization involves the freeing up of previous results and starting over with initial system counts
c. A trial is finalized by writing the last row of results grids and writing the fuel orders grid
d. The run is finalized by summarizing any of the grids that require it and writing the grids to their appropriate worksheet or file.
2. Data Loader. This class reads database tables and populates class properties.
3. Scenario. This class generates and stores the time history for the number of patrol bases to be deployed. (This could be done on the fly during a scenario simulation but is done a priori for reproducibility of scenarios.)
4. Active Scenario. This class is used as the current scenario and it initializes results grids for the scenario. An instance knows its scenario thereby knowing all of its properties. It inherits the Activity class, meaning that it places events in the discrete event queue. When the next event in the simulation is one for this class, it determines what to do next (deploy or recall patrol bases). It starts the PB relocation process by selecting them, creating an order to move, and scheduling an event to start each move.
5. Location. Stores the properties of a location; level, initial systems, threat multiplier, and personnel count. During the run it maintains a list of current systems at the location.
6. System Type. This class stores the properties of a system type; role, fuel usage rate, usage rate multiplier distribution, full fuel level, fuel capacity, standby utilization, surplus time, and combat damage data (standby rate, active rate, disabling probability, and effect distribution). It develops fuel triggers for the system type and flags if the type can be idle at the COP.
7. System Instance. When there are to be N instances of a system type dSoS creates N instances of this class. Each instance knows its system type thereby knowing all of the properties of the type. This class inherits the Activity class, meaning that it places events in the discrete event queue. When the next event in the simulation is one for this class, it determines what to do next, implements the step, and schedules the next event for the system instance. The step can be
  a. Start a move—convoy sets out, fuel delivery truck (and escort) starts to the PBA, or a patrol base starts relocation. Determine travel time and modify the combat damage rate. Sample the time to the next combat damage event.
  b. Arrives at destination—
    i. Convoy arrives at COP. Fill COP fuel pool from convoy if possible and release systems being carried. Ping all systems at the COP to see if they need fuel and if so schedule a filling (event) with the fuel pool.
    ii. Fuel delivery truck arrives at PBA. Fill the PB if and sample travel times for the return trip and combat damage.
    iii. Fuel delivery truck returns from PBA to the COP. Fill fuel tanks and inventory from the fuel pool if possible. If fully filled then start out with next order if one exists in the queue or sit as standby if not. If not completely filled, cancel any orders remaining in the queue, set system as standby and down, and wait for replenishment of the fuel pool. If remaining on standby at the COP calculate time until the next combat damage event. If there is an escort it returns at the same time (barring combat damage on the return trip). It is fueled and then is ready for escort duty with the current or other fuel truck, or can be assigned to one of the COP functions. If there is no demand for any of these, it is set to standby status.
    iv. Patrol base arrives at its destination. If destination is the PBA then set PB to begin burning fuel and calculate times to fuel order and next combat damage event. If destination is the COP and the PB came back because of critical fuel, fill its tanks if possible and wait for the next deployment time. If COP is the destination and the PB was ordered back, fill its tanks if possible and the PB either goes on standby or returns to FOB surplus. If destination is the COP and the PB is a replacement system for the COP, fill its tanks if possible and set to standby.
  c. Update fuel usage—calculate the fuel used since the last update and request fuel if necessary. Initialize a PB relocation order if it is critically low on fuel.
  d. Provide fuel from pool—respond to a request for fuel from a system at the COP. Fill all of its tanks if possible or provide all remaining fuel in the pool if not.
  e. Examine combat damage—determine the extent of the damage.
    i. If the system is disabled cancel any orders it is associated with and check if it should be replaced. If so create an order and schedule an event for the replacement system.
    ii. If damage is not disabling, sample the fuel loss (convoy or fuel pool) or repair time. Subtract the fuel or delay the system for repairs. A system needing repairs is down and unavailable to perform its intended function.
  f. Recovery from combat damage—set the system properties to resume what it was doing when it incurred repairable damage.
  g. Surplus time—send the system to the FOB if it has sat idle for sufficient time
8. Commander. This class calculates and tracks PB availability and $A_{SoS}$. When a command action is required it schedules an event. So, this class inherits the Activity class, meaning that it places events in the discrete event queue. When the next event in the simulation is one for this class, it determines what to do next, implements the step, and schedules the next event for the system instance. The step can be:
  a. Take no action. The COP commander takes no action but the enemy might. Apply the enemy rate multiplier to the combat damage rates for all locations and connection types.
  b. Order systems. Determine which systems to order (see Command Decisions) and notify the next convoy.
  c. Stop simulation. The commander abandons the COP thereby ending simulation for the current trial.

As part of the $A_{SoS}$ calculation, this class determines if there are excess systems, if so, place some on standby. If there are too few active systems, activate some if available. In either case, an event is scheduled for the systems undergoing a change in status.

9. Functions. This class stores function definitions and their success paths. The latter are stored with the help of a separate class called SuccPathItem.
10. Connection Type. This class stores the properties of a connection type; type of move, source location and system type, destination location and system type, fuel required, transit time distribution, and threat multiplier distribution. It also instantiates a connection orders. This means finding a system to move, creating one if necessary, or finding a fuel supplier using the selection criteria. It means setting the system instances involved, sampling transit time, and sampling the threat multiplier.
11. Connection Order. Stores the properties of a specific order; source system, destination system, transit time, threat multiplier, time submitted, time started, and time delivered.
12. Excel Operations. Provides the means to connect with Excel to confirm whether worksheets exist and need to be cleared or whether the worksheets must be created.
13. LSHDLL. This class is used to sample input variables that are selected for sensitivity analysis. It implements both Latin Hypercube Sampling (LHS) and random sampling. It is supported by three other classes. The LHSDist class stores a distribution. The Correlation class stores the correlation between two variables (not used in dSoS). The CorrelationSupport class implements the pairing of sampled values to reflect correlations, all of which are assumed to be 0 in dSoS.

Evaluation of Adaptability Metrics Example

Introduction

In order to evaluate a subset of the devised adaptability metrics, a test case using dSoS based on a notional military deployment as depicted in FIG. 6 was devised. The test case consists of a forward operating base (FOB) supporting a combat outpost (COP), which in turn is supporting several patrol bases (PB). Generators and vehicles are assigned to the bases. Fuel is the only consumable in the test case, and both generators and vehicles use fuel. Fuel is supplied to the COP by convoy on a regular schedule; the COP maintains fuel-supplier vehicles to resupply fielded PBs on an as-needed basis.

Changing environments that necessitate adaptability are considered. The changing mission requires varying the number of PBs that must be supported at any given time. An uncertain enemy is considered by the random application of combat damage to the PBs, to the systems at the COP, and to the supply links between FOB and COP, and between COP and PBs.

It is assumed that the most adaptable SoS designs (as defined by the initial configuration and the operational parameters) will perform better than the less adaptable SoS designs in the uncertain mission and threat space of the test case. The hypothesis being that the adaptability metrics, developed independently of this test case, will distinguish between the better-performing, more-adaptable SoS and the worse-performing, less-adaptable SoS.

The analysis included a number of parameters defined by probability distributions. These parameters were intended to capture a range of possible SoS configurations and operations, and therefore provide a set of different designs, with some being more adaptable and some being less adaptable. Probabilistic parameters included the following:

initial number of PBs and the number of PBs that must be fielded at any given time,
initial quantities of generators and fuel in storage,
initial numbers and types of vehicles,
fuel re-order level and fuel-delivery delay time,
re-order number and order delay time for systems and PBs,
convoy capacity, build time, and frequency,
personnel numbers and power usage,
combat damage rates (combat damage modeled as occurring at random intervals as specified by the rate, with different rates for different systems and system locations).

Adaptability Metrics Considered

Due to the limited test case level of detail, only a subset of the adaptability metrics were included in the analysis as shown in 18. In addition, some of the measures that were evaluated showed marginal response, such as the complexity measures. It is suspect that this situation occurs often in reality: SoS with specific missions and specific threats likely have a limited number of factors that drive adaptability. In the test case, as shown below, the adaptability measures related to logistics dominated.

TABLE 18

Adaptability Metrics Considered in the Evaluation Test Case

| Groupings | Adaptability Metric | Measure | Calculation* |
|---|---|---|---|
| Initial Conditions | Logistics Capability | Convoy Frequency | Selected from U(480,960) hours |
| | Storage | Fuel Storage Capacity at COP | Selected from U($5 \times 10^4$, $10^5$) gallons |
| | Complexity | Initial Number of PBs at COP | Selected from U(0, 4) PBs |
| | Overdesign | Minimum Number of Fuel Suppliers | Selected from U(1, 5) suppliers |
| Simulation Results | Logistics Capability | Failed PB Fuel Orders | Count during simulation |
| | Storage | Storage Utilization | Storage Utilization = $\mathrm{ave}\left(\dfrac{N_{consumables\_storage}}{N_{storage\_capacity}}\right)$ |
| | Complexity | Number of Systems in Transit | Average Systems in Transit = $\mathrm{ave}(N_{sys\ in\ transit})$ |

TABLE 18-continued

Adaptability Metrics Considered in the Evaluation Test Case

| Groupings | Adaptability Metric | Measure | Calculation* |
|---|---|---|---|
| | Overdesign | Average Fuel Level | Average Fuel Level = $\text{ave}\left(\dfrac{V_{used\_fuel\_storage}}{V_{tot\_fuel\_storage}}\right)$ |

*The notation U(min,max) indicates the uniform distribution with the specified minimum and maximum values One Performance metric, PB availability, was considered in the test case (Table 19). PB availability is a direct measure of the mission success. Future work will entail consideration of a complex-systems-related availability, $A_{SoS}$, which is especially relevant to the substitutability of various systems as a contingency to maintain operations (a hallmark of many SoS).

TABLE 19

Performance Metric Considered in the Evaluation Test Case

| Performance Metric | Measure | Calculation |
|---|---|---|
| Availability | PB Availability | Time average of the normalized difference between the number of PBs required and the number fielded $A_{PB} = \text{ave}\left(\dfrac{PB_{req} - PB_{field}}{PB_{req}}\right)$ |

Test Case Description and Results

Simulation runs of 1000 trials each were conducted for a low-combat-damage case and a high-combat-damage case. The results were similar between the two cases so only the results of the high-combat-damage case are discussed here. For each trial, values for the probabilistic parameters were randomly sampled from their probability distributions.

Figure 7:
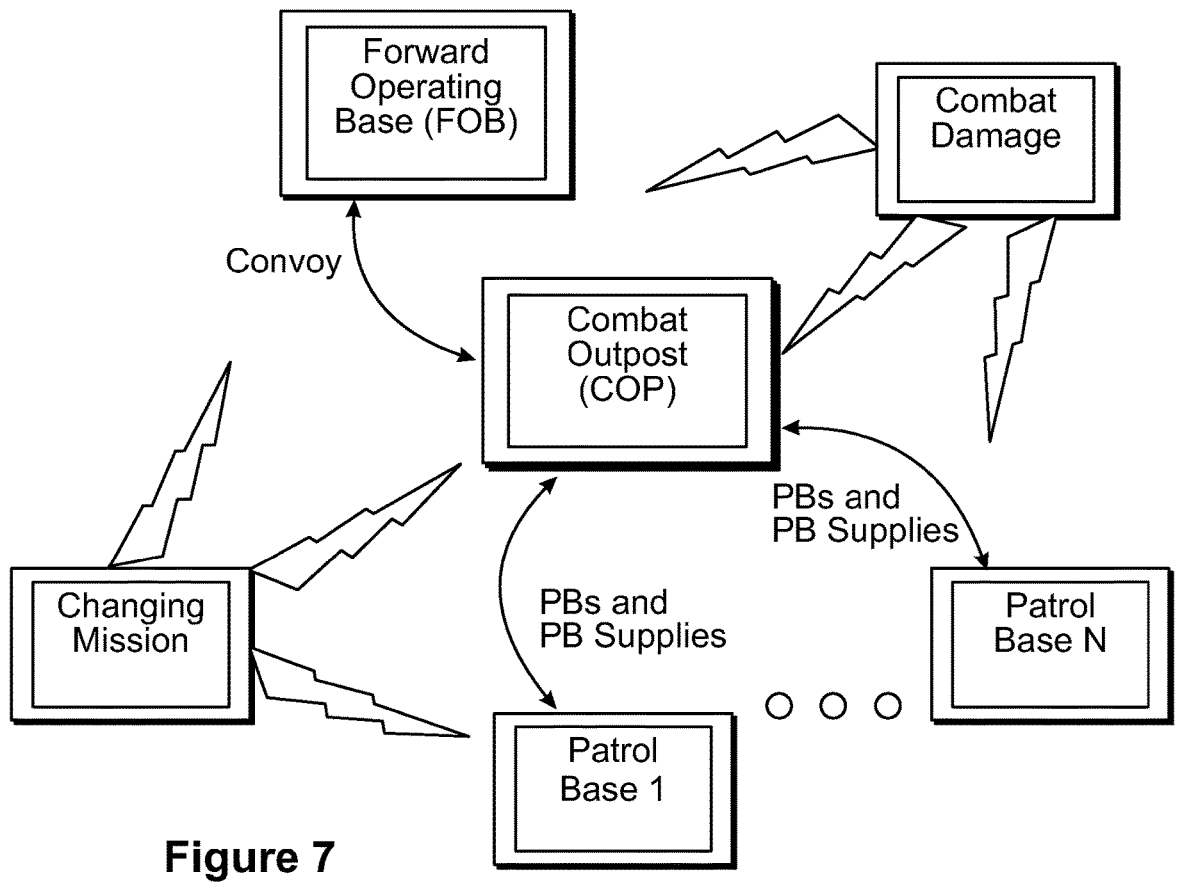
FIG. 7 shows a military deployment adaptability metric test case according to an exemplary embodiment of the disclosure.

Simulation results are summarized in FIG. 7. The histogram shows the distribution of PB availability for the 1000 trials ranges from about 45% to close to 100%, with most trials achieving more than 90% PB availability. The figure also indicates the areas of the better-performing trials (the Upper 25%) and the worse-performing trials (the Lower 25%).

Figure 8:
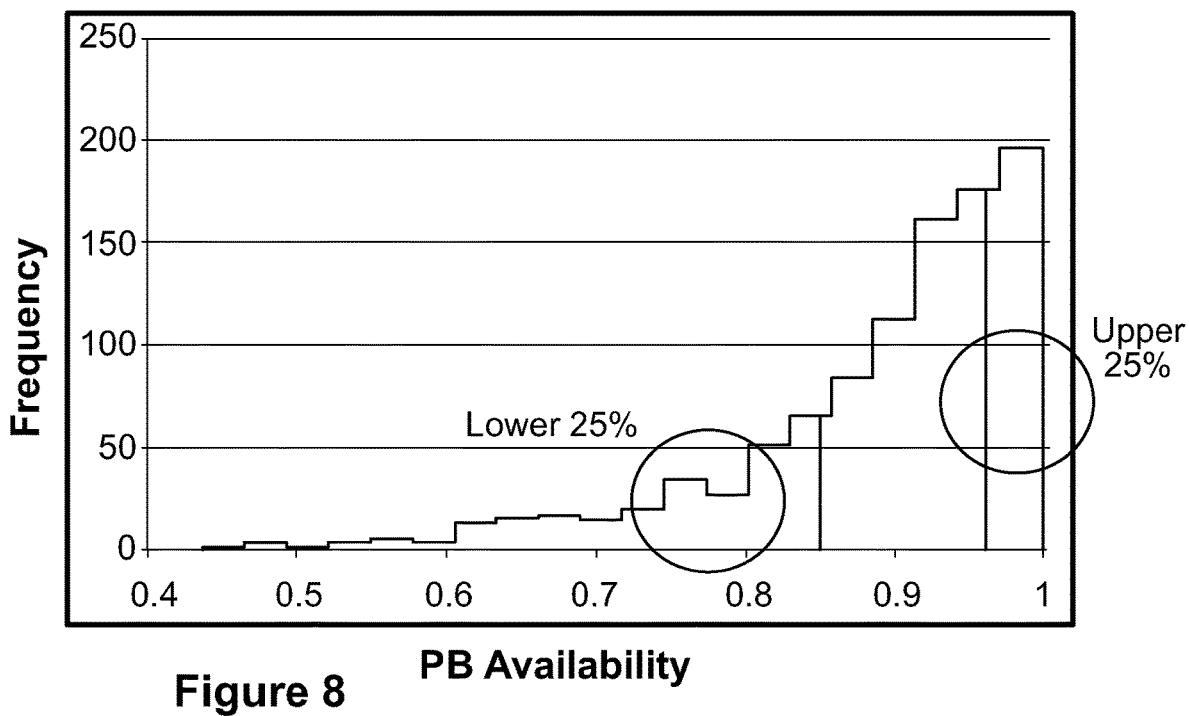
FIG. 8 shows histogram results of an example of 1000 trials of military deployment test case according to an exemplary embodiment of the disclosure.
Figure 9:
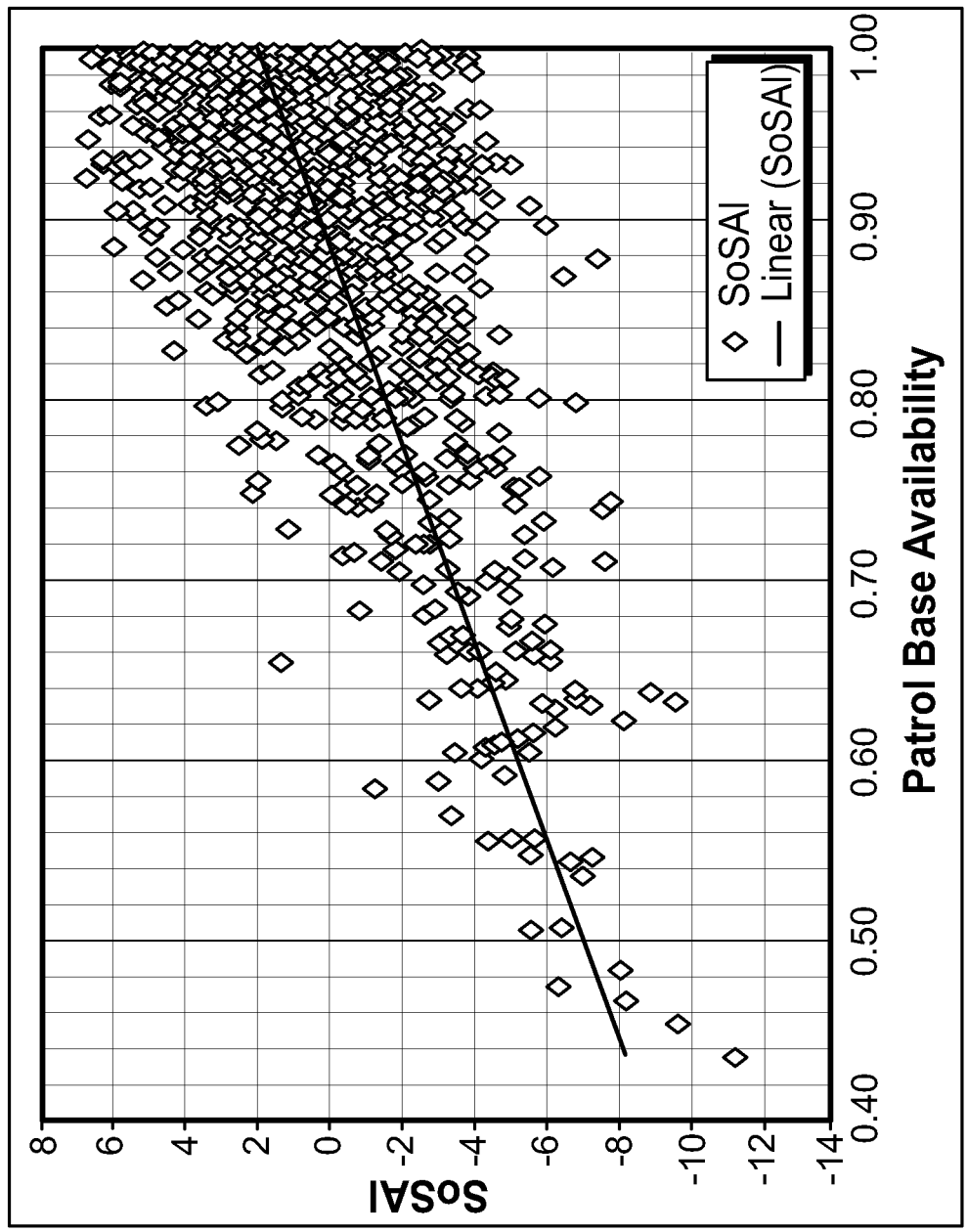
FIG. 9 shows a chart of SoSAI as an indicator of performance for 1000 trials according to an exemplary embodiment of the disclosure.

So do these results show whether an independently derived SoSAI was a good indicator of higher and lower performance. FIG. 8 presents a scatterplot of the SoSAI for the 1000 trials (calculated from the adaptability metrics in Table 17) plotted against PB availability (Table 17). The SoSAI trend line for these data was calculated using a least squares fit. The plot shows that SoSAI captures the basic trend in the test-case results.

Given the wide range in SoSAI for the better-performing trials, can SoSAI be used to distinguish between the better-performing and the worse-performing trials? To address this question, the trials were separated into two populations: those in the lower quartile of performance (250 trials ranging from 45% to 75% PB availability), and those in the upper quartile of performance (250 trials ranging from 96% to 100% PB availability). It is noted that much of the difference between these populations is caused by the lower quartile having to deal with more required PBs or with more combat damage. These two confounding factors were controlled by matching trials in the lower quartile with the corresponding trials in the upper quartile that: (1) differed in their time-weighted average of PBs fielded by 10% or less, and (2) differed in their number of replacement systems ordered, again by 10% or less (in the test case, systems are only reordered if there is disabling combat damage). Only 42 pairs of trials (out of the 1000) were discovered with these correlating characteristics. The 42 trials from the lower quartile were called the "worse performers", and the 42 trials from the upper quartile were called the "better performers". As mentioned above, the worse performers were assumed to be less adaptable, because they performed worse than the better performers with the same varying mission and uncertain threat environments.

Figure 10:
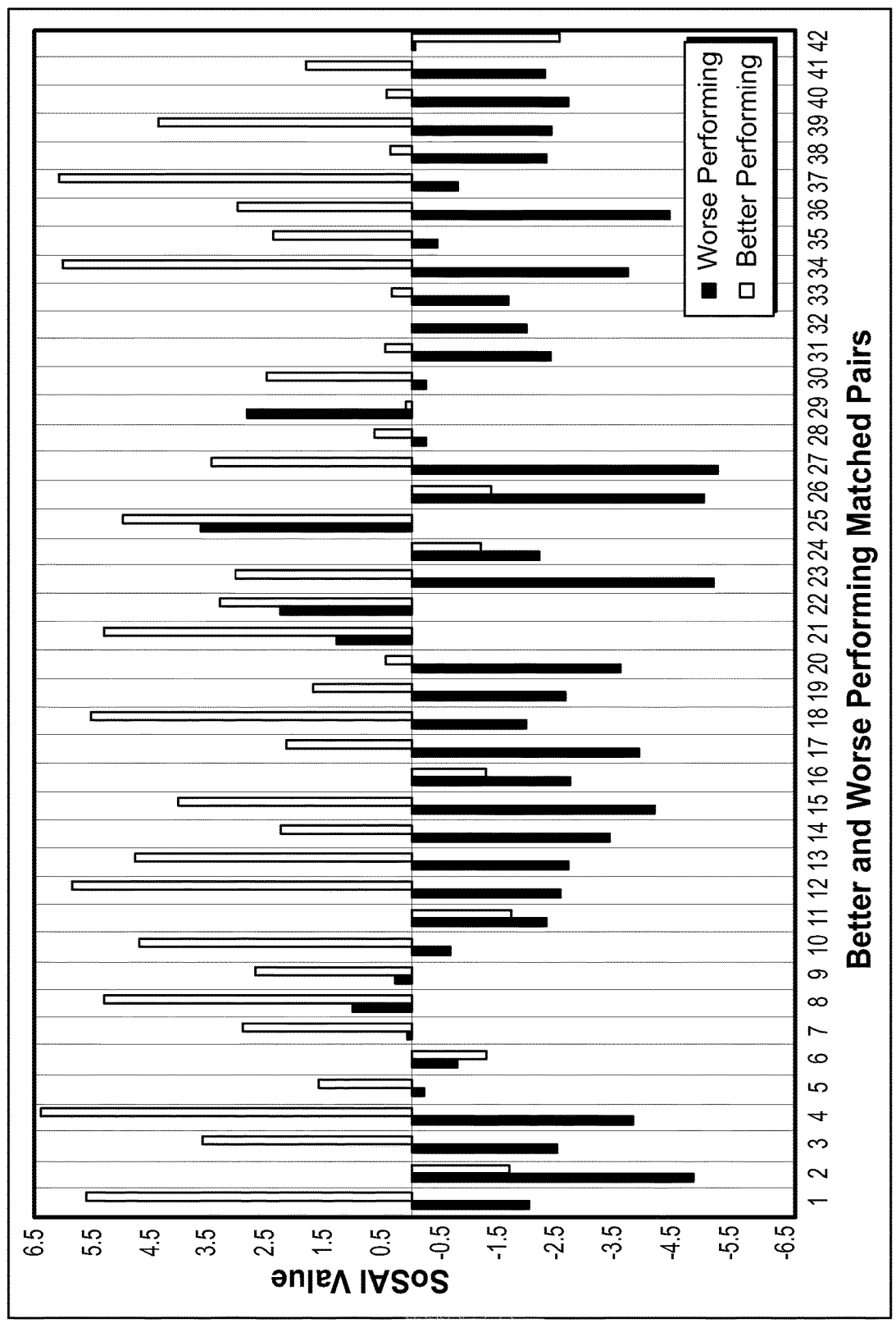
FIG. 10 illustrates SoSAI as indicator of better and worse performing trials according to an exemplary embodiment of the disclosure.

FIG. 10 shows the SoSAI for each of the 42 matched pairs. In the plot, the numbers along the x-axis indicate the 42 pairs. Each pair is represented by a red bar and a green bar. The red bar indicates that the trial belongs to the worse-performing population and the green bar indicates that the trial is from the better-performing population. Of interest is whether the green-bar (better-performing) SoSAI is greater than the red-bar (worse-performing) SoSAI for a given pair of trials. The better-performing SoSAI is shown to be greater than the worse-performing SoSAI in 39 pairs. In only three pairs (numbers 6, 29, and 42) is the reverse true: the worse performing SoSAI is greater than the better performing SoSAI. In addition, the average SoSAI for the 42 better performers is 2.31; the average SoSAI for the worse performers is −1.84. Thus, in most of the matched trials, and on average overall, SoSAI—which is based only on adaptability metrics and not performance metrics—discriminated the better performers from the worse performers.

A single-tail paired t-test was applied to determine if the results were significant. The t-test indicates that the probability of the difference between the SoSAIs of the 42 better performers and the SoSAIs of the 42 worse performers being due to chance alone is $8 \times 10^{-11}$, so the results are statistically significant and the 42 pairs represent an adequate sample size.

How well do the individual adaptability metrics distinguish the better-performing trials from the worse-performing trials is also examined. Table 20 shows the difference between the averages of the individual metrics for the better-performing half and the worse-performing half of the matched pairs. The difference is calculated as follows:

$$\text{Difference} = \frac{ave(\text{better}) - ave(\text{worse})}{ave(\text{worse})}.$$

TABLE 10

Adaptability Metric Percent Difference for Better- and Worse-Performing Matched Pairs

| Groupings | Adaptability Metric | Measure | Difference |
|---|---|---|---|
| Test Case Initial Condition (Possibly Predictive) | Logistics Capability Storage Complexity Overdesign | Convoy Frequency Minimum Number of Fuel Suppliers Initial Number of PBs at COP Fuel Storage Capacity at COP | −15% 61% 2%* 16% |
| Test Case Simulation Results | Logistics Capability Storage Complexity Overdesign | Failed PB Fuel Orders Storage Utilization Number of Systems in Transit Average Fuel Level | −92% 33% −15% 52% |

*Inconsequential

For all but one of the measures, there is a notable difference between the better and worse performers. As the test case was primarily a logistics simulation, the clearest discrimination occurs with the adaptability metric for logistics capability. For the most part, the individual metrics discriminate between the better- and worse-performing groups, indicating that the individual adaptability metrics are viable measures of adaptability.

In summary, (1) the test case presented here involved SoS performance with changing mission and uncertain threat environments. (2) The adaptability metrics were developed independently of the test case. (3) The adaptability metrics and SOSAI most often distinguished between the higher and lower performing designs, although not perfectly. It can be concluded that the adaptability metrics have value in indicating SoS designs with greater adaptability. Caveats can be made that the test case is a notional example, and the adaptability metrics are relative and only apply to comparison of similar designs, thus more experimentation and evaluation are required.

SoS Design for Systems Re-Tasking

According to another embodiment of the disclosure, methods, systems, and computer program products for providing an informed SoS based on effective re-tasking are provided. Systems re-tasking (aka stand-in redundancy) is the process of using different systems to substitute for non-operational systems to meet required functionality, or using multi-function systems to fulfill higher-priority tasks. This ability can increase the overall operational availability of the SoS; it can also increase the adaptability and resilience of the SoS to unknown or changing conditions. The disclosed methods, systems and computer program products include simulating an SoS over time, replacing systems that become non-operational (or damaged) with systems that can fulfill the same capability in order to maximize the SoS availability. The end result is a design for the SoS that uses effective systems re-tasking to achieve mission success. Systems re-tasking has the potential benefits of reducing costs, increasing efficiencies, increasing availability, plus allowing more adaptable and resilient SoS.

The ability to substitute different systems for non-operational or disabled systems when needed to fulfill different or higher-priority functions, is an important and inherent aspect of many SoS. This ability is called systems re-tasking or stand-in redundancy. An example of systems re-tasking is, if satellite communication fails, the communications capability of Unmanned Aerial Vehicles (UAVs) that are usually tasked only with targeting would be used to temporarily fulfill the higher-priority satellite communication capability.

Another example is switching personnel who are trained in two areas (e.g., trained in communications and base protection) from one area to the other as priorities demand. Systems re-tasking has the potential benefits of reducing costs, increasing efficiencies, increasing availability, and providing more adaptable and resilient SoS.

Figure 11:
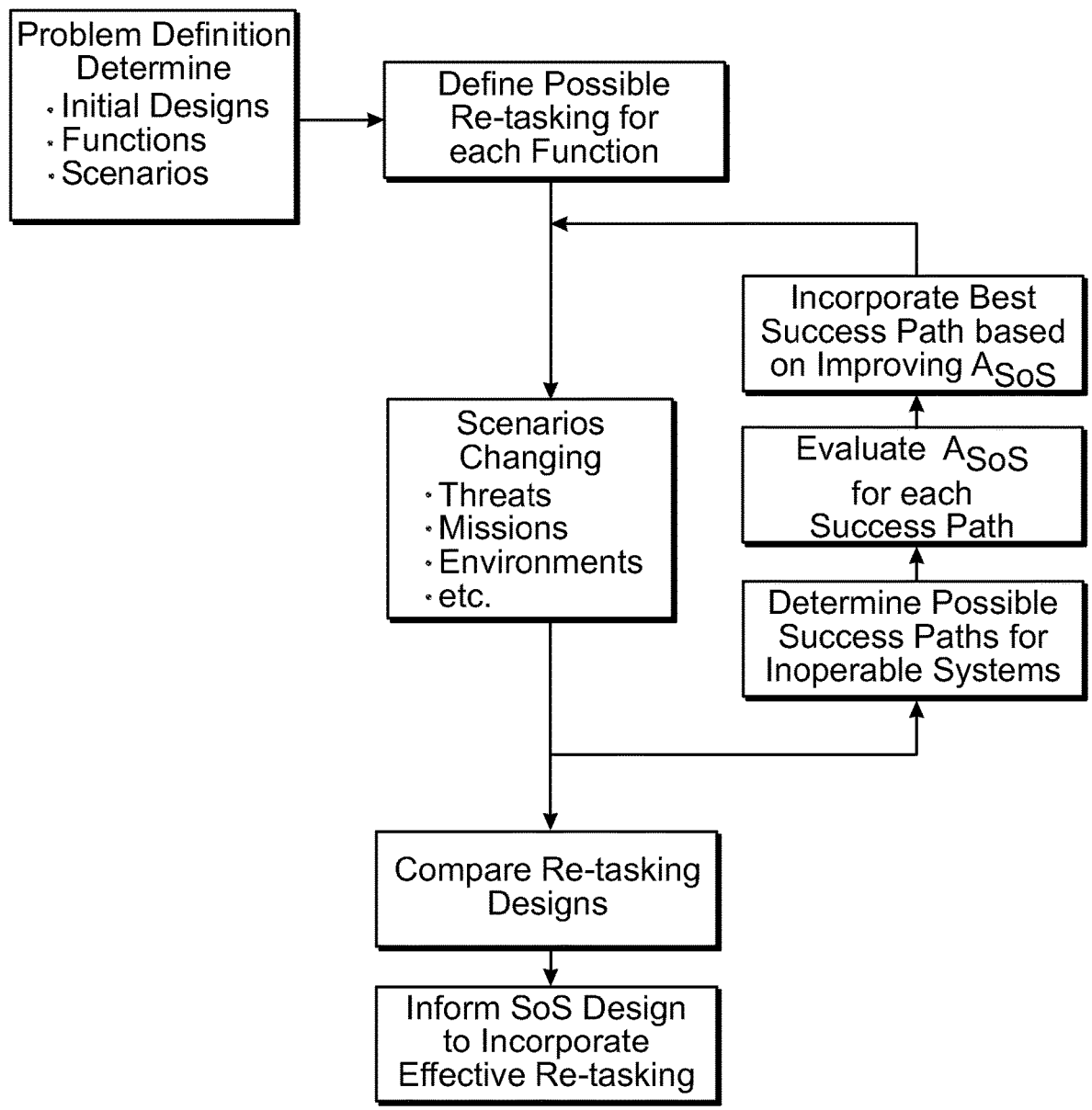
FIG. 11 shows a diagram of a method to determine an effective design for re-tasking systems in an SoS subjected to changing missions, threats, and environments according to an exemplary embodiment of the present disclosure.

FIG. 11 shows a diagram of a method to determine an effective design for re-tasking systems in an SoS subjected to changing missions, threats, and environments according to an exemplary embodiment of the present disclosure. The steps may vary based on application-specific requirements. Details could vary from implementation to implementation, for example by iterating among a subset of the steps to broaden the range of scenarios considered based on preliminary results. In the following, each step is discussed in greater detail.

Referring to FIG. 11, the method includes the following steps:

Problem Definition.

Before starting, it is necessary to have a clear definition of the problem to be solved; the functions that the SoS should fulfill that might be subject to systems re-tasking, and the kinds of scenarios for which improved adaptability and performance are desired. The primary metric for this analysis is the availability of the SoS ($A_{SoS}$), but other adaptability and performance metrics could be also be used. Due to the generality of the metrics list, not all metrics will apply to a given situation. Thus, it is necessary to consider each metric in the list and determine whether it is applicable to the systems being evaluated.

Systems Re-Tasking Definition.

The collections of systems needed to fulfill all applicable functions should be defined. For any given function, each fulfilling collection of systems should differ from other fulfilling collections by the type or numbers of systems of a given type.

Scenarios.

The scenarios used for the evaluation step can include many types of changes appropriate to comparison of the systems, including changing threats, missions, budgets, environments (e.g., changing weather conditions, natural disasters), etc. The comparison could be done for a set of fixed scenarios, but stochastic simulations with random variation of important variables can be more appropriate. Random variations (for example, of the timing and magnitude of changes in threat or mission) introduce unpredictability and allow evaluation of how well a given design is able to cope with this unpredictability. A major issue with determining acceptable strategies is how to handle unforeseen (and even unforeseeable) situations. An approach to addressing such possibilities could be to include some random loss or degradation of system functions in the scenarios in addition to the "expected" losses and degradations caused by known threats, changes in environments, etc.

Success Paths.

For each scenario, whenever systems become inoperable, determine the possible ways to adjust to the situation. Systems can become inoperable due to reliability issues, combat damage, environmental interactions, etc. Possible ways to adjust to the situation include repairing the system, ordering new systems, re-tasking systems within the SoS, etc. Typically, there is more than one possible collection of new systems that can be ordered and, similarly, there can be more than one possible way to re-task systems. Each possible improvement is a success path.

Evaluate $A_{SoS}$ for Each Success Path.

For each success path, evaluate the availability of the SoS. In a general situation, say we have $N_F$ functions involving $N_S$ system types, and there are $N_P$ success-path combinations. Then the $A_{SoS}$ is calculated as follows $$A_{SoS}(t) = \text{Max}\left(\text{Min}\left\{\frac{A_j(t)}{R_{j,k}}; j=1, N_S\right\}; k=1, N_P\right)$$

(Note, ASoS is used here having slightly modified parameters from the earlier usage herein, however, the methodology is consistent. In this application, there is a distinction between systems that can re-task and perform their original function at the same time and those that cannot.) Here, $A_j(t)$ is the number of systems of type j available at time t and $R_{j,k}$ is the required number of systems of type j for success-path combination k. Note that $A_{SoS}$ changes with time according to the availability of the SoS. The required number of systems is given by $$R_{j,k} = \sum_{i=1}^{N_F} P_{i,j,k}$$

for case 1 (no concurrent sharing of systems between functions)

$R_{j,k} = \text{Max}(P_{i,j,k}; i=1, N_F)$ for case 2 (systems can be shared between functions)

where $P_{i,j,k}$ is the required number of system type j for function i in success-path combination k. In this step, for every success path, $A_{SoS}$ is calculated for the entire SoS.

Incorporate Best Success Path.

Choose the success path that gives the best $A_{SoS}$, and continue the assessment. Often there is more than one success path that has the greatest $A_{SoS}$. In this case, one method of selecting the best $A_{SoS}$ is to select it at random from the best possibilities. Other screening criteria include cost, fuel efficiency, maintenance and reliability history, availability of mechanics, etc. At some point in every scenario, no success paths will be able to improve upon $A_{SoS}$. This eventuality can be estimated after many attempts to find improving success paths. At this point, the SoS will exhibit the most effective systems re-tasking.

Compare Systems Re-Tasking Designs.

Systems re-tasking designs can differ between scenarios and even within a single scenario. The systems re-tasking designs of interest can be compared for particular scenarios, or for the entire set of scenarios by using suitable statistical measures. Some designs might be better for some scenarios, and other designs will be better for other scenarios. Thus, all design choices should be evaluated together to determine the best courses of action. Knowledge gained from the design comparison could potentially be applied to similar situations (i.e., similar designs and scenarios) without having to rerun the entire method.

Inform SoS Design.

The final step is to use the quantitative comparison results to help select the "best" designs, where "best" refers to the designs that best meet the given criteria and requirements. The selection is informed by the insight gained from the performance, but other sources of information can be used as well, including cost of the design, scoring from adaptability measures, minimizing the number of systems involved (which can correlate with the use of multi-functional systems), etc. Tradeoffs will likely be necessary. As an example, the most effective systems re-tasking design might not be the lowest-cost design, so additional weightings might be needed, to define the relative importance of cost and performance.

The present disclosure further includes a novel availability metric, SoS Availability ($A_{SoS}$) that allows measuring availability of an SoS utilizing systems re-tasking. The methods, systems and computer program products include simulating an SoS over time, replacing non-operational or damaged systems with systems that maximize $A_{SoS}$. In this way, the SoS evolves to a state that incorporates the maximum systems re-tasking to achieve mission success. This final evolved state would be the initial design of the SoS.

Purpose $A_{SoS}$ determines the effect of the re-tasking by measuring the availability of an SoS with multiple functions, composed of multiple systems that can be used to accomplish more than one of the functions as depicted in FIG. 10.

Figure 12:
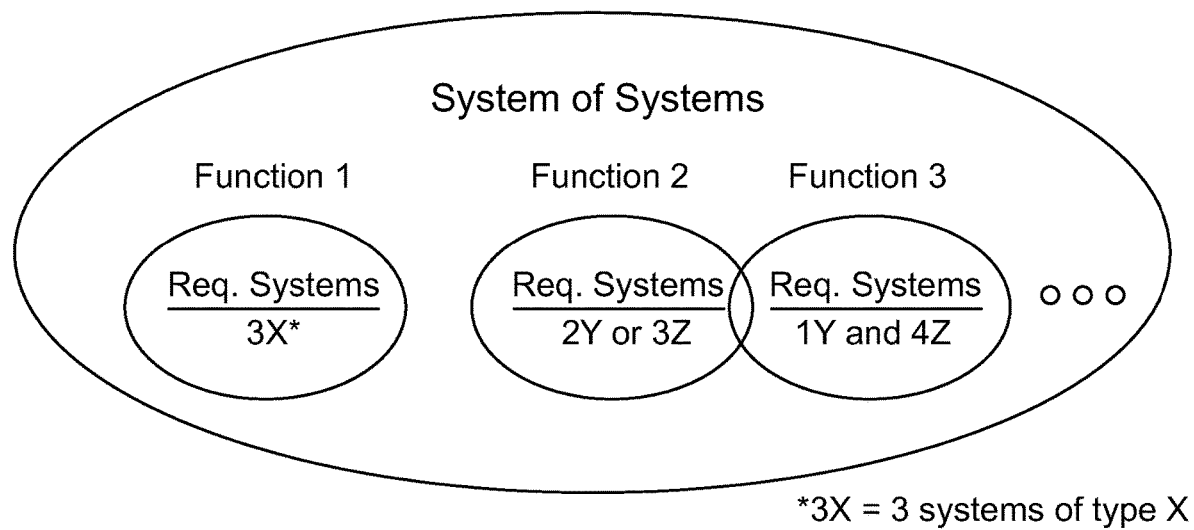
FIG. 12 shows an SoS with multiple functions that can be fulfilled by different sets of different systems according to an exemplary embodiment of the disclosure.

FIG. 12 shows and SoS with multiple functions that can be fulfilled by different sets of different systems. Function 1 has one success path (3X), Function 2 has two (either 2Y or 3Z), and Function 3 has one (1Y and 4Z both required). Evaluation depends on two factors:

1. At a given time are all 3 functions operating concurrently?
2. In general can system Y or Z perform two functions at once?

If the functions are performed concurrently and the systems cannot multitask, then either {3X, 3Y, 4Z} or {3X, 1Y, 7Z} are required for full functionality. If functions are never concurrent or the systems can multitask then either {3X, 2Y, 4Z} or {3X, 1Y, 4Z} are required. The set of system requirements within braces is called a success-path combination.

Now consider that the operating and operable systems are 3X, 1Y, and 2Z. For the first case, where systems cannot multitask, either {3X, 3Y, 4Z} or {3X, 1Y, 7Z} are required. In either success-path combination we have sufficient X systems, but with the first combination we only have ⅓ of the required Y systems and ½ of the required Z systems. With the second combination, we have sufficient Y systems, but only 2/7 of the required Z systems. For a given combination ASoS is defined by taking the minimum over systems for the combination, so the ASoS for the first combination is 1/3 and the ASoS for the second combination is 2/7. Assuming that systems are deployed in order to maximize ASoS, the first combination would be used and the ASoS would be 1/3. The formula for ASoS would thus be written, ASoS=max(min{3X/3X, 1Y/3Y, 2Z/4Z}, min{3X/3X, 1Y/1Y, 2Z/7Z})=1/3. For the second case, with multitasking, the evaluation would be ASoS=max(min{3X/3X, 1Y/2Y, 2Z/4Z}, min{3X/3X, 1Y/1Y, 2Z/4Z})=1/2.

Generalization

In a general situation, say we have $N_F$ functions involving $N_S$ system types, and there are $N_P$ success-path combinations. Then the $A_{SoS}$ is given by $$A_{SoS}(t) = \text{Max}\left(\text{Min}\left\{\frac{A_j(t)}{R_{j,k}}; j=1, N_S\right\}; k=1, N_P\right)$$

Here, $A_j(t)$ is the number of systems of type j available at time t and $R_{j,k}$ is the required number of systems of type j for success-path combination k. Note that $A_{SoS}$ changes with time according to the availability of the SoS. The required number of systems is given by $R_{j,k} = \Sigma N_{i=1}^{N_F} P_{i,j,k}$ for case 1 (no concurrent sharing of systems between functions)

$R_{j,k} = \text{Max}(P_{i,j,k}; i=1, N_F)$ for case 2 (systems can be shared between functions)

where $P_{i,j,k}$ is the required number of system type j for function i in success-path combination k.

Assumption

In the remainder of this description, it is assumed that systems cannot be shared concurrently between functions for case 1 and systems can be shared between functions for case 2. The formulation can be modified to allow a mix of these two assumptions.

Using $A_{SoS}$ to Design SoS

Figure 13:
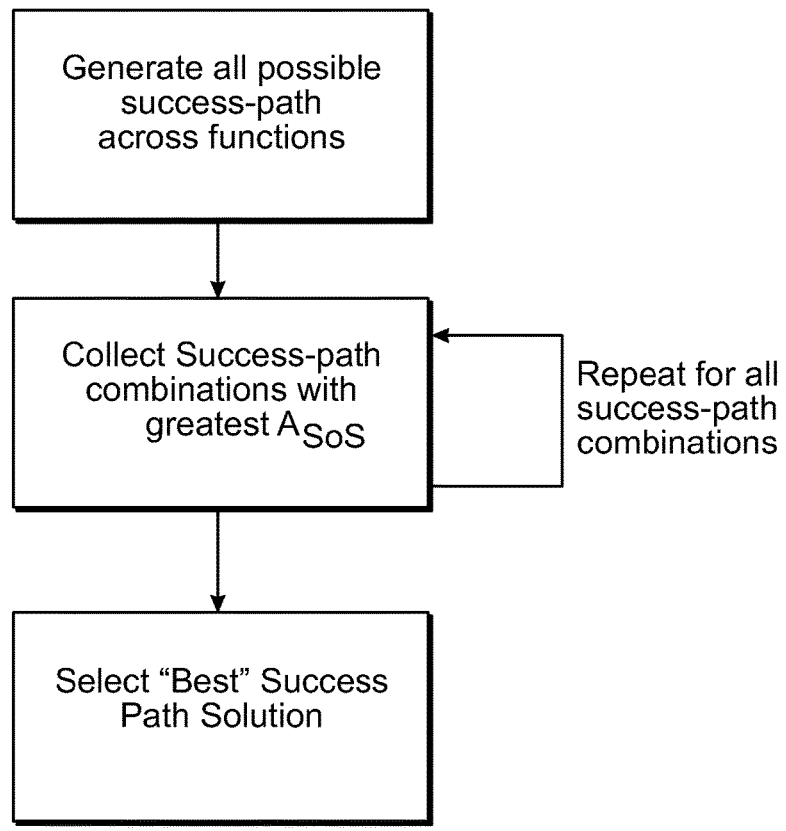
FIG. 13 shows an algorithm flow for evaluating $A_{SoS}$ according to an exemplary embodiment of the disclosure.

There are two algorithms needed here: one to evaluate $A_{SoS}$ and one to determine which systems to replace whenever $A_{SoS}$ falls below a desired level. One implementation of the first algorithm is depicted in FIG. 13.

The algorithm proceeds as follows:

Generate Success-Paths: The algorithm generates every combination of success paths across the functions. Each combination is viewed as an M-tuple and coordinate i contains the success path number selected for function i. Every success path is characterized by the system types and their count that could be used to satisfy the function. So, the required system types can be either summed or their maximum is found for the combination (for case 1 or case 2, respectively).

Collect List of Best Success-Paths: Over all possible success-path combinations those that yield the greatest value of ASoS are collected.

Select Best Success-Path: If there is only one success-path combination, it is the best. Otherwise, there is a secondary screening that selects those combinations that require the fewest total number of systems (a simple efficiency/cost criterion). If there are still multiple candidate combinations, we select one at random from that list. Other possible screening criteria could consider cost, fuel efficiency, maintenance and reliability history, availability of mechanics, etc.

Figure 14:
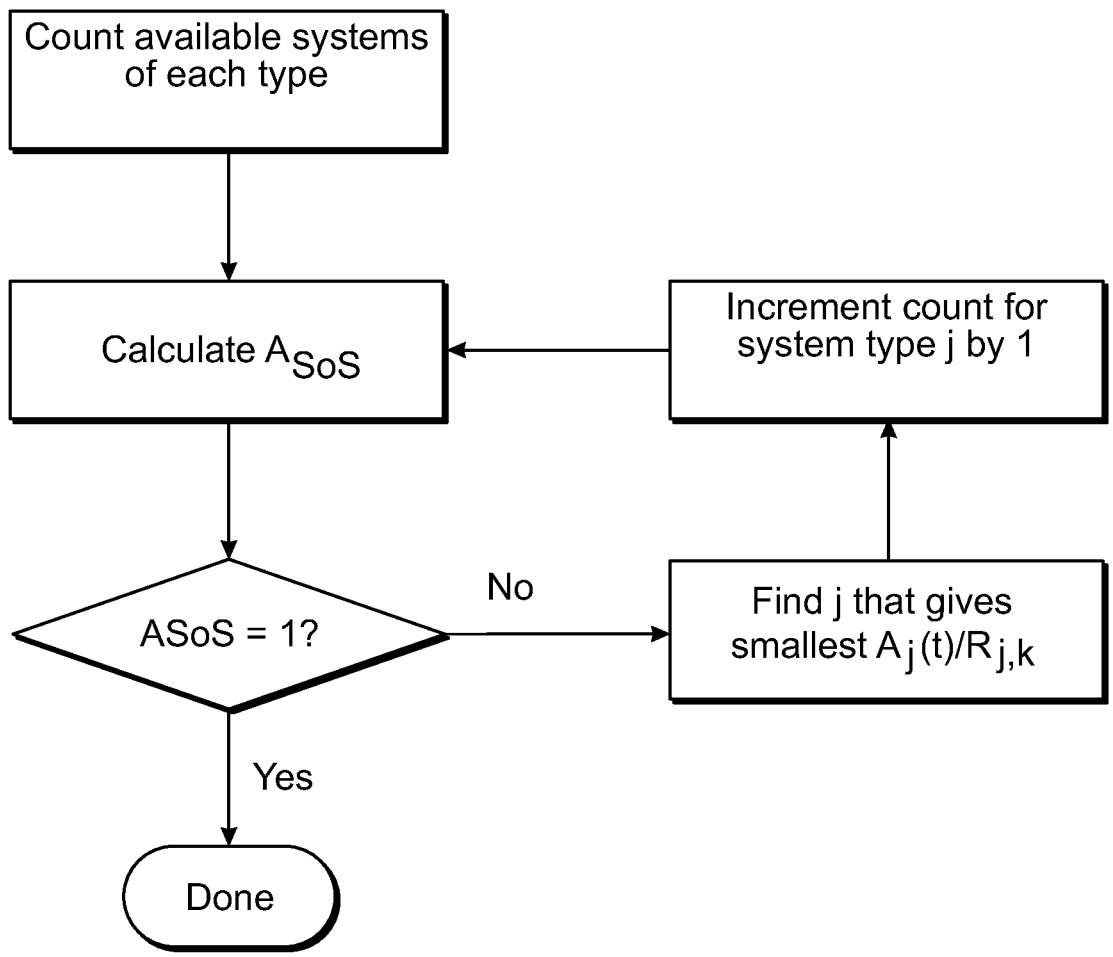
FIG. 14 shows a flowchart for determining which systems to order according to an exemplary embodiment of the disclosure.

The second algorithm determines a set of replacement systems to obtain to increase ASoS back to unity. An example implementation of this algorithm is shown in FIG. 14.

One implementation of obtaining the replacement systems proceeds as follows:

1. Count Available Systems: The number of available systems is found only for system types involved in the functions. These counts include systems that are operating plus those that are present but may be down for repairs or out of fuel.
2. Calculate $A_{SoS}$: The current counts are used to determine $A_{SoS}$ as described in the previous algorithm.
3) $A_{SoS}$ check:
   If ASoS=1, go to step 6
   If ASoS<1, go to step 4.

Determine the system type to order, system type j: The calculation of ASoS in step 2 preserves the winning success-path combination, k, so we know Rj,k for each system type j. Because we also know Aj(t) at the current time t, we can find the minimum value of Aj(t)/Rj,k across system types j. This minimum ratio determines the value of ASoS for combination k (the best combination). So, it is the only system type that can be increased that will increase ASoS, for combination k. (If we do not increment the count for system type j, ASoS will remain the same because j is driving the minimum).

Increment the count for system type j: The new extra system is not currently present, but will be with the next convoy. We assume it is present now and recalculate ASoS to determine if any other systems should also be ordered.

Done: When sufficient systems are identified that will restore ASoS to 1, the algorithm is complete and the systems are ordered.

EXAMPLE

The example problem setup has five system types (Table 21) that can perform four functions (Table 22). The UHMV is only used for one function (internal security). The AHMVs and APVs can help serve 3 functions. The RVs and EVs can help serve 2 functions. This example assumes case 1—no sharing of systems between functions.

TABLE 21

Example problem functions.

| | System Type |
|---|---|
| 1 | Unarmored HMMWVs (UHMV) |
| 2 | Armored HMMWVs (AHMV) |
| 3 | Raider Vehicles (RV) |
| 4 | Area Presence Vehicles (APV) |
| 5 | Escort Vehicles (EV) |

TABLE 22

Example problem functions with success-paths shorthand.

| Function | # Success Paths | Possible Success Paths |
|---|---|---|
| Internal Base Security | 4 | {3 UHMVs} |
| | | {2 UHMVs and 1 AHMV} |
| | | {1 UHMV and 2 AHMVs} |
| | | or {3 AHMVs} |
| Base Perimeter Security | 5 | {4 AHMVs} |
| | | {3 AHMVs and 1 APV} |
| | | {2 AHMVs and 2 APVs} |
| | | {1 AHMV and 3 APVs} |
| | | or {4 APVs} |

TABLE 22-continued

Example problem functions with success-paths shorthand.

| Function | # Success Paths | Possible Success Paths |
|---|---|---|
| Conducting Raids | 4 | {4 RVs}<br>{2 RVs and 4 APVs}<br>{2 RVs, 2 APVs, and 2 EVs}<br>or {2 RVs and 4 EVs} |
| Maintaining Area Presence | 3 | {4 APVs}<br>{2 APVs, 2 RVs, and 2 EVs}<br>or {2 APVs, 2 RVs, and 2 AHMVs} |

The Escort Vehicle (EV) type is also used to escort fuel deliveries to fielded patrol bases (PB). No other type of system can be used as a substitute for this task but the EVs can be used to help perform two of the four combat/security functions. The task to deliver fuel to the PBs is not explicitly included in the ASoS calculation as a function because of its intermittent nature. But it does cause potential resource contention for the use of the EVs, thereby implicitly affecting ASoS. If available systems are scarce, we must decide whether an EV can be released for a fuel delivery or should remain to help with raids and/or area presence. The potential release of an escort to accompany a fuel truck will cause ASoS to either stay the same or to decrease. If it stays the same the release is allowed. If it will drop but remain above the ASoS delivery threshold (input by the analyst) the release is allowed. Otherwise the commander disallows the delivery until other escorts or combat systems become available, which then results in a retest for the release.

The decision affects the ability to field patrol bases. If fuel is at a low level at a patrol base and a delivery is not forthcoming, the entire patrol base is withdrawn from the field. The time during which that patrol base should be fielded but is not reduces the PB availability metric, implying deployment failure.

Note that there are 240 possible success path combinations (4×5×4×3=240). Here we introduce a shorthand for a success-path combinations: (1, 1, 2, 2) is the combination of the first success path for the first function (i.e., {3 UHMVs} as shown in Table 2), the first path for the second function (i.e., {4 AHMVs}), the second path for the third function (i.e., {2 RVs and 4 APVs}), and the second path for the fourth function (i.e., {2 APVs, 2 RVs, and 2 EVs}). Each combination represents a possible system configuration to utilize. However, because a configuration is characterized by the system counts required by the combination of success paths, there is potential duplication. For example, the success-path combination (1, 1, 2, 2) requires 3 UHMVs, 4 AHMVs, 6 APVs, 4 RVs, and 2 EVs. The same set of systems is required by the combination (1, 3, 3, 3). Without duplicates there are 216 unique configurations.

Two questions are posed here
1) Is there a preferred configuration of systems (vehicles)?
2) If so, what improvement occurs over other configurations?

Question 1

Scanning the 216 unique success path combinations, the total number of systems required is always 15, 17, or 19. The counts of the system types required can vary widely. Success path combination (1, 2, 4, 3) requires a rather uniform count of {3, 5, 3, 4, 4} systems {3 UHMV, 5 AHMV, 3 RV, 4 APV, 4 EV}. Contrasting, success path combination (4, 5, 2, 1) requires a different count of {0, 3, 2, 12, 0} systems.

The method begins with success path combination (1, 1, 1, 1) because it does not involve any re-tasking, that is, each function is intended to be performed by a single system type. There are {3, 4, 4, 4, 0} systems required, which does not call for any EVs. However for this example there are 3 fuel trucks initially assigned with a minimum count of 2, so it makes sense to assign 3 EVs for fuel deliveries also with a minimum count of 2. In this regard, there is some initial overbuild for the ASoS calculation.

The minimum system count to maintain was set to 0 for each of the 4 non-Escort system types. This is important because it means that a replacement is not routinely ordered when a system becomes disabled. Systems are only ordered when ASoS has been below its threshold (0.8) for the prescribed amount of time (240 hours or 10 days). More than one system must be lost for ASoS to drop below its threshold in this example so the commander orders multiple system replacements. The identity and count of system types to order are determined using the algorithm described above. The ASoS delivery threshold was set to 0.6, so if escort systems are being used as stand-in redundant systems for conducting raids or maintaining area presence, and releasing an escort will cause ASoS to fall below 0.6, fuel deliveries are postponed.

Two hundred trials were run with the starting configuration of (1, 1, 1, 1). At the end of a 2-year simulation, the final system counts were extracted. Some trials had clearly converged to a fixed configuration while others were still in flux. If ASoS<1 at the end of the mission we continued the calculation until ASoS=1 and saved the resulting configuration.

The most noteworthy observations are:
1) No final configuration dominated, but some occurred more frequently than others.
2) For the 200 trials, the final configuration for 53 (26.5%) could be identified as one of two configurations:
   a) 29 instances of {0 UHMV, 7 AHMV, 4 RV, 4 APV, 0 EV}.
   b) 24 instances of {0, 7, 8, 2, 0}.
3) No UHMVs appear in either configuration, so internal base security is handled by the more versatile AHMV.
4) No EVs appear in either configuration, so the number of escorts present do not affect ASoS for these particular configurations, only the ability to deliver fuel.
5) The first configuration shown requires 15 systems, the minimum possible over all configurations, whereas the second requires 17.

Thus, we assert that the best configuration—the most versatile configuration—is {0, 7, 4, 4, 0}. We call this the most versatile configuration because it exhibits significant systems re-tasking to achieve high ASoS.

Question 2

To compare system configurations, the starting configuration is assumed to be the configuration specified by regulation. That is, when there is a loss, a new vehicle of that type is immediately ordered to reestablish the initial configuration. This is done in our simulator by setting the minimum system type counts to the initial counts and setting the ASoS threshold to 0.

The preferred configuration {0 UHMV, 7 AHMV, 4 RV, 4 APV, 0 EV} was run and compared to two other representative initial configurations: {3, 4, 4, 4, 0} and {0, 3, 2, 12, 0}. (No escort vehicles are included in the initial configurations in order not to penalize the preferred configuration because we omitted escorting the fuel deliveries to the patrol bases from the calculation of ASoS.) Two metrics are summarized in Table 21. Both are averaged over the 200 trials and over time within each trial. The differences in ASoS and PB availability are significant for the availability of an SoS, and the preferred configuration performs better in both metrics. The configuration with no intended re-tasking performs the worst in this case.

Table 23. $A_{SoS}$ and PB Availability calculated for three vehicle configurations, showing better performance for the more versatile configuration {0, 7, 4, 4, 0}.

TABLE 23

$A_{SoS}$ and PB Availability

| Starting | $A_{SoS}$ | PB Availability |
|---|---|---|
| {0, 7, 4, 4, 0} | 0.891 | 0.734 |
| {3, 4, 4, 4, 0} | 0.863 | 0.702 |
| {0, 3, 2, 12, 0} | 0.875 | 0.729 |

Conclusion

During the mission, if triggered by a time interval when ASoS is unacceptably low, the selection algorithm determines a set of systems to order that will raise ASoS back to 1. We have found that the resulting configuration changes over time cause migration to a few configurations that outperform the rest. The final configuration—the configuration that includes systems re-tasking—demonstrates the best overall performance and therefore should be used as the initial configuration in the SoS design.

Discussing the above example in more detail, the re-tasking methodology is exercised by designing a collection of vehicles involved in a military deployment. In the simulation, the mission is to support a changing number of patrol bases under the pressure of random combat damage. One finding of this effort is that systems involved in re-tasking should also be backed up (e.g., by re-tasking other systems) in the event that they become non-operational or disabled.

Introduction

In the military a forward operating base typically has a multi-function mission to accomplish and various systems to use toward that end. If some of the systems can help serve more than one function, there is flexibility in assigning systems to functions. This becomes important when systems are lost—likely due to disabling combat damage or catastrophic reliability failures. If there is no system assignment configuration that could be made to satisfy all functions, then an assignment should be made that maximizes overall functionality for the base.

If each function can only be performed by a single system type, then the availability of each function at a given time can be defined as the ratio of the number of available systems to the number required for the function. One way to define the overall availability for the base is by the minimum ratio taken across all functions.

If some systems are able to perform more than one function, a more general definition is required to compare different system assignment options. The methodology includes a single measure that can distinguish the efficacy of assignment options. The single measure is called Availability for Systems of Systems ($A_{SoS}$), discussed above. The term success path is used to describe a potential assignment of systems that can fully satisfy a single function and each function can have multiple success paths. When a success path is selected for a function, the systems required by it are taken from the pool of available systems and the systems that remain in the pool are then available for success paths of the other functions. The base commander has freedom to assign available systems to maximize $A_{SoS}$.

If the best $A_{SoS}$ is less than one at a point in time, there is no system assignment that results in all functions being fully available. Although the definition quantifies overall availability, it does not address the actual assignment of individual systems to individual functions. The issue addressed herein is what configuration of systems should be initially assigned to the base to help maintain high levels of $A_{SoS}$ throughout the mission of the base?

If system re-tasking is a possibility there are potentially multiple candidates that could be used as a starting configuration. To determine the best, one approach would be to assign each possible configuration as the initial configuration and run dSoS for the mission. The resulting average $A_{SoS}$ over the mission could be compared, along with other adaptability metrics, to select the best starting configuration.

To avoid the time required to develop input for multiple potential starting configurations, dSoS offers an alternative approach. As systems become inoperable during the mission, replacements are ordered using a prescribed algorithm (described in the next section). Using this approach it has been determined that the system configuration at the end of the mission tends toward a small number of preferred configurations. The best starting configuration could be selected from this small set or the set could be used as a screening step to reduce the number of initial configurations to implement into dSoS to compare.

Implementation

In dSoS the analyst defines:
1. The system types to be assigned to the COP, their initial count, and the minimum number to maintain.
2. The vulnerability of system type to enemy attack in the form of combat damage frequency rates and the probability that a hit will totally disable a system.
3. The functions that the COP must perform.
4. The system types and their counts that can be assigned to accomplish each function.

The first two items work together as follows. The initial count of systems will not change unless there is disabling combat damage. When that occurs, the COP commander only orders a replacement for the affected system if the loss of the system means that the minimum count will be violated for that system's type. Items 3 and 4 are used to define the terms of the equation for system of systems availability, $A_{SoS}$.

In the dSoS code, the number of systems available at a point in time is affected by combat damage and fuel supply. If a system is damaged but is repairable, it is not available during the repair time. If a system is disabled and a replacement is immediately ordered from the FOB, the replacement is not available until the next convoy arrives. The delay time is then the time interval until the next convoy departure plus the convoy travel time. Delays could also be affected because:

The system is disabled after the next convoy has already departed, in which case the delay includes the total time between convoys.

The incoming replacement system is damaged while its convoy is en route. If the damage is disabling, the replacement is reordered for the next convoy. If the damage is repairable the system proceeds to the base either under its own power or is towed. Once it arrives, repair begins and the system is not available until repairs are complete.

The entire convoy is destroyed and the convoy rebuild time is added to the delay.

The fuel tanks at the COP are empty. When this happens the systems operate until their fuel is depleted and they are no longer available at that point in time. When a convoy successfully arrives with fuel, the systems are refilled and can resume their function.

During the time delays the value of $A_{SoS}$ can fall below 1 and the base will be operating at less than full functionality. If $A_{SoS}$ is too small for some period of time, the base commander has a decision to make. In addition to the above input, the analyst can also supply:

1. A threshold value for $A_{SoS}$. At any point in time that $A_{SoS}$ falls below this fraction, dSoS begins to accumulate the consecutive time when the threshold is violated.
2. A time for action (hours). If the consecutive time under the threshold reaches this value, it signals a time for action.
3. An action to take. Currently in dSoS there are 4 possibilities:
   a. Commander aborts the mission (all simulation stops, for the current trial)
   b. Commander orders additional system(s)
      i. Order one of the most critical system type and increase its minimum count
      ii. Order sufficient systems to bring $A_{SoS}$ up to 1, but do not increase the minimum counts
   c. Commander does nothing. The adaptive enemy can sense weakness and become more aggressive, according to a user-specified combat damage rate multiplier.

This analysis focuses on the second sub-option of option b. When time for action occurs, dSoS uses the following algorithm to determine the set of systems to order:

1. Find the number of available systems for system types involved in the functions. These counts include systems that are operating plus those that are present but may be down for repairs or out of fuel.
2. From the available systems find the best success path combination (discussed below) and calculate $A_{SoS}$.
3. If $A_{SoS}=1$, save the systems to order and exit the algorithm.
4. Else, determine the system type that has the smallest ratio of available-to-required for the best combination.
5. Add one of that system type to the list of systems to order and temporarily assume it is now present and available (i.e., add one to the current available system count).
6. Go to step 2.

To avoid duplication, dSoS examines the currently placed orders for the next convoy. If a system is already ordered, it removes it from the list generated here. This will frequently occur if the minimum count for a system type is set to the initial count, thereby lessening the impact of this action. In the initial example problem setups the minimum counts are set to 0 so this algorithm solely determines which replacement systems to order.

In step 2 dSoS examines all possible success path combinations and collects those that yield the greatest value of $A_{SoS}$. If there is only one such combination it is the best. Otherwise, there is a secondary screening that selects those combinations that require the fewest total number of systems. If there are still multiple candidate combinations, the code selects one at random from that list. Other possible screening criteria could consider system type fuel efficiency, maintenance and reliability history, availability of mechanics, etc. These are not currently included in dSoS.

As the simulation advances in time over the mission, the number of times the commander must act largely depends on the frequency and severity of combat damage on the affected system types (dSoS does not currently account for catastrophic reliability failures). To see the effect of commander actions on the system type configuration, the combat damage rates should be relatively high, implying an aggressive enemy.

Example Systems Re-Tasking Problem Setup

The problem setup has 4 functions that the combat systems at the COP are to perform and is assigned 4 system types for these functions, as numbered in Table 24.

TABLE 24

Example System Re-Tasking Example Problem Setup

| Number | Function | Number | System Type |
|---|---|---|---|
| 1 | Internal Base Security | 1 | Unarmored HMMWVs (UHMV) |
| 2 | Base Perimeter Security | 2 | Armored HMMWVs (AHMV) |
| 3 | Conducting Raids | 3 | Raider Vehicles (RV) |
| 4 | Maintaining Area Presence | 4 | Area Presence Vehicles (APV) |

The success paths for each function exhibit the stand-in redundancy for the system types:

Internal base security requires any combination of 3 UHMVs or AHMVs. For the purposes of dSoS this input requires 4 success paths. Let the first number represent UHMVs and the second number represent AHMVs. The 4 success paths are then: (3, 0), (2, 1), (1, 2), and (0, 3).

Perimeter security requires any combination of 4 AHMVs or APVs. For the purposes of dSoS this input requires 5 success paths. Let the first number represent AHMVs and the second number represent APVs. The success paths are then: (4, 0), (3, 1), (2, 2), (1, 3), and (0, 4).

Raids are conducted using either {4 RVs} or {2 RVs and 4 APVs}.

Area presence is assured using one of 2 success paths: {4 APVs} or {2 APVs, 2 RVs, and 2 AHMVs}.

The UHMV is only used for one function (internal security). The AHMV and APV can help serve 3 functions. The RVs can help serve 2 functions. There are 80 possible success path combinations (4•5•2•2). Each combination represents a potential system configuration to deploy at the COP. The questions are 1. Is there a preferred configuration?
2. If so, what improvement occurs over other configurations?

Question 1

Scanning the 80 success path combinations, the total number of systems required is always 15, 17, or 19. The counts of the system types required can vary widely. Success path combination {1, 1, 1, 1} requires a uniform count of {3, 4, 4, 4} systems {UHMV, AHMV, RV, APV}. Success path combination {4, 5, 2, 1} requires a disparate count of {0, 3, 2, 12} systems.

The analysis was started with success path combination {1, 1, 1, 1} because it is the most uniform and does not involve any re-tasking, that is, each function is initially intended to be performed by a single system type.

The minimum system count to maintain was set to 0 for each of the 4 system types. This is important because it means that a replacement is not routinely ordered when a system becomes disabled. Systems are only ordered when $A_{SoS}$ has been below its threshold (0.8) for the prescribed number of hours (240, or 10 days). More than one system must be lost for $A_{SoS}$ to drop below its threshold in this example so the commander orders multiple system replacements. The identity and count of system types to order are determined using the algorithm described above for option b part ii.

The starting configuration was run for 200 trials. At the end of the 2-year simulation, the final system counts at the COP were extracted. Some trials had clearly converged to a fixed configuration while others were still in flux. If $A_{SoS} < 1$ at the end of the mission we mimicked the commander reorder protocol until $A_{SoS} = 1$ and saved the resulting configuration.

The most noteworthy observations were:

No final configuration dominated, but some occurred more frequently than others.

For the 200 trials, the final configuration for 97 (48.5%) could be identified as one of 2 possible configurations. Either could be selected as the preferred configuration.

51 instances of {0, 7, 4, 4}.

46 instances of {0, 9, 2, 6}.

No UHMVs appeared in either configuration, so internal base security is handled by the more versatile AHMV.

The first configuration shown requires 15 systems, the minimum possible over all configurations, whereas the second requires 17.

The starting configuration {1, 1, 1, 1} was the final configuration in only 3 trials.

Question 2

To compare system configurations we made 3 additional runs. For each the starting configuration is assumed to be the configuration specified by regulation. That is, when there is a loss, the commander immediately orders one of that type to reestablish the initial configuration. This is done in dSoS by setting the minimum system type counts to the initial counts and setting the $A_{SoS}$ threshold to 0.

Because it requires fewer systems, we select configuration {0, 7, 4, 4} as the preferred configuration and compare it to two other possible initial configurations: {3, 4, 4, 4} and {0, 3, 2, 12}. Two metrics are summarized in Table 25. Both are averaged over the 200 trials. Even though differences are not large, the preferred configuration performs better in both metrics.

TABLE 25

Key Metrics for System Re-Tasking Example

| Starting | ASoS | PB Availability |
|---|---|---|
| {0, 7, 4, 4} | 0.877 | 0.746 |
| {3, 4, 4, 4} | 0.864 | 0.745 |
| {0, 3, 2, 12} | 0.858 | 0.731 |

Example Setup 2

The problem setup from the first example has the same 4 functions as the combat systems at the COP. In example two, there is an additional system type for stand-in redundancy—Escort Vehicle (EV) type as shown in Table 26. When fuel runs low at a fielded PB, it requests resupply from the COP. Each delivery requires a fuel truck and an escort, and only the EVs can escort. The EVs were present in the first example, but they could not be used to perform any of the 4 combat/security functions.

TABLE 26

System Re-Tasking Example 2 Setup

| Number | Function | Number | System Type |
|---|---|---|---|
| 1 | Internal Base Security | 1 | Unarmored HMMWVs (UHMV) |
| 2 | Base Perimeter Security | 2 | Armored HMMWVs (AHMV) |
| 3 | Conducting Raids | 3 | Raider Vehicles (RV) |
| 4 | Maintaining Area Presence | 4 | Area Presence Vehicles (APV) |
| | | 5 | Escort Vehicles (EV) |

The success paths for each function exhibit the stand-in redundancy for the system types:

Internal base security is the same as in example 1; any combination of 3 UHMVs or AHMVs.

Perimeter security is the same as in example 1; any combination of 4 AHMVs or APVs.

Raids are conducted using one of 4 success paths: {4 RVs}, {2 RVs and 4 APVs}, {2 RVs, 2 APVs, and 2 EVs}, or {2 RVs and 4 EVs}.

Area presence is assured using one of 3 success paths: {4 APVs}, {2 APVs, 2 RVs, and 2 EVs}, or {2 APVs, 2 RVs, and 2 AHMVs}.

The UHMV is only used for one function (internal security). The AHMV and APV can help serve 3 functions. The RVs and EVs can help serve 2 functions. The task to deliver fuel to the PBs is not explicitly included in the $A_{SoS}$ calculation as a function because of its intermittent nature. But it does cause potential resource contention for the use of the EVs, thereby implicitly affecting $A_{SoS}$.

If available systems are scarce the commander must decide whether an EV can be released for a fuel delivery or should remain to help with raids and/or area presence. The potential release of an escort to accompany a fuel truck will cause $A_{SoS}$ to either stay the same or to decrease. If it stays the same the release is allowed. If it will drop but remain above the $A_{SoS}$ delivery threshold (input by the analyst) the release is allowed. Otherwise the commander disallows the delivery until other escorts or combat systems become available—which then results in a retest for the release.

The decision affects the ability of the COP to field patrol bases. If fuel is at a low level at a patrol base and a delivery is not forthcoming, the entire patrol base returns to the COP. The time during which that patrol base should be fielded but is not reduces the PB availability metric, implying that the COP is failing at one of its responsibilities.

Note that there are 240 possible success path combinations (4•5•4•3). Each combination represents a possible system configuration to deploy at the COP. However, because a configuration is characterized by the system counts required by the combination of success paths, there is potential duplication. For example, the success path combination {1, 1, 2, 2} signifies that the first success path of internal base security and the first success path of perimeter base security are combined with the second success path of raids and area presence. The combination requires 3 UHMVs, 4 AHMVs, 6 APVs, 4 RVs, and 2 EVs. The same set of systems is required by the combination {1, 3, 3, 3}. In this regard there are 216 unique configurations.

The same 2 questions are posed here
1. Is there a preferred configuration?
2. If so, what improvement occurs over other configurations?

Question 1

Scanning the 216 unique success path combinations, the total number of systems required is always 15, 17, or 19. The counts of the system types required can vary widely. Success path combination {1, 2, 4, 3} requires a rather uniform count of {3, 5, 3, 4, 4} systems {UHMV, AHMV, RV, APV, EV}. Contrasting, success path combination {4, 5, 2, 1} requires a disparate count of {0, 3, 2, 12, 0} systems.

The analysis was started with success path combination {1, 1, 1, 1} because it does not involve any stand-in redundancy, that is, each function is intended to be performed by a single system type. There are {3, 4, 4, 4, 0} systems required, which does not call for any EVs. However for this simulation there are 3 fuel trucks initially assigned to the COP with a minimum count of 2, so it makes sense to assign 3 EVs for fuel deliveries also with a minimum count of 2. In this regard, there is some initial overbuild for the $A_{SoS}$ calculation.

The minimum system count to maintain was set to 0 for each of the 4 non-Escort system types. This is important because it means that a replacement is not routinely ordered when a system becomes disabled. Systems are only ordered when $A_{SoS}$ has been below its threshold (0.8) for the prescribed number of hours (240, or 10 days). More than one system must be lost for $A_{SoS}$ to drop below its threshold in this example so the commander orders multiple system replacements. The identity and count of system types to order are determined using the algorithm described above for option b part ii. The $A_{SoS}$ delivery threshold was set to 0.6 so if escort systems are being used as stand-in redundant systems for the 4 functions of the base and releasing an escort will cause $A_{SoS}$ to fall below 0.6, fuel deliveries are postponed.

The starting configuration {1, 1, 1, 1} was run for 200 trials. At the end of the 2-year simulation, the final system counts at the COP were extracted. Some trials had clearly converged to a fixed configuration while others were still in flux. If $A_{SoS}$<1 at the end of the mission we mimicked the commander reorder protocol until $A_{SoS}$=1 and saved the resulting configuration.

The most noteworthy observations were:
No final configuration dominated, but some occurred more frequently than others.
For the 200 trials, the final configuration for 53 (26.5%) could be identified as one of 2 possible configurations:
29 instances of {0, 7, 4, 4, 0}.
24 instances of {0, 7, 8, 2, 0}.
No UHMVs appeared in either configuration, so internal base security is handled by the more versatile AHMV.
No EVs appeared in either configuration so the number of escorts present did not affect $A_{SoS}$ for these particular configurations, only the ability to deliver fuel.
The first configuration shown requires 15 systems, the minimum possible over all configurations, whereas the second requires 17.
Disregarding EVs, the best configuration is identical to the best in the first example.

Question 2

To compare system configurations, the starting configuration is assumed to be the configuration specified by regulation. That is when there is a loss, the commander immediately orders one of that type to reestablish the initial configuration. This is done in dSoS by setting the minimum system type counts to the initial counts and setting the $A_{SoS}$ threshold to 0.

Because it requires fewer systems, we select configuration {0, 7, 4, 4, 0} as the preferred configuration and compare it to two other possible initial configurations: {3, 4, 4, 4, 0} and {0, 3, 2, 12, 0}. Two metrics are summarized in Table 27. Both are averaged over the 200 trials. Even though differences are not large, the preferred configuration performs better in both metrics. The configuration with no intended system re-tasking performs the worst in this case.

TABLE 27

System Re-Tasking Comparing System Configurations

| Starting | $A_{SoS}$ | PB Availability |
|---|---|---|
| {0, 7, 4, 4, 0} | 0.891 | 0.734 |
| {3, 4, 4, 4, 0} | 0.863 | 0.702 |
| {0, 3, 2, 12, 0} | 0.875 | 0.729 |

Conclusions dSoS software can be used to investigate adaptability in the system of systems arena. It incorporates a novel definition of system of systems availability ($A_{SoS}$) and an algorithm to select replacement systems when necessary. Together they can be used to help determine initial preferred system configurations, for maximizing $A_{SoS}$ over a mission.

The starting configuration is defined and dSoS simulates the mission for a prescribed time. During the mission, if triggered by a time interval when $A_{SoS}$ is unacceptably low, the selection algorithm determines a set of systems to order that will raise $A_{SoS}$ back to 1. The resulting configuration changes over time and migrates to a few configurations that outperform the rest.

Comparing the best starting configuration for the two example problems, average $A_{SoS}$ increased (0.877 to 0.891) with the addition of the Escort Vehicles as potential stand-ins for the other combat systems. There was also a decrease in patrol base availability (0.746 to 0.734) due to the competition for the escorts. The dSoS software is a useful tool to evaluate these sorts of competing effects.

The technology described herein can be realized in whole or in part on an information processing system, such as a personal computer and/or a server. The processes previously described and shown in the flowchart diagrams herein can be carried out by executing instructions contained in a computer-readable medium and read by the information processing system.

Figure 15:
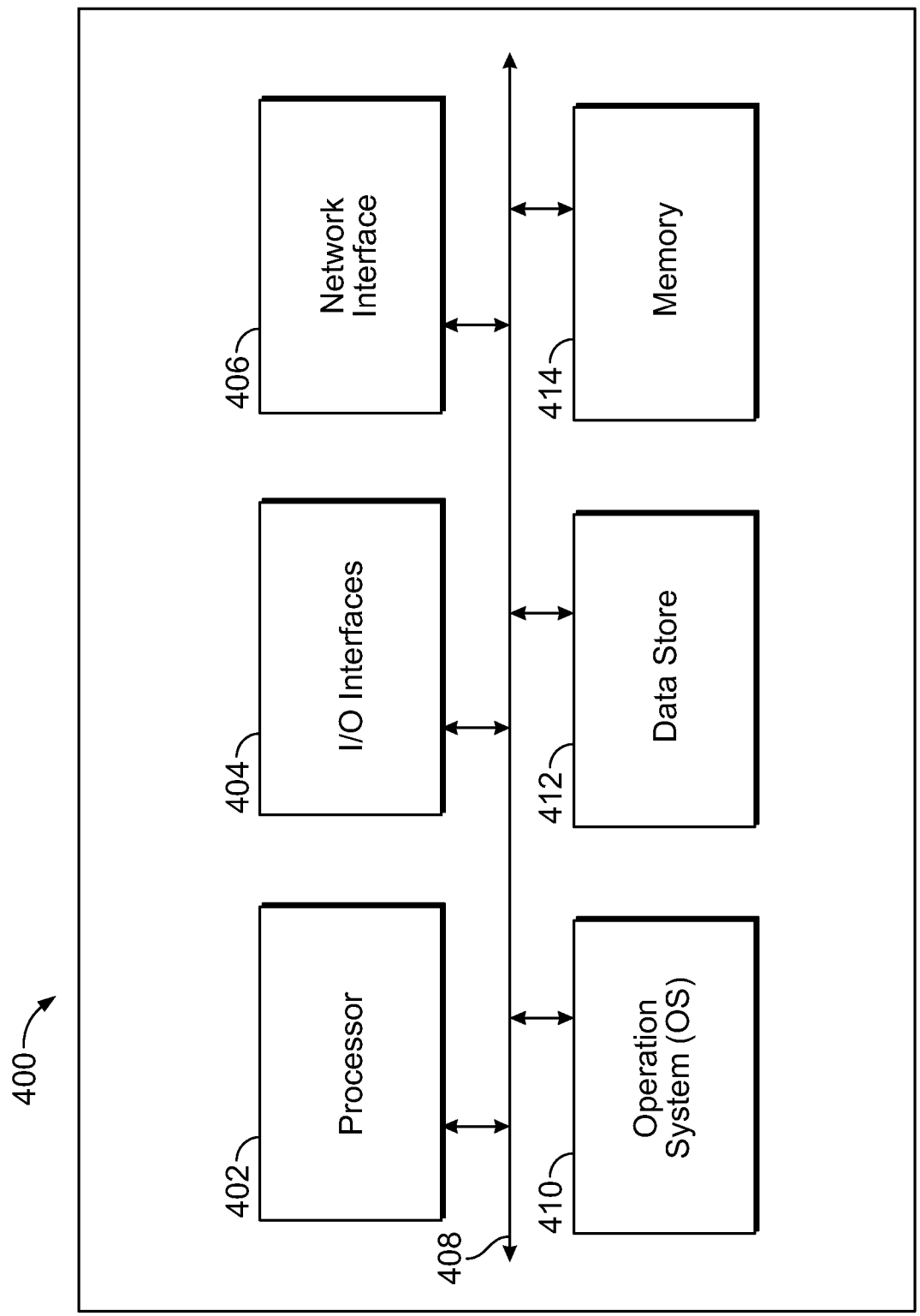
FIG. 15 shows a block diagram illustrating the general components of a computer according to an exemplary embodiment of the disclosure.

According to another embodiment of the disclosure, a system is disclosed for performing the operations of the disclosed methods. Referring now to FIG. 15, a block diagram 400 illustrating the general components of a computer according to an embodiment of the disclosure is shown. The computer 400 can be a digital computer that, in terms of hardware architecture, generally includes a processor 402, input/output (I/O) interfaces 404, network interfaces 406, an operating system (O/S) 410, a data store 412, and a memory 414. The components (402, 404, 406, 410, 412, and 414) are communicatively coupled via a local interface 408. The local interface 408 can be, for example but not limited to, one or more buses or other wired or wireless connections, as is known in the art. The local interface 408 can have additional elements, which are omitted for simplicity, such as controllers, buffers (caches), drivers, among many others, to enable communications. Further, the local interface 408 can include address, control, and/or data connections to enable appropriate communications among the aforementioned components. The general operation of a computer comprising these elements is well known in the art.

The processor 402 is a hardware device for executing software instructions. The processor 402 can be any custom made or commercially available processor, a central processing unit (CPU), an auxiliary processor among several processors associated with the computer 400, a semiconductor-based microprocessor (in the form of a microchip or chip set), or generally any device for executing software instructions. When the computer 400 is in operation, the processor 402 is configured to execute software stored within the memory 414, to communicate data to and from the memory 414, and to generally control operations of the computer 400 pursuant to the software instructions.

The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example but not limited to, a serial port, a parallel port, a small computer system interface (SCSI), an infrared (IR) interface, a radio frequency (RF) interface, and/or a universal serial bus (USB) interface.

The network interfaces 406 can be used to enable the computer 400 to communicate on a network. For example, the computer 400 can utilize the network interfaces 408 to communicate via the internet to other computers or servers for software updates, technical support, etc. The network interfaces 408 can include, for example, an Ethernet card (e.g., 10BaseT, Fast Ethernet, Gigabit Ethernet) or a wireless local area network (WLAN) card (e.g., 802.11a/b/g). The network interfaces 408 can include address, control, and/or data connections to enable appropriate communications on the network.

A data store 412 can be used to store data. The data store 412 can include any of volatile non-transitory memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 412 can incorporate electronic, magnetic, optical, and/or other types of storage media. In one example, the data store 412 can be located internal to the computer 400 such as, for example, an internal hard drive connected to the local interface 408 in the computer 400. Additionally in another embodiment, the data store can be located external to the computer 400 such as, for example, an external hard drive connected to the I/O interfaces 404 (e.g., SCSI or USB connection). Finally in a third embodiment, the data store may be connected to the computer 400 through a network, such as, for example, a network attached file server.

The memory 414 can include any of volatile non-transitory memory elements (e.g., random access memory (RAM, such as DRAM, SRAM, SDRAM, etc.)), nonvolatile non-transitory memory elements (e.g., ROM, hard drive, tape, CDROM, etc.), and combinations thereof. Moreover, the memory 414 may incorporate non-transitory electronic, magnetic, optical, and/or other types of storage media. Note that the memory 414 can have a distributed architecture, where various components are situated remotely from one another, but can be accessed by the processor 402.

The software in memory 414 can include one or more software programs, each of which includes an ordered listing of executable instructions for implementing logical functions. In the example of FIG. 15, the software in the memory system 414 includes the computer program product for performing the disclosed methods and a suitable operating system (O/S) 410. The operating system 410 essentially controls the execution of other computer programs, such as the interactive toolkit for sourcing valuation, and provides scheduling, input-output control, file and data management, memory management, and communication control and related services. The operating system 410 can be, but is not limited to any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or other like operating system with similar functionality.

In an exemplary embodiment of the technology described herein, a computer 400 is configured to perform or execute the steps as depicted in flowcharts shown in FIGS. 2, 4, 11, 13 and 14, and as described in the text of this disclosure. According to an embodiment of the disclosure, a computer program product is configured to perform one or more of the executable programs for assessing system adaptability, providing an informed strategy for determining the composition of a system of system, determining SoS adaptability, and for determining effective system re-taskability. The computer program product, located on computer 400, is configured specifically to perform these tasks. The computer program product is user-driven in a questionnaire style that coaches the user throughout the methodology. The interactive toolkit for performing the executable methods is configurable per user and application.

According to another embodiment of the invention, a computer program product is disclosed for performing the operations of the disclosed methods depicted in flowcharts shown in FIGS. 2, 4, 11, 13 and 14, and as described in the text of this disclosure. In an embodiment, a computer program product is disclosed for performing the operations of the disclosed methods for assessing system adaptability. In an embodiment, the computer program product is embedded within a non-transitory computer readable storage medium readable by a processor of a computer and configured to store instructions for execution by the processor for performing a method including:

a) defining a problem having a design and a scenario;
 b) choosing one or more metrics;
 c) selecting one or more measures for the one or more chosen metrics;
 d) evaluating the one or more measures for the design and scenario;
 e) redefining the design;
 f) repeating steps a through e to create one or more designs;
 g) comparing the one or more designs; and
 h) selecting a final design from the one or more designs for recommendation.

Additional executable steps are as described in the method description for assessing system adaptability.

In an embodiment, a computer program product is disclosed for performing the operations of the disclosed methods for providing an informed strategy for determining the composition of a system of system. In an embodiment, the computer program product is embedded within a non-transitory computer readable storage medium readable by a processor of a computer and configured to store instructions for execution by the processor for performing a method including:

a) define a problem having a design and a scenario;
 b) choose one or more performance metrics;
 c) select one or more measures for the one or more chosen performance metrics;
 d) evaluate the one or more measures for the design and scenario;

e) redefine design;
f) repeat steps a through e to create one or more designs;
g) compare the one or more designs based on the evaluation of the evaluated performance metrics; and
h) provide a final design from the one or more designs based on the evaluation of the evaluated performance metrics.

Additional executable steps are as described in the method description for providing an informed strategy for determining the composition of a system of system.

In an embodiment, a computer program product is disclosed for performing the operations of the disclosed methods for determining effective system re-taskability. In an embodiment, the computer program product is embedded within a non-transitory computer readable storage medium readable by a processor of a computer and configured to store instructions for execution by the processor for performing a method including:
 a) define a problem having a design, functions, and a scenario;
 b) define possible re-tasking for each function;
 c) evaluate performance of system of system under re-tasking using system of system availability;
 d) redefine design;
 e) repeat steps a through d to create one or more designs;
 f) compare designs; and
 g) provide a final design from the one or more designs based on evaluation of effective system availability.

Additional executable steps are as described in the method description for determining effective system re-taskability.

In summary, the methods, systems and computer program products of the present disclosure provide the following findings:
 An SoS can be more or less adaptable, in the sense that the design and operation of an SoS can contribute to how well it can perform in changing mission spaces, changing threat environments, and changing natural environments.
 Metrics exist that can indicate the adaptability of an SoS.
 No single metric for adaptability of SoS exists. There are many aspects to SoS (purpose, functionality, structure, etc.) and many ways they can adapt to changing conditions.
 No universally applicable SoS adaptability metrics exist. Again, SoS differ in too many aspects. Relative metrics for comparing designs within an SoS, however, can be applied—one can say that a given design for a particular SoS is probably more adaptable than another.
 Four categories of adaptability metrics, including 15 individual adaptability metrics, were developed that can cover a range of theoretical adaptability facets.
 A Systems of Systems Adaptability Index (SoSAI) can provide an aggregation of an application-specific subset of the adaptability metrics. Both the individual metrics and SoSAI are promising mechanisms for providing SoS adaptability insights.
 A subset of the individual adaptability metrics and the SoSAI correlate with performance in a notional military deployment test case, and thus the metrics and SoSAI were useful to distinguish more adaptable from less adaptable SoS designs.
 The adaptability metrics suggest that substitutability of systems in an SoS can be beneficial for adaptability. Substitutability, also known as systems re-tasking or stand-in redundancy, can be designed into an SoS.
 Adaptability metrics have other potential benefits beyond assessing the adaptability of SoS. For example, the complexity metrics can be used in determining the integrity of supply chains.
 Also, the diversity metric can be use in determining a representative set of components during trade-space characterization.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining effective system re-taskability of a system and assembling the system, comprising:
 a) a user defining a problem having a design, functions, and a scenario;
 b) the user defining possible re-tasking for each function;
 c) evaluating performance of the system under re-tasking using system of system availability;
 d) the user redefining the design based on the evaluated performance;
 e) repeat steps a through d to create one or more designs;
 f) the user comparing the designs;
 g) the user selecting a best design wherein the design is a design that meets system of system availability;
 wherein the system is selected from a group consisting of a military deployment, an electrical grid, a package delivery company, and a supply chain; and
 wherein system of system availability is determined by the following formula:

$$A_{SoS} = \frac{1}{t_{tot}} \sum_{i=1}^{N_{times}} \Delta t_i \max_{\substack{j=possible \\ \text{"success-path"} \\ combinations}} \left[ \min_{\substack{k=SP \\ requirements}} \left( \frac{N_{operating|operable_{k,j,i}}}{N_{required_{k,j,i}}} \right) \right].$$

2. The method of claim 1, wherein the evaluation is determined by possible success paths for inoperability, evaluating system of system availability for each design, and incorporating a success path based on improving system of system availability.

3. A system comprising:
 a computer; and
 a non-transitory computer readable storage medium encoded with programming for interactively analyzing system re-taskability, the non-transitory computer readable medium with programming configured, when executed by the computer, to:
 a) receive an input that defines a problem having a design, functions, and a scenario;
 b) receive an input that defines possible re-tasking for each function;
 c) execute a program to evaluate performance of a system under re-tasking using system of system availability;
 d) receive an input that redefines the design;
 e) repeat steps a through d to create one or more designs;

f) compare the designs;

g) wherein a user selects a final system design from the one or more designs based on evaluation of effective system availability;

wherein the final system design is selected from a group consisting of a military deployment, an electrical grid, a package delivery company, and a supply chain; and wherein system of system availability is determined by the following formula:

$$A_{SoS} = \frac{1}{t_{tot}} \sum_{i=1}^{N_{times}} \Delta t_i \max_{\substack{j=possible \\ \text{"success-path"} \\ combinations}} \left[ \min_{\substack{k=SP \\ requirements}} \left( \frac{N_{operating|operable_{k,j,i}}}{N_{required_{k,j,i}}} \right) \right].$$

4. The system of claim 3, wherein the evaluation is determined by possible success paths for inoperability, evaluating system of system availability for each design, and incorporating a best success path based on improving system of system availability.

5. A computer program product stored on a non-transitory computer readable medium, wherein executed by a process on a computer, the computer program product configured to:

a) receive an input that defines a problem having a system design, functions, and a scenario;

b) receive an input that defines possible re-tasking for each function;

c) execute a program to evaluate performance of a system under re-tasking using system of system availability;

d) receive an input that redefines the system design;

e) repeat steps a through d to create one or more system designs;

f) compare the system designs; and g) wherein a user selects a final system design from the one or more system designs based on evaluation of effective system availability;

wherein the system is selected from a group consisting of a military deployment, an electrical grid, a package delivery company, and a supply chain; and wherein system of system availability is determined by the following formula:

$$A_{SoS} = \frac{1}{t_{tot}} \sum_{i=1}^{N_{times}} \Delta t_i \max_{\substack{j=possible \\ \text{"success-path"} \\ combinations}} \left[ \min_{\substack{k=SP \\ requirements}} \left( \frac{N_{operating|operable_{k,j,i}}}{N_{required_{k,j,i}}} \right) \right].$$

6. The computer program product of claim 5, wherein the evaluation is determined by possible success paths for inoperability, evaluating system of system availability for each design, and incorporating a best success path based on improving system of system availability.

\* \* \* \* \*